(12) United States Patent
Landa et al.

(10) Patent No.: US 10,190,012 B2
(45) Date of Patent: Jan. 29, 2019

(54) TREATMENT OF RELEASE LAYER AND INKJET INK FORMULATIONS

(71) Applicant: LANDA CORPORATION LTD., Rehovot (IL)

(72) Inventors: Benzion Landa, Nes Ziona (IL); Gregory Nakhmanovich, Rishon LeZion (IL); Galia Golodetz, Rehovot (IL); Sagi Abramovich, Ra'anana (IL); Yehoshua Sheinman, Ra'anana (IL)

(73) Assignee: LANDA CORPORATION LTD., Rehovot ( * ) Notice: Subject to any disclaimer, the term of this patent is extended or adjusted under 35 U.S.C. 154(b) by 40 days.

(21) Appl. No.: 15/182,539

(22) Filed: Jun. 14, 2016

(65) Prior Publication Data

US 2016/0369119 A1 Dec. 22, 2016

Related U.S. Application Data

(63) Continuation-in-part of application No. 14/382,881, filed as application No. PCT/IB2013/051755 on Mar.
(Continued)

(51) Int. Cl.
  *C09D 11/54* (2014.01)
  *C09D 11/322* (2014.01)
  (Continued)

(52) U.S. Cl.
  CPC ............... *C09D 11/54* (2013.01); *B41J 2/01* (2013.01); *C09D 11/033* (2013.01);
  (Continued)

(58) Field of Classification Search
  CPC .................. C09D 11/033; C09D 11/54; Y10T 428/31721; Y10T 428/31725
  See application file for complete search history.

(56) References Cited

U.S. PATENT DOCUMENTS

| 3,697,551 A | 10/1972 | Thomson et al. |
| 4,293,866 A | 10/1981 | Takita et al. |
| (Continued) |

FOREIGN PATENT DOCUMENTS

| CN | 1200085 A | 11/1998 |
| CN | 1809460 A | 7/2006 |
| (Continued) |

OTHER PUBLICATIONS

Supplemental European Search Report for EP 13757427.3 dated Mar. 12, 2015.
(Continued)

*Primary Examiner* — Betelhem Shewareged
(74) *Attorney, Agent, or Firm* — Marc Van Dyke; Fourth Dimension IP

(57) ABSTRACT

Aqueous inkjet ink formulations comprising a solvent including water and a co-solvent, a water soluble or water dispersible polymeric resin and a colorant, and a method for facilitating the use of such an aqueous inkjet ink in an indirect printing system in which the ink is jetted onto a hydrophobic release layer of an intermediate transfer member before having the solvent removed therefrom and being transferred to a substrate, wherein prior to the jetting of the ink the release layer is brought into contact with an aqueous solution of a positively charged polymeric chemical agent. Other aspects are also described.

20 Claims, 8 Drawing Sheets

Related U.S. Application Data 5, 2013, now abandoned, application No. 15/182,539, filed on Jun. 14, 2016, which is a continuation-in-part of application No. 14/382,930, filed as application No. PCT/IB2013/000757 on Mar. 5, 2013, now Pat. No. 9,643,400.

(60) Provisional application No. 61/606,985, filed on Mar. 5, 2012, provisional application No. 61/606,913, filed on Mar. 5, 2012, provisional application No. 61/641,258, filed on May 1, 2012, provisional application No. 61/611,557, filed on Mar. 15, 2012, provisional application No. 61/607,537, filed on Mar. 6, 2012, provisional application No. 61/641,653, filed on May 2, 2012, provisional application No. 61/641,223, filed on May 1, 2012, provisional application No. 61/619,372, filed on Apr. 2, 2012, provisional application No. 61/611,570, filed on Mar. 15, 2012.

(51) Int. Cl.

| | | |
|---|---|---|
| *C09D 11/107* | (2014.01) | |
| *C09D 11/033* | (2014.01) | |
| *C09D 11/324* | (2014.01) | |
| *C09D 11/102* | (2014.01) | |
| *C09D 11/328* | (2014.01) | |
| *B41J 2/01* | (2006.01) | |
| *C09D 11/106* | (2014.01) | |

(52) U.S. Cl.
CPC .......... *C09D 11/102* (2013.01); *C09D 11/106* (2013.01); *C09D 11/107* (2013.01); *C09D 11/322* (2013.01); *C09D 11/324* (2013.01); *C09D 11/328* (2013.01); *B41J 2002/012* (2013.01); *Y10T 428/31721* (2015.04); *Y10T 428/31725* (2015.04)

(56) References Cited

U.S. PATENT DOCUMENTS

| | | |
|---|---|---|
| 4,401,500 A | 8/1983 | Hamada et al. |
| 4,642,654 A | 2/1987 | Toganoh et al. |
| 4,853,737 A | 8/1989 | Hartley et al. |
| 5,039,339 A | 8/1991 | Phan et al. |
| 5,099,256 A | 3/1992 | Anderson |
| 5,106,417 A | 4/1992 | Hauser et al. |
| 5,190,582 A | 3/1993 | Shinozuka et al. |
| 5,352,507 A | 10/1994 | Bresson et al. |
| 5,608,004 A | 4/1997 | Toyoda et al. |
| 5,623,296 A | 4/1997 | Fujino et al. |
| 5,679,463 A | 10/1997 | Visser et al. |
| 5,723,242 A | 3/1998 | Lehman et al. |
| 5,733,698 A | 3/1998 | Lehman et al. |
| 5,772,746 A | 6/1998 | Sawada et al. |
| 5,736,250 A | 7/1998 | Heeks et al. |
| 5,859,076 A | 1/1999 | Kozma et al. |
| 5,880,214 A | 3/1999 | Okuda et al. |
| 5,883,144 A | 3/1999 | Bambara et al. |
| 5,883,145 A | 3/1999 | Hurley et al. |
| 5,884,559 A | 3/1999 | Okubo et al. |
| 5,891,934 A | 4/1999 | Moffatt et al. |
| 5,895,711 A | 4/1999 | Yamaki |
| 5,902,841 A | 5/1999 | Jaeger et al. |
| 5,923,929 A | 7/1999 | Ben Avraham et al. |
| 5,929,129 A | 7/1999 | Feichtinger |
| 5,932,659 A | 8/1999 | Bambara et al. |
| 5,935,751 A | 8/1999 | Matsuoka et al. |
| 5,991,590 A | 11/1999 | Chang et al. |
| 6,004,647 A | 12/1999 | Bambara et al. |
| 6,024,786 A | 2/2000 | Gore |
| 6,045,817 A | 4/2000 | Ananthapadmanabhan et al. |
| 6,053,438 A | 4/2000 | Romano, Jr. et al. |
| 6,059,407 A | 5/2000 | Komatsu et al. |
| 6,071,368 A | 6/2000 | Boyd et al. |
| 6,094,558 A | 7/2000 | Shimizu et al. |
| 6,102,538 A | 8/2000 | Ochi et al. |
| 6,103,775 A | 8/2000 | Bambara et al. |
| 6,143,807 A | 11/2000 | Lin |
| 6,166,105 A | 12/2000 | Santilli et al. |
| 6,196,674 B1 | 3/2001 | Takemoto |
| 6,214,894 B1 | 4/2001 | Bambara et al. |
| 6,221,928 B1 | 4/2001 | Kozma et al. |
| 6,242,503 B1 | 6/2001 | Kozma et al. |
| 6,257,716 B1 | 7/2001 | Yanagawa |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,332,943 B1 | 12/2001 | Herrmann et al. |
| 6,357,870 B1 | 3/2002 | Beach et al. |
| 6,358,660 B1 | 3/2002 | Agler et al. |
| 6,383,278 B1 | 5/2002 | Hirasa et al. |
| 6,397,034 B1 | 5/2002 | Tarnawskyj et al. |
| 6,432,501 B1 | 8/2002 | De Bastiani et al. |
| 6,586,100 B1 | 1/2003 | Pickering et al. |
| 6,530,321 B2 | 3/2003 | Andrew et al. |
| 6,531,520 B1 | 3/2003 | Bambara et al. |
| 6,551,394 B2 | 4/2003 | Hirasa et al. |
| 6,551,716 B1 | 4/2003 | Landa et al. |
| 6,590,012 B2 | 7/2003 | Miyabayashi |
| 6,623,817 B1 | 9/2003 | De Bastiani et al. |
| 6,630,047 B2 | 10/2003 | Hine et al. |
| 6,639,527 B2 | 10/2003 | Johnson |
| 6,682,189 B2 | 1/2004 | May et al. |
| 6,685,769 B1 | 2/2004 | Karl et al. |
| 6,709,096 B1 | 3/2004 | Beach et al. |
| 6,720,367 B2 | 4/2004 | Taniguchi et al. |
| 6,755,519 B2 | 6/2004 | Gelbart et al. |
| 6,770,331 B1 | 8/2004 | Mielke et al. |
| 6,789,887 B2 | 9/2004 | Yang et al. |
| 6,898,403 B2 | 5/2005 | Baker et al. |
| 6,916,862 B2 | 7/2005 | Ota et al. |
| 7,084,202 B2 | 8/2006 | Pickering et al. |
| 7,128,412 B2 | 10/2006 | King et al. |
| 7,160,377 B2 | 1/2007 | Zoch et al. |
| 7,271,213 B2 | 9/2007 | Hoshida et al. |
| 7,322,689 B2 | 1/2008 | Kohne et al. |
| 7,348,368 B2 | 3/2008 | Kataoka et al. |
| 7,612,125 B2 | 11/2009 | Mueller et al. |
| 7,655,707 B2 | 2/2010 | Ma |
| 7,655,708 B2 | 2/2010 | House et al. |
| 7,699,922 B2 | 4/2010 | Breton et al. |
| 7,709,074 B2 | 5/2010 | Uchida et al. |
| 7,732,543 B2 | 6/2010 | Loch et al. |
| 7,732,583 B2 | 6/2010 | Annoura et al. |
| 7,810,922 B2 | 10/2010 | Gervasi et al. |
| 7,712,890 B2 | 11/2010 | Yahiro |
| 7,867,327 B2 | 1/2011 | Sano et al. |
| 7,876,345 B2 | 1/2011 | Houjou |
| 7,910,183 B2 | 3/2011 | Wu |
| 7,919,544 B2 | 4/2011 | Matsutama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,012,538 B2 | 9/2011 | Yokushi |
| 8,042,906 B2 | 10/2011 | Chiwata et al. |
| 8,177,351 B2 | 5/2012 | Taniuchi et al. |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,263,683 B2 | 9/2012 | Gibson et al. |
| 8,304,043 B2 | 11/2012 | Nagashima et al. |
| 8,353,589 B2 | 1/2013 | Ikeda et al. |
| 8,460,450 B2 | 6/2013 | Taverizatshy et al. |
| 8,474,963 B2 | 7/2013 | Hasegawa et al. |
| 8,536,268 B2 | 7/2013 | Karjala et al. |
| 8,546,466 B2 | 10/2013 | Yamashita et al. |
| 8,556,400 B2 | 10/2013 | Yatake et al. |

(56) References Cited

U.S. PATENT DOCUMENTS

| | | | |
|---|---|---|---|
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,894,198 B2 | 11/2014 | Hook et al. |
| 8,919,946 B2 | 12/2014 | Suzuki et al. |
| 9,566,780 B2 | 2/2017 | Landa et al. |
| 9,782,993 B2 | 10/2017 | Landa et al. |
| 2002/0102374 A1 | 1/2002 | Gervasi et al. |
| 2002/0041317 A1 | 4/2002 | Kashiwazaki |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0018119 A1 | 1/2003 | Frenkel et al. |
| 2003/0032700 A1 | 2/2003 | Morrison et al. |
| 2003/0054139 A1 | 3/2003 | Ylitalo et al. |
| 2003/0055129 A1 | 3/2003 | Alford |
| 2003/0118381 A1 | 6/2003 | Law et al. |
| 2003/0186147 A1 | 10/2003 | Pickering et al. |
| 2003/0232945 A1 | 12/2003 | Pickering et al. |
| 2003/0234849 A1 | 12/2003 | Pan et al. |
| 2004/0087707 A1 | 5/2004 | Zoch et al. |
| 2004/0229976 A1 | 11/2004 | Kakiuchi et al. |
| 2005/0031807 A1 | 2/2005 | Quintens et al. |
| 2005/0110855 A1 | 5/2005 | Taniuchi et al. |
| 2005/0235870 A1 | 10/2005 | Ishihara et al. |
| 2005/0266332 A1 | 12/2005 | Pavlisko et al. |
| 2005/0272334 A1* | 12/2005 | Wang .................... D06M 11/44 442/93 |
| 2006/0135709 A1 | 6/2006 | Hasegawa et al. |
| 2006/0164488 A1 | 7/2006 | Taniuchi et al. |
| 2007/0120927 A1 | 5/2007 | Snyder et al. |
| 2007/0146462 A1 | 6/2007 | Taniuchi et al. |
| 2007/0176995 A1 | 8/2007 | Kadomatsu et al. |
| 2007/0229639 A1 | 10/2007 | Yahiro |
| 2007/0285486 A1 | 12/2007 | Harris et al. |
| 2007/0292780 A1 | 12/2007 | Nagai et al. |
| 2008/0006176 A1 | 1/2008 | Houjou |
| 2008/0032072 A1 | 2/2008 | Taniuchi et al. |
| 2008/0044587 A1 | 2/2008 | Maeno et al. |
| 2008/0055356 A1 | 3/2008 | Yamanobe |
| 2008/0055381 A1 | 3/2008 | Doi et al. |
| 2008/0055385 A1 | 3/2008 | Houjou |
| 2008/0112912 A1 | 5/2008 | Springob et al. |
| 2008/0118657 A1 | 5/2008 | Taverizatshy et al. |
| 2008/0138546 A1 | 6/2008 | Soria et al. |
| 2008/0166495 A1 | 7/2008 | Maeno et al. |
| 2008/0196621 A1 | 8/2008 | Ikuno et al. |
| 2009/0041932 A1 | 2/2009 | Ishizuka et al. |
| 2009/0080949 A1 | 3/2009 | Yamanobe et al. |
| 2009/0082503 A1 | 3/2009 | Yanagi et al. |
| 2009/0087565 A1 | 4/2009 | Houjou |
| 2009/0165937 A1 | 7/2009 | Inoue |
| 2009/0211490 A1 | 8/2009 | Ikuno et al. |
| 2009/0237479 A1 | 9/2009 | Yamashita et al. |
| 2009/0244146 A1 | 10/2009 | Chiwata |
| 2009/0279170 A1 | 11/2009 | Miyazaki et al. |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0012023 A1 | 1/2010 | Lefevre et al. |
| 2010/0075843 A1 | 3/2010 | Ikuno |
| 2010/0086692 A1 | 4/2010 | Ohta |
| 2010/0111577 A1 | 5/2010 | Soria et al. |
| 2010/0231623 A1 | 9/2010 | Hirato |
| 2010/0239789 A1 | 9/2010 | Umeda |
| 2010/0247818 A1 | 9/2010 | Wu |
| 2010/0282100 A1 | 11/2010 | Okuda et al. |
| 2010/0285221 A1 | 11/2010 | Oki et al. |
| 2011/0141188 A1 | 6/2011 | Morita |
| 2011/0195260 A1 | 8/2011 | Lee et al. |
| 2011/0234683 A1 | 9/2011 | Komatsu |
| 2011/0234689 A1 | 9/2011 | Saito |
| 2011/0269885 A1 | 11/2011 | Imai |
| 2011/0279554 A1 | 11/2011 | Dannhauser et al. |
| 2011/0304674 A1 | 12/2011 | Sambhy et al. |
| 2012/0013694 A1 | 1/2012 | Kanke |
| 2012/0026224 A1 | 2/2012 | Anthony et al. |
| 2012/0094091 A1 | 4/2012 | Van et al. |
| 2012/0105525 A1 | 5/2012 | Leung et al. |
| 2012/0105561 A1 | 5/2012 | Taniuchi et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0156375 A1 | 6/2012 | Brust et al. |
| 2013/0088543 A1 | 4/2013 | Tsuji et al. |
| 2013/0127966 A1 | 5/2013 | Noguchi et al. |
| 2013/0338273 A1 | 12/2013 | Shimanaka et al. |
| 2014/0011125 A1* | 1/2014 | Inoue .................... C08K 3/28 430/7 |
| 2014/0043398 A1 | 2/2014 | Butler et al. |
| 2014/0232782 A1 | 8/2014 | Mukai et al. |
| 2015/0015650 A1 | 1/2015 | Landa et al. |
| 2015/0022602 A1 | 1/2015 | Landa et al. |
| 2015/0024180 A1 | 1/2015 | Landa et al. |
| 2015/0024648 A1 | 1/2015 | Landa et al. |
| 2015/0025179 A1 | 1/2015 | Landa et al. |
| 2015/0044431 A1 | 2/2015 | Landa et al. |
| 2015/0044437 A1 | 2/2015 | Landa et al. |
| 2015/0072090 A1 | 3/2015 | Landa et al. |
| 2015/0118503 A1 | 4/2015 | Landa et al. |
| 2016/0222232 A1 | 8/2016 | Landa et al. |
| 2016/0297190 A1 | 10/2016 | Landa et al. |
| 2016/0297978 A1 | 10/2016 | Landa et al. |

FOREIGN PATENT DOCUMENTS

| | | |
|---|---|---|
| CN | 102925002 | 2/2013 |
| CN | 102925002 A | 2/2013 |
| EP | 0499857 A1 | 8/1992 |
| EP | 606490 A1 | 7/1994 |
| EP | 0609076 A2 | 8/1994 |
| EP | 1013466 A2 | 6/2000 |
| EP | 1146090 A2 | 10/2001 |
| EP | 1158029 A1 | 11/2001 |
| EP | 1247821 A2 | 10/2002 |
| EP | 1454968 A1 | 9/2004 |
| EP | 2028238 A2 | 2/2009 |
| EP | 2042317 A1 | 4/2009 |
| EP | 2228210 A1 | 9/2010 |
| EP | 2683556 A1 | 1/2014 |
| GB | 2321430 A | 7/1998 |
| JP | H06100807 | 4/1994 |
| JP | H07238243 A | 9/1995 |
| JP | H0862999 A | 3/1996 |
| JP | H08112970 | 5/1996 |
| JP | 2529651 B2 | 8/1996 |
| JP | 2000169772 A | 6/2000 |
| JP | 2000206801 A | 7/2000 |
| JP | 2002234243 A | 8/2002 |
| JP | 2002371208 A | 12/2002 |
| JP | 2003246135 A | 9/2003 |
| JP | 2003292855 A | 10/2003 |
| JP | 2004009632 A | 1/2004 |
| JP | 2004019022 A | 1/2004 |
| JP | 2004025708 A | 1/2004 |
| JP | 2004034411 A | 2/2004 |
| JP | 2004114377 A | 4/2004 |
| JP | 2004114675 A | 4/2004 |
| JP | 2004231711 A | 8/2004 |
| JP | 2004261975 A | 9/2004 |
| JP | 2005014255 A | 1/2005 |
| JP | 2005014256 A | 1/2005 |
| JP | 2006095870 A | 4/2006 |
| JP | 2006102975 A | 4/2006 |
| JP | 2006143778 | 6/2006 |
| JP | 2006152133 | 6/2006 |
| JP | 2006263984 | 10/2006 |
| JP | 2006-347085 A | 12/2006 |
| JP | 2006347081 A | 12/2006 |
| JP | 2006347085 | 12/2006 |
| JP | 2008006816 A | 1/2008 |
| JP | 2008018716 A | 1/2008 |
| JP | 2008142962 A | 6/2008 |

(56) References Cited

FOREIGN PATENT DOCUMENTS

| | | | |
|---|---|---|---|
| JP | 2008255135 A | 10/2008 | |
| JP | 2009045794 A | 3/2009 | |
| JP | 2009083314 | 4/2009 | |
| JP | 2009083317 | 4/2009 | |
| JP | 2009083317 A | 4/2009 | |
| JP | 2009096175 A | 5/2009 | |
| JP | 2009154330 A | 7/2009 | |
| JP | 2009190375 A | 8/2009 | |
| JP | 2009202355 A | 9/2009 | |
| JP | 2009214318 A | 9/2009 | |
| JP | 2009226852 A | 10/2009 | |
| JP | 2009233977 A | 10/2009 | |
| JP | 2009234219 A | 10/2009 | |
| JP | 2010105365 A | 5/2010 | |
| JP | 2010173201 A | 8/2010 | |
| JP | 2010184376 | 8/2010 | |
| JP | 2010241073 A | 10/2010 | |
| JP | 2010247528 | 11/2010 | |
| JP | 2011025431 A | 2/2011 | |
| JP | 2011144271 | 6/2011 | |
| JP | 2011-144271 A1 | 7/2011 | |
| JP | 2011173325 A | 9/2011 | |
| JP | 2011189627 A | 9/2011 | |
| JP | 2011201951 A | 10/2011 | |
| JP | 2012086499 A | 5/2012 | |
| WO | 1986000327 A2 | 1/1986 | |
| WO | 0154902 A1 | 8/2001 | |
| WO | 02068191 A1 | 9/2002 | |
| WO | 02078868 A2 | 10/2002 | |
| WO | 2004113082 A1 | 12/2004 | |
| WO | 2007145378 A1 | 12/2007 | |
| WO | 2008078841 A1 | 7/2008 | |
| WO | 2012014825 A1 | 2/2012 | |
| WO | 2012148421 A1 | 11/2012 | |
| WO | 2013060377 A1 | 5/2013 | |
| WO | 2013132339 A1 | 9/2013 | |
| WO | 2013132340 A1 | 9/2013 | |
| WO | 2013132343 A1 | 9/2013 | |
| WO | 2013132345 A1 | 9/2013 | |
| WO | 2013132418 A2 | 9/2013 | |
| WO | 2013132438 A2 | 9/2013 | |
| WO | 2013132439 A1 | 9/2013 | |
| WO | 2015036960 A1 | 3/2015 | |

OTHER PUBLICATIONS

Thomas E. Furia "CRC Handbook of Food Additives, Second Edition, vol. 1" CRC Press LLC, p. 434 (1972).
CN 102925002 Machine Translation (by EPO and Google)—published Feb. 13, 2013; Jiangnan University.
JP 2000-169772 Machine Translation (by EPO and Google)—published Jun. 20, 2000; Tokyo Ink Mfg Co Ltd.
JP 2002-234243 Machine Translation (by EPO and Google)—published Aug. 20, 2002; Hitachi Koki Co Ltd.
JP 2002-371208 Machine Translation (by EPO and Google)—published Dec. 26, 2002; Canon Inc.
JP 2004-114377 Machine Translation (by EPO and Google)—published Apr. 15, 2004; Konica Minolta Holdings Inc, et al.
JP 2004-114675 Machine Translation (by EPO and Google)—published Apr. 15, 2004; Canon Inc.
JP 2004-231711 Machine Translation (by EPO and Google)—published Aug. 19, 2004; Seiko Epson Corp.
JP 2005-014255 Machine Translation (by EPO and Google)—published Jan. 20, 2005; Canon Inc.
JP 2005-014256 Machine Translation (by EPO and Google)—published Jan. 20, 2005; Canon Inc.
JP 2006-102975 Machine Translation (by EPO and Google)—published Apr. 20, 2006; Fuji Photo Film Co Ltd.
JP 2006-347081 Machine Translation (by EPO and Google)—published Dec. 28, 2006; Fuji Xerox Co Ltd.
JP 2008-006816 Machine Translation (by EPO and Google)—published Jan. 17, 2008; Fujifilm Corp.
JP 2008-018716 Machine Translation (by EPO and Google)—published Jan. 31, 2008; Canon Inc.
JP 2008-142962 Machine Translation (by EPO and Google)—published Jun. 26, 2008; Fuji Xerox Co Ltd.
JP 2008-255135 Machine Translation (by EPO and Google)—published Oct. 23, 2008; Fujifilm Corp.
JP 2009-045794 Machine Translation (by EPO and Google)—published Mar. 5, 2009; Fujifilm Corp.
JP 2009-083317 Abstract; Machine Translation (by EPO and Google)—published Apr. 23, 2009; Fujifilm Corp.
JP 2009-154330 Machine Translation (by EPO and Google)—published Jul. 16, 2009; Seiko Epson Corp.
JP 2009-190375 Machine Translation (by EPO and Google)—published Aug. 27, 2009; Fuji Xerox Co Ltd.
JP 2009-202355 Machine Translation (by EPO and Google)—published Sep. 10, 2009; Fuji Xerox Co Ltd.
JP 2009-214318 Machine Translation (by EPO and Google)—published Sep. 24, 2009 Fuji Xerox Co Ltd.
JP 2009-226852 Machine Translation (by EPO and Google)—published Oct. 8, 2009; Fujifilm Corp.
JP 2009-233977 Machine Translation (by EPO and Google)—published Oct. 15, 2009; Fuji Xerox Co Ltd.
JP 2009-234219 Machine Translation (by EPO and Google)—published Oct. 15, 2009; Fujifilm Corp.
JP 2010-105365 Machine Translation (by EPO and Google)—published May 13, 2010; Fuji Xerox Co Ltd.
JP 2010-173201 Abstract; Machine Translation (by EPO and Google)—published Aug. 12, 2010; Richo Co Ltd.
JP 2010-241073 Machine Translation (by EPO and Google)—published Oct. 28, 2010; Canon Inc.
JP 2011-025431 Machine Translation (by EPO and Google)—published Feb. 10, 2011; Fuji Xerox Co Ltd.
JP 2011-173325 Machine Translation (by EPO and Google)—published Sep. 8, 2011; Canon Inc.
JP 2012-086499 Machine Translation (by EPO and Google)—published May 10, 2012; Canon Inc.
International Search Report for PCT/IB2013/051755 published as WO2013132439.
Written Opinion for PCT/IB2013/051755 published as WO2013132439.
IPRP for PCT/IB2013/051755 published as WO2013132439.
International Search Report for PCT/IB2013/000782 published as WO2013132340.
Written Opinion for PCT/IB2013/000782 published as WO2013132340.
IPRP for PCT/IB2013/000782 published as WO2013132340.
Office Action for U.S. Appl. No. 14/382,881 dated Dec. 16, 2014.
European Search Report for EP 13757427.3 dated Mar. 19, 2015.
English Translation of CN1200085 as published in WO9707991 dated Mar. 6, 1997.
2006-347085 Machine Translation (by EPO and Google)—published Dec. 28, 2006; Fuji Xerox Co Ltd.
JP 2011-144271 Machine Translation (by EPO and Google)—published Jul. 28, 2011 Toyo Ink SC Holdings Co Ltd.
Extended European Search Report for EP 13757936.3 dated Oct. 28, 2015.
"Solubility of Alcohol", in http://www.solubilityofthings.com/water/alcohol; downloaded on Nov. 30, 2017.
Handbook of Print Media, 2001, Springer Verlag, Berlin/Heidelberg/New York.
Units of Viscosity published by Hydramotion Ltd. 1 York Road Park, Malton, York Y017 6YA, England, downloaded from www.hydramotion.com website on Jun. 19, 2017.
poly(vinyl acetate) data sheet. PolymerProcessing.com. Copyright 2010. http://polymerprocessing.com/polymers/PVAC.html.
CN 102925002 Machine Translation (EPO and Google)—published Feb. 13, 2013 University Jiangnan.
JPH 06100807 Machine Translation (by EPO and Google)—published Apr. 12, 1994 Seiko Instr Inc.
JPH 08112970 Machine Translation (by EPO and Google)—published May 7, 1996 Fuji Photo Film Co Ltd.
JP 2006-143778 Machine Translation (by EPO and Google)—published Jun. 8, 2006 Sun Bijutsu Insatsu KK et al.
JP 2006-152133 Machine Translation (by EPO and Google)—published Jun. 15, 2006 Seiko Epson Corp.

(56) References Cited

OTHER PUBLICATIONS

JP 2006-263984 Machine Translation (by EPO and Google)—published Oct. 5, 2006 Fuji Photo Film Co Ltd.
JP 2006-347085 Machine Translation (by EPO and Google)—published Dec. 28, 2006 Fuji Xerox Co Ltd.
JP 2009-083314 Machine Translation (by EPO and Google)—published Apr. 23, 2009 Fujifilm Corp.
JP 2009-083317 Machine Translation (by EPO and Google)—published Apr. 23, 2009 Fujifilm Corp.
JP 2010-184376 Machine Translation (by EPO and Google)—published Aug. 26, 2010 Fujifilm Corp.
JP 2010-247528 Machine Translation (by EPO and Google)—published Nov. 4, 2010 Konica Minolta Holdings.
JP 2011-144271 Machine Translation (by EPO and Google)—published Jun. 28, 2010 Toyo Ink.
JP 2000-206801 Machine Translation (by PlatPat English machine translation); published on Jul. 28, 2000, Canon KK.
JP 2003246135 Machine Translation (by PlatPat English machine translation); published on Sep. 2, 2003, Ricoh KK.
JP 2004261975 Machine Translation (by EPO and Google); published on Sep. 24, 2004, Seiko Epson Corp.
JP 2011-201951 Machine Translation (by PlatPat English machine translation); published on Oct. 13, 2011, Shin-Etsu Chemical Co Ltd.
JP H0862999 Machine Translation (by EPO and Google); published on Mar. 8, 1996, Toray Industries.
"Amino Functional Silicone Polymers", in Xiameter.COPYRGT. 2009 Dow Coming Corporation.
BASF , "JONCRYL 537", Datasheet , Retrieved from the internet : Mar. 23, 2007 p. 1.
Clariant, "Ultrafine Pigment Dispersion for Design and Creative Materials : Hostafine Pigment Preparation" Retrieved from the Internet: URL: http://www.clariant.com/C125720D002B963C/4352D0BC052E90CEC1257479002707D9/$FILE/OP6208E_0608_FL_Hostafinefordesignandcreativematerials.pdf Jun. 19, 2008.
CN1809460A Machine Translation (by EPO and Google)—published Jul. 26, 2006; Canon KK.
Epomin Polymer, product information from Nippon Shokubai, dated Feb. 28, 2014.
JP2003292855(A) Machine Translation (by EPO and Google)—published Oct. 15, 2003; Konishiroku Photo Ind.
JP2004009632(A) Machine Translation (by EPO and Google)—published Jan. 15, 2004; Konica Minolta Holdings Inc.
JP2004019022 Machine Translation (by EPO and Google)—published Jan. 22, 2004; Yamano et al.
JP2004025708(A) Machine Translation (by EPO and Google)—published Jan. 29, 2004; Konica Minolta Holdings Inc.
JP2004034441(A) Machine Translation (by EPO and Google)—published Feb. 5, 2004; Konica Minolta Holdings Inc.
JP2006095870(A) Machine Translation (by EPO and Google)—published Apr. 13, 2006; Fuji Photo Film Co Ltd.
JP2009096175 Machine Translation (EPO, PlatPat and Google) published on May 7, 2009 Fujifilm Corp.
JP2011189627 Machine Translation (by Google Patents)—published Sep. 29, 2011; Canon KK.
JPH07238243(A) Machine Translation (by EPO and Google)—published Sep. 12, 1995; Seiko Instr Inc.

\* cited by examiner

FIG. 5A: "Negative Control" untreated blanket at 150°C
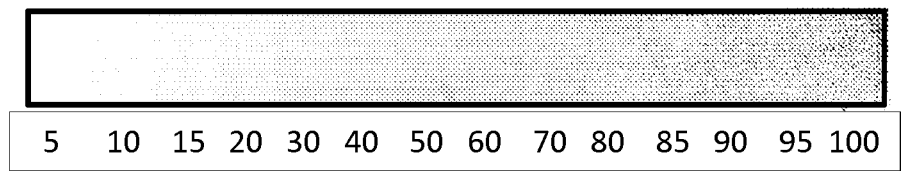
FIG. 5B: Blanket treated with
0.3% PEI (wt/wt); pH 9.5, at 150°C
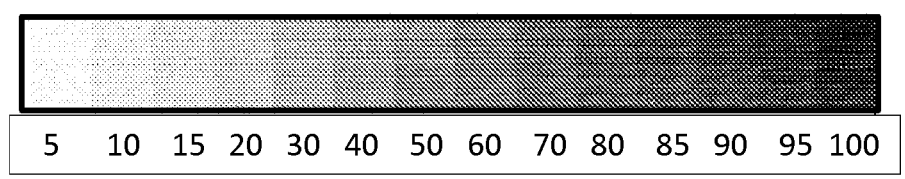
FIG. 5C: Blanket treated with
0.5% Guar 3196 (wt/wt); pH 9.5, at 150°C
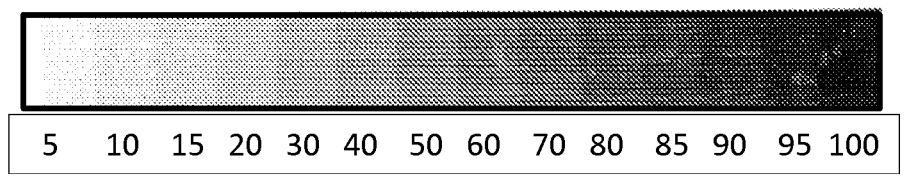
FIG. 5D: Blanket treated with
0.5% Viviprint 200 (wt/wt); pH 5.3, at 150°C
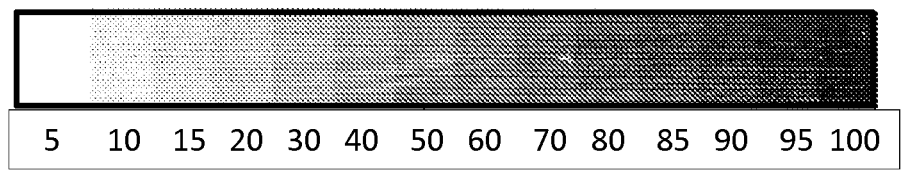

TREATMENT OF RELEASE LAYER AND INKJET INK FORMULATIONS

The present application is a continuation-in-part of U.S. Ser. No. 14/382,930, filed Sep. 4, 2014 as the national phase of PCT/IB2013/000757, filed Mar. 5, 2013, which claims Paris Convention priority from, and the benefit under U.S. law of, provisional application Nos. 61/641,258 (filed 1 May 2012), 61/611,557 (filed 15 Mar. 2012), 61/607,537 (filed 6 Mar. 2012), and 61/606,913 (filed 5 Mar. 2012). The present application is also a continuation-in-part of U.S. Ser. No. 14/382,881, filed Sep. 4, 2014 as the national phase of PCT/IB2013/051755, which was filed Mar. 5, 2013, and claims Paris Convention priority from, and the benefit under U.S. law of, U.S. provisional applications Nos. 61/641,653 (filed 2 May 2012 and titled, "Inkjet Ink Film Constructions", 61/641,223 (filed 1 May 2012 and titled "Inkjet Ink Compositions"), 61/619,372 (filed 2 Apr. 2012 and titled "Inkjet Ink Compositions"), 61/611,570 (filed 15 Mar. 2012 and titled "Inkjet Ink Compositions"), 61/606,985 (filed 5 Mar. 2012 and titled "Inkjet Ink Film Constructions") and 61/606,913 (filed Mar. 5, 2012). The contents of all of the aforementioned applications are incorporated herein by reference.

FIELD AND BACKGROUND

The present invention relates to indirect printing systems, and more particularly, to compositions suitable for the treatment of intermediate transfer members, and to ink formulations suitable for such indirect printing systems.

Digital printing techniques have been developed that allow a printer to receive instructions directly from a computer without the need to prepare printing plates. Amongst these are color laser printers that use the xerographic process. Color laser printers using dry toners are suitable for certain applications, but they do not produce images of a photographic quality acceptable for publications, such as magazines.

A process that is better suited for short run high quality digital printing is used in the HP-Indigo printer. In this process, an electrostatic image is produced on an electrically charged image bearing cylinder by exposure to laser light. The electrostatic charge attracts oil-based inks to form a color ink image on the image bearing cylinder. The ink image is then transferred by way of a blanket cylinder onto paper or any other substrate.

Inkjet and bubble jet processes are commonly used in home and office printers. In these processes droplets of ink are sprayed onto a final substrate in an image pattern. In general, the resolution of such processes is limited due to wicking by the inks into paper substrates. Fibrous substrates, such as paper, generally require specific coatings engineered to absorb the liquid ink in a controlled fashion or to prevent its penetration below the surface of the substrate. Using specially coated substrates is, however, a costly option that is unsuitable for certain printing applications, especially for commercial printing. Furthermore, the use of coated substrates creates its own problems in that the surface of the substrate remains wet and additional costly and time consuming steps are needed to dry the ink, so that it is not later smeared as the substrate is being handled, for example stacked or wound into a roll. Furthermore, excessive wetting of the substrate by the ink causes cockling and makes printing on both sides of the substrate (also termed perfecting or duplex printing) difficult, if not impossible.

Furthermore, inkjet printing directly onto porous paper, or other fibrous material, results in poor image quality because of variation of the distance between the print head and the surface of the substrate.

Using an indirect or offset printing technique overcomes many problems associated with inkjet printing directly onto the substrate. It allows the distance between the surface of the intermediate image transfer member and the inkjet print head to be maintained constant and reduces wetting of the substrate, as the ink can be dried on the intermediate image member before being applied to the substrate. Consequently, the final image quality on the substrate is less affected by the physical properties of the substrate.

The use of transfer members which receive ink droplets from an ink or bubble jet apparatus to form an ink image and transfer the image to a final substrate have been reported in the patent literature. Various ones of these systems utilize inks having aqueous carriers, non-aqueous carrier liquids or inks that have no carrier liquid at all (solid inks).

The use of aqueous based inks has a number of distinct advantages. Compared to non-aqueous based liquid inks, the carrier liquid is not toxic and there is no problem in dealing with the liquid that is evaporated as the image dries. As compared with solid inks, the amount of material that remains on the printed image can be controlled, allowing for thinner printed images and more vivid colors.

Generally, a substantial proportion or even all of the liquid is evaporated from the image on the intermediate transfer member, before the image is transferred to the final substrate in order to avoid bleeding of the image into the structure of the final substrate. Various methods are described in the literature for removing the liquid, including heating the image and a combination of coagulation of the image particles on the transfer member, followed by removal of the liquid by heating, air knife or other means.

Generally, silicone coated transfer members are preferred, since this facilitates transfer of the dried image to the final substrate. However, silicone is hydrophobic which causes the ink droplets to bead on the transfer member. This makes it more difficult to remove the water in the ink and also results in a small contact area between the droplet and the blanket that renders the ink image unstable during rapid movement of the transfer member.

Surfactants and salts have been used to reduce the surface tension of the droplets of ink so that they do not bead as much. While these do help to alleviate the problem partially, they do not solve it. Hence, compositions suitable for the treatment of the intermediate transfer member of an indirect printing system are desired.

BRIEF DESCRIPTION

The presently claimed invention pertains to particular aspects of a novel printing process and system for indirect digital inkjet printing using aqueous inks, other aspects of which are described and claimed in other applications of the same Applicant which were filed at approximately the same time as the present application. Further details on examples of such printing systems are provided in co-pending PCT application Nos. PCT/IB2013/051716 (Agent's reference LIP 5/001 PCT), published as WO 2013/132418; PCT/IB2013/051717 (Agent's reference LIP 5/003 PCT), published as WO 2013/132419; and PCT/IB2013/051718 (Agent's reference LIP 5/006 PCT), published as WO 2013/132420. A non-limitative description of such printing systems will be provided below.

Briefly, the printing process shared in particular, but not exclusively, by the above-mentioned systems, comprises directing droplets of an aqueous inkjet ink onto an intermediate transfer member having a hydrophobic release layer to form an ink image on the release layer, the ink including an organic polymeric resin and a coloring agent in an aqueous carrier, and the transfer member having a hydrophobic outer surface. Upon impinging upon the intermediate transfer member, each ink droplet in the ink image spreads to form an ink film. The ink is then dried while the ink image is being transported by the intermediate transfer member, by evaporating the aqueous carrier from the ink image to leave a residue film of resin and coloring agent. The residue film is then transferred to a substrate. Without wishing to be bound by theory, it is presently believed that mutually attractive intermolecular forces between molecules in the outer region of each ink droplet nearest the surface of the intermediate transfer member and molecules on the surface of the intermediate transfer member itself (e.g. between negatively charged molecules in the ink and positively charged molecules on the surface of the intermediate transfer member) counteract the tendency of the ink film produced by each droplet to bead under the action of the surface tension of the aqueous carrier, without causing each droplet to spread by wetting the surface of the intermediate transfer member. One aspect of the presently claimed invention pertains to a method of treating the surface of the intermediate transfer member to enable its sufficient interaction with the molecules of the ink, including chemical agents suitable for use in such a method, as well as printed articles obtainable by the use of said method and agents.

In accordance with an embodiment of the present invention, in a printing process such as that just described or as will described in more detail hereinbelow, in which an aqueous inkjet ink containing a negatively charged polymeric resin is jetted onto a hydrophobic release layer prior to being transferred to a substrate, there is provided a method for treating the release layer prior to the jetting of the aqueous ink onto the release layer, the method comprising contacting the release layer with an aqueous solution or dispersion of a polymeric chemical agent having at least one of (1) a positive charge density of at least 3 meq/g of chemical agent and an average molecular weight of at least 250, and (2) a nitrogen content of at least 1% and a molecular weight of at least 10,000. In some embodiments, the chemical agent, which may alternatively be referred to as a conditioning or pre-treatment agent, has a positive charge density of at least 3 meq/g and the average molecular weight is at least 5,000. In some embodiments, the chemical agent has a positive charge density of at least 6 meq/g and the average molecular weight is at least 1,000. In some embodiments, the chemical agent has a nitrogen content of at least 1 wt. % and an average molecular weight of at least 50,000. In some embodiments, the chemical agent has a nitrogen content of at least 18 wt. % and an average molecular weight of at least 10,000.

In some embodiments, the positive charge density is at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of chemical agent.

In some embodiments, the chemical agent has an average molecular weight of at least 500, at least 800, at least 1,000, at least 1,300, at least 1,700, at least 2,000, at least 2,500, at least 3,000, at least 3,500, at least 4,000, at least 4,500, at least 5,000, at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments, the chemical agent comprises one or more positively chargeable nitrogen atoms. (By a "positively chargeable polymer" or "positively chargeable group" is meant a polymer or chemical moiety which either can readily add a proton (e.g. $-NH_2$) or has a permanent positive charge (e.g. $-N(CH_3)_{3+}$); as used herein, the term refers to an inherent property of the polymer or moiety, and thus may encompass polymers or moieties which are in an environment in which such protons are added, as well as polymers in an environment in which such protons are not added. In contrast, the term "a positively charged" polymer or group refers to a polymer or group in an environment in which one or more such protons have been added or which has a permanent positive charge.) In some embodiments, the one or more chargeable nitrogen atoms of the chemical agent are selected from the group of primary, secondary and tertiary amines and quaternary ammonium groups and combinations of such groups. In some embodiments, such groups are covalently bound to a polymeric backbone and/or constitute part of such a backbone. In some embodiments the one or more nitrogen atoms are part of a cyclic moiety. In some embodiments, the one or more nitrogen atoms constitute at least 1%, at least 1.4%, at least 2%, at least 5%, at least 8%, at least 10%, at least 15%, at least 18%, at least 20%, at least 24%, at least 30%, at least 35%, at least 40%, at least 45%, or at least 50% by weight of the chemical agent.

In some embodiments, the chemical agent is a solid at room temperature.

In some embodiments, the chemical agent is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacryamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride. In some embodiments, the chemical agent is a polyethylene imine.

In some embodiments, the chemical agent is stable at temperatures of up to at least 100° C., at least 125° C., or at least 150° C. In this context, "stable" means that decomposition is not observed using thermogravimetric analysis (TGA).

In some embodiments, the concentration of the chemical agent in the solution or dispersion prior to application is not more than 5 wt. %, not more than 4 wt. %, not more than 3 wt. %, not more than 2 wt. %, not more than 1 wt. %, not more than 0.5 wt. %, not more than 0.4 wt. %, not more than 0.3 wt. %, not more than 0.2 wt. %, not more than 0.1 wt. %, not more than 0.05 wt. %, or not more than 0.01 wt. %.

In some embodiments, the chemical agent is applied to the release layer using a roller. In some embodiments, the chemical agent is applied by spraying. In some embodiments, the chemical agent is applied to the release layer by spraying and then evened using a metering roller. In some embodiments, the metering roller is chrome-plated. In some embodiments, the chemical agent is applied to the release layer so that the thickness of the solution or dispersion of chemical agent on the release layer prior to removal of the solvent is less than 1,000 microns, less than 900 microns, less than 800 microns, less than 700 microns, less than 600 microns, less than 500 microns, less than 400 microns, less than 300 microns, less than 200 microns, less than 100 microns, less than 50 microns, less than 10 microns, or less than 1 micron.

In some embodiments, the method further comprises removing (e.g. evaporating) the solvent in which the chemical agent is dissolved or dispersed. In some embodiments, the average thickness of the chemical agent on the release layer after evaporation of the solvent is not more than 1,000 nm, not more than 900 nm, not more than 800 nm, not more than 700 nm, not more than 600 nm, not more than 500 nm, not more than 400 nm, not more than 300 nm, not more than 200 nm, not more than 100 nm, not more than 90 nm, not more than 80 nm, not more than 70 nm, not more than 60 nm, not more than 50 nm, not more than 40 nm, not more than 30 nm, not more than 20 nm, not more than 15 nm, not more than 10 nm, not more than 9 nm, not more than 8 nm, not more than 7 nm, not more than 6 nm, not more than 5 nm, not more than 4 nm, not more than 3 nm, not more than 2 nm, or not more than 1 nm.

In some embodiments, the concentration of the chemical agent on the release layer after evaporation of the solvent is not more than 50 mg per square meter, not more than 40 mg/m$^2$, not more than 30 mg/m$^2$, not more than 20 mg/m$^2$, not more than 10 mg/m$^2$, not more than 5 mg/m$^2$, not more than 4 mg/m$^2$, not more than 3 mg/m$^2$, not more than 2 mg/m$^2$, not more than 1 mg/m$^2$, not more than 0.5 mg/m$^2$, not more than 0.1 mg/m$^2$, not more than 0.05 mg/m$^2$ or not more than 0.01 mg/m$^2$.

In some embodiments, the hydrophobic outer release layer comprises a silane, silyl or silanol-modified or -terminated polydialkylsiloxane silicone polymer, or hybrids of such polymers. In some embodiments, these silicone polymers are cross-linked by condensation curing of the silane groups. Thus, in some embodiments, the release layer comprises a cross-linked silanol- or silyl-terminated polydialkylsiloxane. In some embodiments, the hydrophobic outer release layer comprises silanol-terminated polydialkylsiloxane cross-linked with a polyethylsilicate oligomer.

In some embodiments, the temperature of the release layer when contacted with the aqueous solution or dispersion of the chemical agent is at least 60° C., at least 80° C., at least 100° C., at least 110° C., at least 120° C., at least 130° C., at least 140° C. or at least 150° C.

In some embodiments, the change in the contact angle of a drop of distilled water on the release layer to which the chemical agent has been applied and the solvent removed therefrom is not more than 10 degrees, not more than 9 degrees, not more than 8 degrees, not more than 7 degrees, not more than 6 degrees, not more than 5 degrees, not more than 4 degrees, not more than 3 degrees, not more than 2 degrees, not more than 1 degree relative to a drop of distilled water on the release layer to which the chemical agent has not been applied. In some embodiments, the change is at least 0.1 degrees, at least 0.2 degrees, at least 0.3 degrees, at least 0.4 degrees, at least 0.5 degrees, at least 0.6 degrees, at least 0.7 degrees, at least 0.8 degrees, at least 0.9 degrees or at least 1 degree relative to a drop of distilled water on the release layer to which the chemical agent has not been applied.

In some embodiments, the reduction in the contact angle of a drop of distilled water on the release layer to which the chemical agent has been applied and the solvent removed therefrom is not more than 20%, not more than 15%, not more than 10%, not more than 9%, more than 8%, not more than 7%, not more than 6%, not more than 5%, not more than 4%, not more than 3%, not more than 2%, or not more than 1% relative to the contact angle of a drop of distilled water on the release layer to which the chemical agent has not been applied. In some embodiments, the reduction in the contact angle is at least 0.1%, at least 0.2%, at least 0.3%, at least 0.4%, at least 0.5%, at least 0.6%, at least 0.7%, at least 0.8%, at least 0.9%, or at least 1% relative to the contact angle of a drop of distilled water on the release layer to which the chemical agent has not been applied. In some embodiments, the contact angle on the release layer to which the chemical agent has been applied and the solvent removed therefrom is at least 90 degrees.

In some embodiments, the method further comprises printing an ink drop to form an ink film on the chemical agent on the release layer, wherein the ratio of charges in the ink film to the charges in the chemical agent in the region covered by said ink film is at least 1:1, at least 2:1, at least 3:1, at least 4:1, at least 5:1, at least 10:1, at least 20:1, at least 30:1, at least 40:1, at least 50:1, at least 60:1, at least 70:1 or at least 80:1.

In some embodiments, the method further comprises printing an aqueous inkjet ink image on the release layer having the chemical agent thereupon; the aqueous inkjet ink comprising an aqueous solvent, a colorant, preferably a pigment, and a negatively chargeable polymeric resin; removing the solvent from the printed aqueous inkjet ink; and transferring the image to a substrate.

In some embodiments, when the substrate is Condat Gloss® 135 gsm coated paper, the optical density of the printed image on the substrate is at least 50% greater than the optical density of the same image when printed under identical conditions but without application of the chemical agent to the release layer. In some embodiments, the optical density is at least 60% greater. In some embodiments, the optical density is at least 70% greater. In some embodiments, the optical density is at least 80% greater. In some embodiments, the optical density is at least 90% greater. In some embodiments, the optical density is at least 100% greater, or at least 150% greater, or at least 200% greater or at least 250% greater, or at least 300% greater, or at least 350% greater, or at least 400% greater, or at least 450% greater, or at least 500% greater.

There is also provided, in accordance with an embodiment of the invention, a hydrophobic release layer of an intermediate transfer member of a printing system, the hydrophobic release layer having disposed thereupon a polymeric chemical agent having (1) a nitrogen content of at least 1 wt. % and at least one of (a) a positive charge density of at least 3 meq/g of chemical agent and an average molecular weight of at least 5,000 (b) a positive charge density of 6 meq/g of chemical agent and an average molecular weight of at least 1,000, and (c) an average molecular weight of at least 50,000, and/or (2) a nitrogen content of at least 18 wt. % and an average molecular weight of at least 10,000.

In some embodiments, the polymer disposed on the release layer contains one or more chargeable nitrogen atoms.

In some embodiments, the thickness of the chemical agent disposed on the release layer is not more than 1,000 nm, not more than 900 nm, not more than 800 nm, not more than 700 nm, not more than 600 nm, not more than 500 nm, not more than 400 nm, not more than 300 nm, not more than 200 nm, not more than 100 nm, not more than 90 nm, not more than 80 nm, not more than 70 nm, not more than 60 nm, not more than 50 nm, not more than 40 nm, not more than 30 nm, not more than 20 nm, not more than 10 nm, not more than 9 nm, not more than 8 nm, not more than 7 nm, not more than 6 nm, not more than 5 nm, not more than 4 nm, not more than 3 nm, not more than 2 nm, or not more than 1 nm.

In some embodiments, the chemical agent disposed upon the release layer has an average molecular weight of at least 800, at least 1,000, at least 1,300, at least 1,700, at least 2,000, at least 2,500, at least 3,000, at least 3,500, at least 4,000, at least 4,500, at least 5,000, of at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments, the positive charge density of the chemical agent disposed upon the release layer is at least 0.5 meq/g, at least 1 meq/g, at least 2 meq/g, at least 3 meq/g, at least 4 meq/g, at least 5 meq/g, at least 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of chemical agent.

In some embodiments, the chemical agent disposed upon the release layer is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacryamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride. In some embodiments, the chemical agent is polyethylene imine.

In some embodiments, the concentration of the chemical agent disposed on the release layer is not more than 50 mg per square meter, not more than 40 mg/m$^2$, not more than 30 mg/m$^2$, not more than 20 mg/m$^2$, not more than 10 mg/m$^2$, not more than 5 mg/m$^2$, not more than 4 mg/m$^2$, not more than 3 mg/m$^2$, not more than 2 mg/m$^2$, not more than 1 mg/m$^2$, or not more than 0.5 mg/m$^2$.

There is also provided, in accordance with an embodiment of the invention, a printed ink image on a substrate, the printed ink image comprising a water-soluble or water-dispersible polymeric resin, wherein at least one of the following is true: (a) the image has an X-Ray Photoelectron Spectroscopy (XPS) peak at 402.0±0.4 eV, 402.0±0.3 eV, or 402.0±0.2 eV; (b) the image has been printed by a printing method in accordance with an embodiment of the invention in which a chemical agent as described herein is applied to a hydrophobic release layer of an intermediate transfer member; (c) the image has on its outer surface distal to the substrate a polymeric chemical agent containing at least 1 wt. % of one or more chargeable nitrogen atoms and having at least one of (1) a positive charge density of at least 3 meq/g of chemical agent and an average molecular weight of at least 250 and (2) a molecular weight of at least 10,000; (e) the ratio of the surface concentration of nitrogen at the outer surface of the image distal to the substrate to the bulk concentration of nitrogen within the image is at least 1.2:1, at least 1.3:1, at least 1.5:1, at least 1.75:1, at least 2:1, at least 3:1, or at least 5:1.ratio being at least 1.2:1, at least 1.3:1, at least 1.5:1, at least 1.75:1, at least 2:1, at least 3:1, or at least 5:1; (f) the atomic surface concentration ratio of nitrogen to carbon (N/C) at the image surface distal to the substrate to the atomic bulk concentration ratio of nitrogen to carbon (N/C) at the depth, is at least 1.1:1, at least 1.2:1, at least 1.3:1, at least 1.5:1, at least 1.75:1, or at least 2:1; (g) the surface concentration of secondary amines, tertiary amines, and/or an ammonium group at the image surface distal to the substrate exceeds their respective bulk concentrations at a depth of at least 30 nanometers below the surface. In some embodiments, the chemical agent on the printed ink image contains one or more chargeable nitrogen atoms.

In some embodiments, the chemical agent on the printed ink image has an average molecular weight of at least 800, at least 1,000, at least 1,300, at least 1,700, at least 2,000, at least 2,500, at least 3,000, at least 3,500, at least 4,000, at least 4,500, at least 5,000, of at least 10,000, at least 15,000, at least 20,000, at least 25,000, at least 50,000, at least 100,000, at least 150,000, at least 200,000, at least 250,000, at least 500,000, at least 750,000, at least 1,000,000, or at least 2,000,000.

In some embodiments, the positive charge density of the chemical agent on the printed image is at least 0.5 meq/g, at least 1 meq/g, at least 2 meq/g, at least 3 meq/g, at least 4 meq/g, at least 5 meq/g, 6 meq/g, at least 7 meq/g, at least 8 meq/g, at least 9 meq/g, at least 10 meq/g, at least 11 meq/g, at least 12 meq/g, at least 13 meq/g, at least 14 meq/g, at least 15 meq/g, at least 16 meq/g, at least 17 meq/g, at least 18 meq/g, at least 19 meq/g, or at least 20 meq/g of chemical agent.

In some embodiments the polymer on the printed image is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer (Viviprint 131), a vinyl caprolactam-dimethylaminopropyl methacryamide hydroxyethyl methacrylate copolymer (Viviprint 200), a quaternized copolymer of vinyl pyrrolidone and dimethylaminoethyl methacrylate with diethyl sulfate (Viviprint 650), a guar hydroxypropyltrimonium chloride, and a hydroxypropyl guar hydroxypropyltrimonium chloride. In some embodiments the polymer in the printed image is polyethylene imine.

In some embodiments, a surface concentration of nitrogen at the surface distal to the substrate on which the printed ink image rests exceeds a bulk concentration of nitrogen within the bulk of the ink image, the bulk concentration being measured at a depth of at least 30 nanometers, at least 50 nanometers, at least 100 nanometers, at least 200 nanometers, or at least 300 nanometers below the ink image surface distal to the substrate, and the ratio of the surface concentration to the bulk concentration is at least 1.1 to 1. In some embodiments, the bulk concentration is measured at a depth of at least 30 nm from the ink image surface distal to the substrate.

There is also provided, in accordance with an embodiment of the invention, a water-based inkjet ink formulation comprising: (a) a solvent containing water and, optionally, a co-solvent, said water constituting at least 8 wt. % of the formulation; (b) at least one colorant dispersed or at least partly dissolved within the solvent, the colorant constituting at least 1 wt. % of the formulation; and (c) an organic polymeric resin, which is dispersed or at least partially dissolved within the solvent, the resin constituting 6 to 40 wt. % of the formulation, wherein the average molecular weight of the resin is at least 8,000, the ink formulation having at least one of (i) a viscosity of 2 to 25 centipoise (cP) at at least one temperature in the range of 20-60° C. and (ii) a surface tension of not more than 50 milliNewton/m (mN/m) at at least one temperature in the range of 20-60° C.; and wherein at least one of the following two statements is true: (1) the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity; and (2) the weight ratio of the resin to the colorant is at least 1:1.

In some embodiments, the ink is such that, when substantially dried, (a) at at least one temperature in the range of 90° C. to 195° C., the dried ink has a first dynamic viscosity in the range of 1,000,000 ($1 \times 10^6$) cP to 300,000,000 ($3 \times 10^8$) cP, and (b) at at least one temperature in the range of 50° C. to 85° C., the dried ink has a second dynamic viscosity of at least 80,000,000 ($8 \times 10^7$) cP, wherein the second dynamic viscosity exceeds the first dynamic viscosity. In some embodiments, the first dynamic viscosity is at most $25 \cdot 10^7$ cP, at most $20 \cdot 10^7$ cP, at most $15 \cdot 10^7$ cP, at most $12 \cdot 10^7$ cP, at most $10 \cdot 10^7$ cP, at most $9 \cdot 10^7$ cP, at most $8 \cdot 10^7$ cP, or at most $7 \cdot 10^7$ cP. In some embodiments, the first dynamic viscosity is at least $2 \times 10^6$ cP, at least $4 \times 10^6$ cP, at least $5 \times 10^6$ cP, at least $6 \times 10^6$ cP, at least $7 \times 10^6$ cP, at least $8 \times 10^6$ cP, at least $9 \times 10^6$ cP, at least $1 \times 10^7$ cP, at least $1.1 \times 10^7$ cP, at least $1.2 \times 10^7$ cP, at least $1.3 \times 10^7$ cP, at least $1.4 \times 10^7$ cP, at least $1.5 \times 10^7$ cP, at least $1.6 \times 10^7$ cP, at least $2.5 \times 10^7$ cP, or at least $4 \times 10^7$ cP. In some embodiments, the first dynamic viscosity is within a range of $10^6$ cP to $2.5 \cdot 10^8$ cP, $10^6$ cP to $2.0 \cdot 10^8$ cP, $10^6$ cP to $10^8$ cP, $3 \cdot 10^6$ cP to $10^8$ cP, $5 \cdot 10^6$ cP to $3 \cdot 10^8$ cP, $5 \cdot 10^6$ cP to $3 \cdot 10^8$ cP, $8 \cdot 10^6$ cP to $3 \cdot 10^8$ cP, $8 \cdot 10^6$ cP to $10^8$ cP, $10^7$ cP to $3 \cdot 10^8$ cP, $10^7$ cP to $2 \cdot 10^8$ cP, $10^7$ cP to $10^8$ cP, $2 \cdot 10^7$ cP to $3 \cdot 10^8$ cP, $2 \cdot 10^7$ cP to $2 \cdot 10^8$ cP, or $2 \cdot 10^7$ cP to $10^8$ cP.

In some embodiments, when the ink when substantially dried has a first dynamic viscosity as previously mentioned, at at least one temperature in the range of 125° C. to 160° C., the first dynamic viscosity of the substantially dried ink is in the range of $10^7$ cP to $3 \times 10^8$ cP. In some of these embodiments, the first dynamic viscosity is at least $1.1 \times 10^7$ cP, at least $1.2 \times 10^7$ cP, at least $1.3 \times 10^7$ cP, or at least $1.4 \times 10^7$ cP; in some of these embodiments the first dynamic viscosity is at most $25 \cdot 10^7$ cP, at most $20 \cdot 10^7$ cP, at most $15 \cdot 10^7$ cP, at most $12 \cdot 10^7$ cP, at most $10 \cdot 10^7$ cP, at most $9 \cdot 10^7$ cP, at most $8 \cdot 10^7$ cP, or at most $7 \cdot 10^7$ cP; in some of these embodiments, the first dynamic viscosity is within a range of $10^7$ cP to $3 \cdot 10^8$ cP, $10^7$ cP to $2 \cdot 10^8$ cP, $10^7$ cP to $10^8$ cP, $2 \cdot 10^7$ cP to $3 \cdot 10^8$ cP, $2 \cdot 10^7$ cP to $2 \cdot 10^8$ cP, or $2 \cdot 10^7$ cP to $10^8$ cP.

In some embodiments, the formulation further comprises a dispersant. In some embodiments, the dispersant constitutes not more than 3.5 wt. %, not more than 3 wt. %, not more than 2.5 wt. %, not more than 2 wt. %, not more than 1.5 wt. %, not more than 1 wt. % or not more than 0.5 wt. % of the formulation.

In some embodiments in which the formulation comprises a dispersant and, when substantially dried, has a first dynamic viscosity as mentioned above, at at least one temperature in the range of 90° C. to 125° C. the first dynamic viscosity of the substantially dried ink is in the range of $4 \times 10^7$ cP to $2 \times 10^8$ cP. In some of these embodiments the first dynamic viscosity is at least $5 \times 10^7$ cP or $6 \times 10^7$ cP; in some of these embodiments the first dynamic viscosity is at most $5 \times 10^7$ cP or $6 \times 10^7$ cP; in some of these embodiments the dispersant is selected from the group consisting of a high molecular weight aminourethane (Disperbyk® 198), a modified polyacrylate polymer (EFKA® 4560, EFKA® 4580), or acrylic block copolymer made by controlled free radical polymerisation (EFKA® 4585, EFKA® 7702), or an ethoxylated non-ionic fatty alcohol (Lumiten® N—OC 30).

In some embodiments in which the inkjet ink formulation when substantially dried has a second dynamic viscosity as mentioned above, the second dynamic viscosity is at least $9 \cdot 10^7$ cP, at least $10^8$ cP, at least $1.1 \cdot 10^8$ cP, at least $1.2 \cdot 10^8$ cP, at least $1.3 \cdot 10^8$ cP, at least $1.4 \cdot 10^8$ cP, at least $1.5 \cdot 10^8$ cP, at least $2.0 \cdot 10^8$ cP, at least $2.5 \cdot 10^8$ cP, at least $3.0 \cdot 10^8$ cP, at least $3.5 \cdot 10^8$ cP, at least $4.0 \cdot 10^8$ cP, at least $5.0 \cdot 10^8$ cP, at least $6 \cdot 10^8$ cP, at least $7.5 \cdot 10^8$ cP, at least $10^9$ cP, at least $2 \cdot 10^9$ cP, at least $4 \cdot 10^9$ cP, or at least $6 \cdot 10^9$ cP.

In some embodiments in which the inkjet ink formulation when substantially dried has a first dynamic viscosity and a second dynamic viscosity as mentioned above, the ratio of the first dynamic viscosity to the second dynamic viscosity is at least 1.2:1, at least 1.3:1, at least 1.5:1, at least 1.7:1, at least 2:1, at least 2.5:1, at least 3:1, at least 3.5:1, at least 4:1, at least 4.5:1, at least 5:1, at least 6:1, at least 7:1, at least 8:1, at least 10:1, at least 15:1, at least 20:1, at least 25:1, at least 50:1, at least 100:1, at least 500:1, or at least 1000:1. In some embodiments, a ratio of said second dynamic viscosity, at 90° C., to said first dynamic viscosity, at 60° C., is at least 1.2:1, at least 1.3:1, at least 1.5:1, at least 1.7:1, at least 2:1, at least 2.5:1, at least 3:1, at least 4:1, at least 4.5:1, at least 5:1, at least 6:1, at least 7:1, or at least 8:1. In some embodiments, the ratio of the first dynamic viscosity to the second dynamic viscosity is at most 30:1, at most 25:1, at most 20:1, at most 15:1, at most 12:1, or at most 10:1.

In some embodiments, the weight ratio of the polymeric resin to the colorant is at least 1:1. In some embodiments, the weight ratio of the polymeric resin to the colorant is at least 1.25:1, at least 1.5:1, at least 1.75:1, at least 2:1, at least 2.5:1, at least 3:1, at least 3.5:1, at least 4:1, at least 5:1, at least 7:1, or at least 10:1. In some embodiments, the weight ratio of the polymeric resin to the colorant is at most 15:1, at most 12:1, at most 10:1, at most 7:1, at most 5:1, at most 4:1, at most 3:1, at most 2.5:1, at most 2:1, or at most 1.7:1.

In some embodiments, the inkjet ink formulation, when substantially dried, has a glass transition temperature ($T_g$) of at most 50° C., at most 47° C., at most 45° C., at most 44° C., at most 43° C., at most 42° C., at most 40° C., at most 39° C., at most 37° C., at most 35° C., at most 32° C., at most 30° C. or at most 28° C.

In some embodiments, the polymeric resin is an acrylic-based polymer selected from an acrylic polymer and an acrylic-styrene copolymer.

In some embodiments, the inkjet ink formulation comprises a co-solvent. In some embodiments, the co-solvent is miscible with the water. In some embodiments the co-solvent is miscible with water at the at least one particular temperature in the range of 20° C. to 60° C., whereby the solvent is a single-phase solvent. In some embodiments, the co-solvent is selected to provide the single-phase solvent with a reduced vapor pressure relative to water at the at least one particular temperature in the range of 20° C. to 60° C. In some embodiments, the co-solvent is selected from the group consisting of ethylene glycol, diethylene glycol, propylene glycol, glycerol, PEG 400, N-methyl pyrrolidone, and mixtures thereof. In some embodiments, the co-solvent is not a water-soluble polymer. In various embodiments, the co-solvent is not a water-soluble polymer having an average molecular weight greater than 1000, greater than 750, or greater than 500. In various embodiments, the co-solvent constitutes at least 5 wt. %, at least 10 wt. %, at least 15 wt. %, at least 20 wt. %, at least 25 wt. %, at least 30 wt. %, at least 35 wt. %, or at least 40 wt. % of the formulation. In some embodiments, the co-solvent constitutes not more than 40 wt. %, not more than 35 wt. %, not more than 30 wt. %, not more than 25 wt. %, not more than 20 wt. %, not more than 15 wt. %, not more than 10 wt. %, or not more than 5 wt. % of the formulation. In some embodiments, the ratio of co-solvent to water, on a weight-weight basis, is within the range of 0.2:1 to 1.5:1.

In some embodiments, the inkjet ink formulation further comprises a surfactant, in addition to the polymeric resin, colorant, water and optional co-solvent. In some embodiments, the surfactant is present in an amount of not more than 2 wt. %, not more than 1.5 wt. %, not more than 1 wt. %, or not more than 0.5 wt. %. In some embodiments, the surfactant is a non-ionic surfactant. In some embodiments, the surfactant is an anionic surfactant. In some embodiments, the surfactant is a cationic surfactant.

In some embodiments, the polymeric resin has a $T_g$ below 50° C. In various embodiments, the polymeric resin has a $T_g$ that is at most 48° C., at most 47° C., at most 45° C., at most 40° C., at most 35° C., or at most 30° C.

In some embodiments, the average molecular weight of the polymeric resin is not more than 70,000, not more than 65,000, not more than 60,000, not more than 55,000, not more than 50,000, not more than 45,000 or not more than 40,000. In some embodiments, the average molecular weight of the polymeric resin is at least 10,000, at least 15,000, at least 20,000, at least 25,000 or at least 30,000.

In some embodiments, the average molecular weight of the polymeric resin is at least 70,000, at least 80,000, at least 100,000, at least 120,000, at least 140,000, at least 160,000, at least 180,000, or at least 200,000.

In some embodiments, the colorant comprises a pigment or a mixture of pigments. In some embodiments, the average particle size ($D_{50}$) of the at least one pigment is not more than 120 nm, not more than 110 nm, not more than 100 nm, not more than 90 nm, not more than 80 nm, not more than 70 nm, not more than 65 nm, or not more than 60 nm. In some embodiments, the average particle size ($D_{50}$) of the pigment is at least 20 nm, at least 25 nm, at least 30 nm, at least 35 nm, at least 40 nm, at least 45 nm, at least 50 nm, at least 55 nm, at least 60 nm, at least 65 nm, or at least 70 nm. In various embodiments, the average particle size ($D_{50}$) of the pigment is in the range of 20-120 nm, in the range of 20-110 nm, in the range of 20-100 nm, in the range of 20-90 nm, in the range of 20-80 nm, in the range of 20-70 nm, in the range of 30-120 nm, in the range of 30-110 nm, in the range of 30-100 nm, in the range of 30-90 nm, in the range of 30-80 nm, in the range of 30-70 nm, in the range of 35-120 nm, in the range of 35-110 nm, in the range of 35-100 nm, in the range of 35-90 nm, in the range of 35-80 nm, in the range of 35-70 nm, in the range of 40-120 nm, in the range of 40-110 nm, in the range of 40-100 nm, in the range of 40-90 nm, in the range of 40-80 nm, or in the range of 40-70 nm.

In some embodiments, water constitutes at least 10 wt. %, at least 15 wt. %, at least 20 wt. %, at least 25 wt. %, at least 30 wt. %, at least 35 wt. %, at least 40 wt. %, at least 45 wt. %, at least 50 wt. %, at least 55 wt. %, at least 60 wt. %, at least 65 wt. %, at least 70 wt. %, at least 75 wt. %, or at least 80 wt. % of the formulation. In some embodiments, water constitutes not more than 85 wt. %, not more than 80 wt. %, not more than 75 wt. %, not more than 70 wt. %, not more than 65 wt. %, not more than 60 wt. %, not more than 55 wt. %, not more than 50 wt. %, not more than 45 wt. %, or not more than 40 wt. % of the formulation.

In some embodiments, the polymeric resin is a negatively chargeable resin. In some embodiments, the polymer resin is negatively charged.

In some embodiments, the ink when substantially dried contains at least 1.2 wt. %, at least 1.5 wt. %, at least 2 wt. %, at least 3 wt. %, at least 4 wt. %, at least 6 wt. %, at least 8 wt. %, or at least 10 wt. % of the colorant.

In some embodiments, the ink when substantially dried contains at least 5 wt. %, at least 7 wt. %, at least 10 wt. %, at least 15 wt. %, at least 20 wt. %, at least 30 wt. %, at least 40 wt. %, at least 50 wt. %, at least 60 wt. %, or at least 70 wt. % of the polymeric resin.

In some embodiments, a solubility of the resin in water, at a temperature within a temperature range of 20° C. to 60° C., and at a pH within a pH range of 8.5 to 10, is at least 3%, at least 5%, at least 8%, at least 12%, at least 18%, or at least 25%, by weight of dissolved resin to weight of solution.

In some embodiments, the inkjet ink formulation comprises a pH-raising compound. In some embodiments, the pH-raising compound constitutes not more than 2 wt. %, not more than 1.5 wt. %, or not more than 1 wt. % of the formulation.

There is also provided, in accordance with an embodiment of the invention, an inkjet ink concentrate comprising: (a) a solvent containing water and, optionally, a co-solvent; at least one colorant dispersed or at least partly dissolved within said solvent; and an organic polymeric resin, which is dispersed or at least partially dissolved within said solvent, wherein the average molecular weight of said resin is at least 8,000, and (d) optionally, at least one of a surfactant, a dispersant, and a pH raising compound; wherein the concentrate, when diluted with a solvent comprising water and a co-solvent, yields an aqueous inkjet formulation as described herein. In some embodiments, the concentrate must be diluted with at least 50%, at least 100%, at least 150%, at least 200%, at least 250%, at least 300%, least 350% or at least 400% solvent on a weight/weight basis relative to the concentrate to yield the aqueous inkjet ink formulation. In some embodiments, the co-solvent is selected from the group consisting of glycerol, propylene glycol, ethylene glycol, diethylene glycol, N-methyl pyrrolidone, PEG 400, and mixtures thereof.

In some embodiments the inkjet ink formulation has both a viscosity of 2 to 25 cP at at least one temperature in the range of 20-60° C. and a surface tension of not more than 50 (mN/m) at at least one temperature in the range of 20-60° C.

In various embodiments, the second dynamic viscosity is not more than $6 \times 10^9$ cP, not more than $5 \times 10^9$ cP, not more than $4 \times 10^9$ cP, not more than $3 \times 10^9$ cP, not more than $2 \times 10^9$ cP, not more than $1 \times 10^9$ cP, not more than $9 \times 10^8$ cP, not more than $8 \times 10^8$ cP, not more than $7 \times 10^8$ cP, not more than $6 \times 10^8$ cP, not more than $5 \times 10^8$ cP, not more than $4 \times 10^8$ cP, not more than $3 \times 10^8$ cP, or not more than $2 \times 10^8$ cP.

In some embodiments, the polymeric resin comprises primarily or exclusively one or more negatively chargeable polymers, such as polyanionic polymers. By a "negatively chargeable polymer" or "negatively chargeable polymer resin" is meant a polymer or polymeric resin which has at least one proton which can easily be removed to yield a negative charge; as used herein, the term refers to an inherent property of the polymer, and thus may encompass polymers which are in an environment in which such protons are removed, as well as polymers in an environment in which such protons are not removed. In contrast, the term "a negatively charged polymer resin" refers to a resin in an environment in which one or more such protons have been removed. Examples of negatively chargeable groups are carboxylic acid groups (—COOH), including acrylic acid groups (—CH$_2$=CH—COOH) and methacrylic acid groups (—CH$_2$=C(CH$_3$)—COOH), and sulfonic acid groups (—SO$_3$H). Such groups can be covalently bound to polymeric backbones; for example styrene-acrylic copolymer resins have carboxylic acid functional groups which readily lose protons to yield negatively-charged moieties. Many polymers suitable for use in embodiments of the invention, when dissolved in water, will be negatively charged; others may require the presence of a pH raising compound to be negatively charged. Commonly, polymers will have many such negatively chargeable groups on a single polymer molecule, and thus are referred to as polyanionic polymers. Examples of polyanionic polymers include, for instance, polysulfonates such as polyvinylsulfonates, poly(styrenesulfonates) such as poly(sodium styrenesulfonate) (PSS), sulfonated poly(tetrafluoroethylene), polysulfates such as polyvinylsulfates, polycarboxylates such as acrylic acid polymers and salts thereof (e g ammonium, potassium, sodium), for instance, those available from BASF and DSM Resins, methacrylic acid polymers and salts thereof (e.g. EUDRAGIT®, a methacrylic acid and ethyl acrylate copolymer), carboxymethylcellulose, carboxymethylamylose and carboxylic acid derivatives of various other polymers, polyanionic peptides and proteins such as homopolymers and copolymers of acidic amino acids such as glutamic acid, aspartic acid or combinations thereof, homopolymers and copolymers of uronic acids such as mannuronic acid, galacturonic acid and guluronic acid, and their salts, alginic acid and its salts, hyaluronic acid and its salts, gelatin, carrageenan, polyphosphates such as phosphoric acid derivatives of various polymers, polyphosphonates such as polyvinylphosphonates, as well as copolymers, salts, derivatives, and combinations of the preceding, among various others. In some embodiments, the polymeric resin comprises an acrylic-based polymer, viz. a polymer or copolymer made from acrylic acid or an acrylic acid derivative (e.g. methacrylic acid or an acrylic acid ester), such as polyacrylic acid or an acrylic acid-styrene copolymer. Nominally, the polymeric resin may be, or include, an acrylic styrene copolymer. In some embodiments the polymeric resin comprises primarily or exclusively an acrylic-based polymer selected from an acrylic polymer and an acrylic-styrene copolymer. In some embodiments, the polymeric resin comprises an aliphatic polyurethane. In some instances, the polymeric resin is at least partly water soluble; in some instances, the polymeric resin is water dispersible, and may be provided as an emulsion or a colloid. Examples of such materials that are available commercially that have been found suitable for use in embodiments of the present invention include Joncryl 142-E, Joncryl 637, Joncryl 638, Joncryl 8004, Joncryl HPD 296, Neocryl BT-26, Neocryl BT-100, Neocryl BT-102, and Neocryl BT-9. (Joncryl® and Neocryl® are registered trademarks of BASF Corporation and DSM, respectively.)

In various embodiments, taken together the water, cosolvent if present, colorant, and polymeric resin constitute at least 65 wt. %, at least 70 wt. %, at least 75 wt. %, at least 80 wt. %, at least 85 wt. %, at least 90 wt. % or at least 95 wt. % of the formulation.

In some embodiments, the colorant contains less than 5% dye. In some embodiments, the colorant is substantially free of a dye.

In some embodiments, the colorant comprises a dye. In some embodiments, the colorant contains less than 5% pigment. In some embodiments, the colorant comprises a dye and is substantially free of pigment.

In various embodiments, the polymeric resin constitutes not more than 20 wt. %, not more than 19 wt. %, not more than 18 wt. %, not more than 17 wt. %, not more than 16 wt. %, not more than 15 wt. %, not more than 14 wt. %, not more than 13 wt. %, not more than 12 wt. %, not more than 11 wt. %, not more than 10 wt. %, not more than 9 wt. %, or not more than 8 wt. % of the formulation.

In some embodiments, the polymeric resin is at least partially soluble in the solvent. In some embodiments, the polymeric resin is partially soluble in the solvent at a pH of 8.5-10. In various embodiments, at at least one temperature in the range of 20-60° C., the solubility of the polymeric resin in water is at least 2%, at least 3%, at least 5%, at least 7.5%, or at least 10% on a resin-to-water weight-weight basis.

In some embodiments, at at least one temperature in the range of 60 to 100° C., the polymeric resin has a viscosity of less than $10^{11}$ cP, of $5\times10^{10}$ cP or less, of $10^{10}$ cP or less, of $5\times10^{9}$ cP or less, of $10^{9}$ cP or less, or of $5\times10^{8}$ cP or less.

In some embodiments, at at least one temperature in the range of 125 to 170° C., the polymeric resin has a viscosity of $5\times10^{8}$ cP or less, of $10^{8}$ cP or less, or of $5\times10^{7}$ cP or less.

In some embodiments, the polymeric resin consists predominantly of acrylic styrene copolymer. In some embodiments, the polymeric resin consists essentially of acrylic styrene copolymer. In various embodiments, the weight ratio of the acrylic styrene copolymer to the total amount of polymeric resin is at least 0.5, at least 0.6, at least 0.7, at least 0.8, at least 0.9, at least 0.95, or substantially 1.

In some embodiments, at a temperature in the range of 20-60° C. the viscosity of the formulation is within a range of 2-25 cP. In some embodiments, the viscosity in this temperature range is at least 2 cP, at least 3 cP, at least 4 cP, at least 5 cP, or at least 6 cP. In some embodiments, the viscosity in this temperature range is not more than 25 cP, not more than 22 cP, not more than 20 cP, not more than 18 cP, or not more than 15 cP.

In various embodiments, the surface tension of the formulation at at least one particular temperature within a temperature range of 20° C. to 60° C. is not more than 50 milliNewton/m, not more than 45 mN/m, or not more than 40 mN/m. In various embodiments, the surface tension of the formulation at this temperature is at least 18 mN/m, at least 20 mN/m, or at least 22 mN/m.

In some embodiments, other than the polymeric resin and, if present, the dispersant, the formulation is substantially free of water soluble polymer. In some embodiments, the formulation is substantially free of saccharide. In some embodiments, the formulation is substantially free of wax. In some embodiments, other than a pH-controlling agent, the formulation is substantially free of salt. In some embodiments, other than salts having the polymeric resin and/or the dispersant, if present, as one of the ions in the salt, the formulation is substantially free of salt. In some embodiments, the formulation is substantially free of precipitant. In some embodiments, the formulation is substantially free of a dye insolubilizing agent. In some embodiments, the formulation is substantially free of a coagulating agent. In various embodiments, the formulation contains less than 5 wt. % inorganic filler particles (such as silica particulates, titania particulates and alumina particulates), less than 3 wt. % inorganic filler particles, less than 2 wt. % inorganic filler particles, less than 1 wt. % inorganic filler particles, less than 0.5 wt. % inorganic filler particles, or less than 0.1 wt. % filler particles. In some embodiments, the formulation is substantially free of inorganic filler particles. In various embodiments, the formulation is substantially free of a co-solvent having a molecular weight of 1000 or higher, having a molecular weight of 750 or higher, or having a molecular weight of 500 or higher. In some embodiments, the co-solvent of which the formulation is substantially free is a polymer having a plurality of hydroxyl groups. In some embodiments, the polymer having a plurality of hydroxyl groups is selected from a polyethylene glycol and a polypropylene glycol. In some embodiments, the formulation is devoid or substantially devoid of oils such as mineral oils and vegetable oils (e.g. linseed oil and soybean oil), or other oils used in offset ink formulations, and thus contains at most 1%, at most 0.5%, at most 0.1%, or at most 0%, by weight, of one or more oils, cross-linked fatty acids, or fatty acid derivatives produced upon air-drying.

In various embodiments, the total amount of material in the formulation which remains as solids when the formulation is substantially dried constitutes less than 20 wt. %, less than 19 wt. %, less than 18 wt. %, less than 17 wt. %, less than 16 wt. %, less than 15 wt. %, less than 14 wt. %, less than 13 wt. %, or less than 12 wt. % of the formulation.

In various embodiments, the colorant and the polymeric resin together constitute at least 50 wt. %, at least 55 wt. %, at least 60 wt. %, at least 65 wt. %, at least 70 wt. %, at least 75 wt. %, at least 80 wt. %, at least 85 wt. %, at least 90 wt. %, at least 95 wt. % or at least 97 wt. % of the material in the formulation which remains as solids when the formulation is substantially dried.

In accordance with an embodiment of an invention, in a printing process such as that described above or as will described in more detail hereinbelow, in which an aqueous inkjet ink containing a negatively chargeable polymeric resin is jetted onto a hydrophobic release layer prior to being transferred to a substrate, there is provided a method for treating the release layer prior to the jetting of the aqueous ink onto the release layer, the method comprising contacting the release layer with an aqueous solution or dispersion of a positively chargeable polymeric chemical agent.

DETAILED DESCRIPTION

As mentioned above, aspects of the presently claimed invention pertain to a particular aspect of a novel printing process and apparatus for indirect digital inkjet printing using aqueous inks.

Aspects of the presently claimed invention pertain to aqueous inkjet ink formulations. These formulations may be used in indirect printing systems having an intermediate transfer member. In particular the present formulations may be used as part of and in conjunction with, respectively, a novel printing process and system for indirect digital inkjet printing, other novel aspects of which have been described and claimed in other applications of the same applicant which were filed on or about Mar. 5, 2013: PCT/IB2013/000840, published as WO 2013/132345 and entitled "INK FILM CONSTRUCTIONS"; PCT/IB2013/051718, published as WO 2013/132420 and entitled "PRINTING SYSTEM"; PCT/IB2013/000822, published as WO 2013/132343 and entitled "INK FILM CONSTRUCTIONS"; PCT/IB2013/051743, published as WO 2013/132432 and entitled "INTERMEDIATE TRANSFER MEMBERS FOR USE WITH INDIRECT PRINTING SYSTEMS"; PCT/IB2013/051727, published as WO 2013/132424 and entitled "CONTROL APPARATUS AND METHOD FOR A DIGITAL PRINTING SYSTEM"; PCT/IB2013/051751, published as WO 2013/132438 and entitled "PROTONATABLE INTERMEDIATE TRANSFER MEMBERS FOR USE WITH INDIRECT PRINTING SYSTEMS"; PCT/IB2013/051716, published as WO 2013/132418 and entitled "DIGITAL PRINTING PROCESS"; PCT/IB2013/051717, published as WO 2013/132419 and entitled "DIGITAL PRINTING SYSTEM"; PCT/IB2013/000782, published as WO 2013/132340 and entitled "INK FILM CONSTRUCTIONS"; PCT/IB2013/050245, published as WO 2013/132356 and entitled "APPARATUS AND METHODS FOR MONITORING OPERATION OF A PRINTING SYSTEM"; and PCT/IB2013/051719, published as WO 2013/136220 and entitled "ENDLESS FLEXIBLE BELT FOR A PRINTING SYSTEM". The contents of these applications are incorporated by reference herein for all purposes, as if fully set forth herein.

Briefly, the printing process comprises directing droplets of an aqueous inkjet ink onto an intermediate transfer member having a hydrophobic release layer to form an ink image on the release layer, the ink including a negatively charged polymeric resin and a colorant in an aqueous carrier. The term "release layer" is used herein to denote the hydrophobic outer surface of the intermediate transfer member, and while in some instances that outer surface may be part of a layer that is readily distinguishable from the rest of the intermediate transfer member, in theory it is possible that the intermediate transfer member has a uniform construction, in which case the outer surface will not, strictly speaking, be part of a separate layer. Upon impinging upon the intermediate transfer member, each ink droplet in the ink image spreads to form an ink film having a pancake-like structure. The ink is then dried while the ink image is on the intermediate transfer member, generally while being transported by the intermediate transfer member, by evaporating the aqueous carrier from the ink image to leave a residue film of resin and coloring agent. The residue film is then transferred to a substrate.

Upon impinging upon the surface of the intermediate transfer member, each ink droplet tends to spread out into a pancake-like structure due to the kinetic energy of the droplet itself. However, because the ink used in the process described above is aqueous, but the release layer of the intermediate transfer member is hydrophobic, the ink droplets tend to bead on the transfer member. The term "to bead" is used herein to describe the action of surface tension to cause a pancake or disk-like film to contract radially and increase in thickness so as to form a bead, that is to say a near-spherical globule. Thus the chemical compositions of the ink and of the chemical agent which applied to the surface of the intermediate transfer member are selected, inter alia, so as to counteract the tendency of the ink film produced by each droplet to bead under the action of the surface tension of the aqueous carrier, without causing each droplet to spread by wetting the surface of the intermediate transfer member. Without wishing to be bound by theory, it is presently believed that, in the case of the presently claimed invention, this is due to mutually attractive intermolecular forces between molecules in the region of each droplet nearest the surface of the intermediate transfer member and molecules on the surface of the intermediate transfer member itself.

In the context of this patent application, "chargeable nitrogen atom" refers to both a nitrogen atom which may be positively charged at acidic pH, such as a primary, secondary or tertiary amine nitrogen atom, which as is known in the art function as Bronsted bases to abstract a proton from a Bronsted acid to form the corresponding ammonium cation, as well as to a quaternary ammonium ion, which bears a permanent positive charge. In the context of this patent application, when referring to the chemical agent, "positive charge density of X" means the chemical agent has X milliequivalents of charge per gram of chemical agent at pH 4.5.

A hydrophobic outer surface on the intermediate transfer member is desirable as it assists in the eventual transfer of the residue film to the substrate. Such a hydrophobic outer surface or release layer is, however, undesirable during ink image formation, among other reasons because bead-like ink droplets cannot be stably transported by a fast moving intermediate transfer member, and because they result in a thicker film with less coverage of the surface of the substrate.

In some embodiments, the hydrophobic release layer may comprise positively chargeable molecules or moieties, such as amino silicones as further detailed in PCT application No. PCT/IB2013/051751, published as WO 2013/132438.

The presently claimed invention sets out to preserve, or freeze, the thin pancake shape of each ink droplet, that is caused by the flattening of the ink droplet on impacting the surface of the intermediate transfer member, despite the hydrophobicity of the surface of the intermediate transfer member, while also facilitating transfer of the ink droplet so frozen to a substrate.

Although so-called "wetting agents", viz. agents that reduce the surface tension of ink droplets on a particular surface, are known in the art for use with other types of transfer members or for use with non-aqueous inks on hydrophobic surfaces, these are often unsatisfactory in the contexts in which they are used and unsatisfactory for use with the combination of aqueous inks on hydrophobic transfer member surfaces. Inter alia, the use of wetting agents can result in droplets on the surface of the transfer member that undesirably spread or have rough edges, which results in a printed substrate of less than ideal quality.

The present invention facilitates printing using an aqueous ink and an intermediate transfer member having a hydrophobic surface, by applying to the surface of the transfer member to which the ink is applied—i.e. by applying to the hydrophobic release layer—a small amount, preferably in the form of a thin layer, of chemical agent that reduces the tendency of the aqueous inkjet ink droplet that has been printed onto the release layer to contract. Measurements show that the contact angle of water on a hydrophobic release layer so treated remains high, indicating that, in contrast to wetting agents, treatment with the chemical agent does not result in a loss of surface tension. Therefore, the chemical agent of the present disclosure advantageously reduces droplet contraction, without causing an undesired spreading of the droplet much beyond its initial impact pancake shape. Electron micrographs of aqueous inkjet inks printed onto a release layer so treated, then dried while still on the release layer and then transferred to a paper substrate show that the edges of such ink droplets are sharper than the edges of ink droplets transferred to paper by other means. The chemical agent thus fixes the ink film to the release layer, although it will be appreciated that such fixation is weaker than the subsequent adhesion of the resin in the ink film residue to the substrate.

Application of the chemical agent in accordance with some embodiments of the invention results in positive charge on at least portions of the release layer. This may be achieved, for example, by applying to the surface of the intermediate transfer member molecules having one or more Bronsted base functional groups and in particular nitrogen-containing molecules, under conditions in which the molecules bear positive charge. Suitable positively charged or chargeable groups include primary amines, secondary amines, tertiary amines, and quaternary ammonium moieties, and the chemical agent may contain more than one such group. Such groups can be covalently bound to polymeric backbones or constitute part of such backbones, as is the case in, for example, polyethylene imine (both linear and branched, the latter of which may contain all three types of amines), poly(diallyldimethylammonium chloride), poly(4-vinylpyridine), polyallylamine, vinyl pyrrolidone-dimethylaminopropyl methacrylamide co-polymer, vinyl caprolactam-dimethylaminopropyl methacryamide hydroxyethyl methacrylate copolymer, quaternized copolymer of vinyl pyrrolidone and dimethylaminoethyl methacrylate with diethyl sulfate, guar hydroxypropyltrimonium chloride, and hydroxypropyl guar hydroxypropyltrimonium chloride. Classes of polycations that may be used as chemical agents to be applied to the release layer include, for instance, polyamines, including poly(amino methacrylates) including poly(dialkylaminoalkyl methacrylates) such as poly(dimethylaminoethyl methacrylate) and poly(diethylaminoethyl methacrylate), polyvinylamines, polyvinyl-pyridines including quaternary polyvinylpyridines such as poly(N-ethyl-4-vinylpyridine), poly(vinylbenzyltrimethylamines), polyallylamines such as poly(allylamine hydrochloride) (PAH) and poly(diallyldialklylamines) such as poly(diallyldimethylammonium chloride), polyamidoamines, polyimines including polyalkyleneimines such as polyethyleneimines, polypropyleneimines and ethoxylated polyethyleneimines, and polycationic polysaccharides such as cationic starch and chitosan, as well as copolymers, salts, derivatives and combinations of the preceding, among various others. It will be appreciated that the chemical agent should be chosen to withstand the temperature at which the printing process is carried out (see detailed description of such a process below), at least for a time sufficient to allow jetting and drying of the ink on the dried chemical agent, a period of time which is usually on the order of a few seconds.

Whether the positively chargeable functional groups of the molecules on the release layer are part of the release layer itself (e.g., if the release layer has protonatable elastomers such as amino silicones) or whether they are part of the chemical agent applied on the electrically neutral hydrophobic release layer (e.g. silanol terminated silicones), such positively chargeable functional groups of the molecules on the release layer may interact with negatively charged functional groups of molecules of the ink. Suitable negatively charged or negatively chargeable groups include carboxylic acid groups (—COOH), including acrylic acid groups (—CH$_2$=CH—COOH) and methacrylic acid groups (—CH$_2$=C(CH$_3$)—COOH), and sulfonic acid groups (—SO$_3$H). Such groups can be covalently bound to polymeric backbones; for example styrene-acrylic copolymer resins have carboxylic acid functional groups which readily lose protons to yield negatively-charged moieties.

The contacting of the surface of the intermediate transfer member with a positively charged conditioning/treatment solution or dispersion can be viewed as applying molecules that are adsorbed to the surface of the intermediate transfer member and present a net positive charge with which some of the negatively charged molecules in the ink may interact. It will be appreciated that the chemical agent should preferably be quickly adsorbed onto the release layer, e.g. by electrostatic attraction between the charged nitrogen atoms and hydroxyl groups present in the release layer as a result of the condensation reaction employed to form the release layer, but that the strength of this attraction should be less than the attraction between the chemical agent and the ink and the attraction between the ink the substrate.

Thus, among the factors to be taken into account in selecting the chemical agent for use in treating the release layer, charge density and molecular weight have been found to be two important parameters. In cases in which the positive charge is provided by protonation of nitrogen atoms (or by the presence of quaternary ammonium ions), the percentage of nitrogen atoms in the polymer as a function of the weight of the polymer may serve as a proxy for charge density. Thus, for example, it has been found that guar hydroxylpropyltrimonium chloride having a high molecular weight but relatively small percentage of nitrogen atoms (1.4 wt. %), and thus a relatively low charge density, nevertheless functions as an effective chemical agent at a printing temperature of 150° C. On the other hand, polyethylene imines, which have a much higher percentage of nitrogen (around 32% in linear form), were found to be effective with an average molecular weight of as low as 800 in one case, as well as with higher average molecular weights. Thus while the charge densities of PEI polymers are generally in the range of 16-20 meq/g of material, in one case a PEI having a charge density of 8 meq/g was found to be suitable. Other suitable polymers include poly(diallyldimethylammonium chloride)

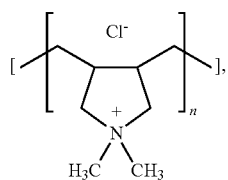

polyallylamine

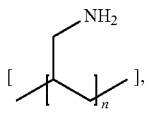

and poly(4-vinylpyridine)

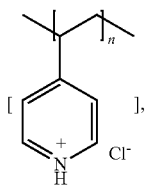

persons skilled in the art will appreciate other suitable polymers. However, as noted above, charge density alone is not determinative: as reported below, a large number of charged species, but of smaller size than the polymers tested, were also tested and found to be far less effective than the polymers. Thus, in some embodiments, the chemical agent has an average molecular weight of at least 2,000, at least 10,000, and preferably at least 25,000. Of the small molecules tested, the one which yielded the best results was pentahydroxy(tetradecanoato)di-chromium. The chemical agent should also be water dispersible, preferably water soluble, and should be able to quickly (i.e. in under a second from application to the release layer, e.g. in 0.5, 0.1, 0.05, 0.01, 0.005 or 0.001 seconds or less, and preferably instantaneously) affix itself to the release layer.

As noted above, the hydrophobic release layer of the intermediate transfer member may be silicon-based, e.g. the product of cross-linking by condensation a silanol-terminated polydialkylsiloxane, such as a polymer of formula (I):

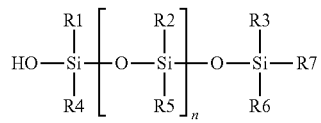

where R1 to R6 are each independently a $C_1$ to $C_6$ hydrocarbon group (saturated or unsaturated, linear or branched), R7 is selected from the group consisting of OH, H or a $C_1$ to $C_6$ hydrocarbon group (saturated or unsaturated, linear and/or branched); and, n is an integer from 50 to 400. In some cases, n is an integer between 200 and 350. In some instances, the silicone has a molecular weight of between 15,000 to 26,000 g/mole, e.g. 16,000 to 23,000 g/mol, prior to crosslinking. In one example of such a material, the silicone is a silanol-terminated polydimethylsiloxane, i.e. R1 to R6 are all $CH_3$ and R7=OH. The crosslinker, which may be present in an amount between e.g. 5 to 20 wt. %, such as 9 to 12 wt. %, relative to the polymer prior to crosslinking, may be a oligomeric condensate of a polyethylsilicate monomer, such as Silopren E 0.7 (Momentive), PSI023 (Gelest) and Ethylsilicate 48 (Colcoat). Preferably, the silicon polymer is made by condensation curing.

Release layers so prepared are amenable to pre-treatment with a conditioning agent as afore mentioned. Although in principle the aqueous ink may be jetted onto the chemical agent-treated release layer while the chemical agent is still wet in solution, it is preferable that the chemical agent generally be dry prior to the jetting of the ink, and in practice this is the case, as the conditioning agent may be immediately removed following application (e.g. by air flow) and release layer will generally be heated, resulting in drying of the chemical agent solution before jetting of the ink occurs, so that the ink droplets are directed onto a substantially dry surface.

Aqueous inkjet inks suitable for use in conjunction with embodiments of the present invention contain water-soluble or water-dispersible colorants, e.g. dyes or nano pigments, and a water-dispersible or water-soluble polymeric resin. As noted above, such resins, such as styrene-acrylic copolymers, contain moieties such as free carboxyl groups that are negatively chargeable (i.e. they have protons which they will readily give up) and are generally negatively charged under the conditions of use (e.g. at alkaline pH). In addition to being suitable for jetting from an inkjet printhead, the inks should also be formulated so as to transfer well from the intermediate transfer member to the substrate under the conditions of use, and preferably should be susceptible to having most or substantially all of the solvent and, if present, other volatiles removed therefrom prior to the transfer.

It has been found that contacting the hydrophilic release layer with a small amount of positively charged polymeric material so that the positively charged material is disposed thereupon (e.g. as a thin layer) suitably reduces the tendency of the aqueous inkjet ink droplet that has been jetted onto the release layer to contract. In this connection, it should be noted that not all positively-charged materials are suitable to this end. For example, low molecular weight quaternary amines were found to provide little improvement in the transfer of the ink to a paper substrate, whereas polymeric compounds containing amines significantly improved such transfer. An example of a suitable ink formulation is described below.

The chemical agent may be applied to the release layer as a dilute, preferably aqueous, solution or dispersion, for example at a concentration of about 1 wt. %, 0.5 wt. %, 0.3 wt. %, 0.2 wt. % or 0.1 wt. % or less of the chemical agent, preferably under conditions in which the chemical agent is positively charged, e g amine nitrogen atoms contained therein are in protonated form as the corresponding ammonium ions. The solution or dispersion may be and preferably is heated to evaporate the solvent prior to the ink image formation, whereby the ink droplets are directed onto a substantially dry surface. Furthermore, it is only necessary to apply a sufficient amount of the chemical agent so that, once dry on the release layer, the chemical agent will retard the contraction of aqueous inkjet ink droplets that have been jetted on the release layer, without substantially affecting the release properties of the release layer. The chemical agent so applied and dried may thus form a thin layer, preferably not more than a few nanometers thick. Application of excess solution containing the chemical agent will not only increase the time required for the solution to dry before the ink is printed onto the release layer but, if too much chemical agent is applied, may also reduce the effectiveness of the transfer of the dried ink to the substrate. In some embodiments, the chemical agent on which ink has been printed will transfer with that ink to the substrate, forming a sandwich in which the chemical agent rests on the ink which lies on the substrate. Since the ink itself will typically form a layer having a thickness several orders of magnitude greater than that of the chemical agent (e.g. ~100-400 nm thickness after drying), the presence of a layer of chemical agent a few nanometers thick on ink on the substrate will not appreciably affect the properties of that ink, such as glossiness or optical density. This is another reason why the amount of chemical agent should ideally be kept to a minimum: an unnecessarily large amount of the chemical agent present on the release layer may result in excess chemical agent on the ink that is transferred to the substrate. Moreover, since even under ideal circumstances some of the chemical agent may remain on the release layer, the avoidance of use of excess chemical agent will minimize the build-up of such agent on the release layer, and will lengthen the time required between cleanings of the release layer.

Solutions or dispersion containing the chemical agent may applied to the release layer in a manner known in the art for applying liquids to solid surfaces, such as by spraying or by use of a roller; it is preferable that the chemical agent be applied evenly to the release layer or evened out after application and before jetting of the ink, preferably before drying of the chemical agent. It will be appreciated that a rod, such as a wire-wound metering rod (Mayer rod), may be employed in the application process. Methods known in the art for regulating the thickness of such a liquid layer may be utilized, and additional machinery may be employed to this end. In some embodiments, the chemical agent is applied to the release layer by undulations from a fountain or spraying and then evened using a metering roller or removed from the transfer member shortly following its exposure thereto (e.g. by wiping or using an air flow). In some embodiments, the metering roller is a chrome roller, i.e. it is made of chrome or is chrome-plated. In one embodiment, the chrome roller is a forward roller that works in conjunction with a metering roller that may be made, for example, from polyurethane.

The chrome roller may be equipped with an internal cooling system in order to keep its temperature lower than that of the release layer. As mentioned below, it has been found that placing a drop of 0.3 wt. % PEI solution on a release layer and immediately applying a stream of air to both spread and dry the solution within a few seconds, followed by jetting of an ink onto the release layer and pressing a substrate against the release yielded good transfer of the ink to the substrate in the areas of the release layer which were contacted with PEI. Thus in some embodiments it is sufficient that after removal of the solvent, the chemical agent be present in a layer of a few molecules' thickness or even a monolayer.

Although in principle the aqueous inkjet ink may be jetted onto the chemical agent-coated release layer while the chemical agent is still wet in solution, in practice the chemical agent will generally be dry prior to the jetting of the ink, as the release layer will generally be heated, resulting in drying of the chemical agent solution before jetting of the ink occurs, so that the ink droplets are directed onto a substantially dry surface.

The ratio of charges in the ink droplet to the charges in the region of the chemical agent upon which the ink droplet rests may be small, but this need not be the case. Assuming an initial layer of chemical agent-containing solution of 1 micron thickness containing 0.2 wt. % of the chemical agent, 1 square meter of release layer contains 1 g of chemical agent solution or, after drying, 2 mg of dry chemical agent. Assuming a single ink drop of 12 picoliter volume then has a 30 micron radius containing 7.5 wt. % charged resin, then the area covered by this drop will be approximately $2.83 \times 10^{-9}$ square meters, so that one drop of ink covers 5.65 picograms of the chemical agent. If the chemical agent has a charge density of 6 milliequivalents per gram, then one drop of ink covers $3.39 \times 10^{-14}$ amines of the chemical agent. Since one drop has a mass of 12 ng and contains 7.5 wt % of resin, it contains 0.9 nanograms of resin. If the resin has acid number 86 mg KOH/g then its charge density is 1.54 meq/g, thus it contains 1.38 picoequivalents of carboxyl groups, giving a carboxyl/amine ratio of approximately 40. Using this same calculation, if one assumes an ink drop of the same volume and resin concentration but having a charge density of 12 meq/g, i.e. twice the charge density, then the carboxyl/amine ratio would be 80. Similar calculations can be made for different charge densities of the chemical agent, e.g. if the charge density of the chemical agent is 18, and the other parameters are assumed to be the same.

The calculations in the previous paragraph indicate that any interaction between negative charges in the resin in the ink and positive charges in the chemical agent on the release layer cannot be stoichiometric. It has been found experimentally that if a single droplet of a dilute polyethylene imine (PEI) solution is dropped onto the hydrophobic surface (silanol-terminated dimethylpolysiloxane) and immediately blown away and evaporated by a stream of high pressure air, ink droplets will only thereafter adhere without beading up on the parts of the surface that have come into contact with the dilute PEI solution, even though contact between the PEI solution and the hydrophobic surface was only for a brief instant. As such application can only leave a layer having a thickness of a very few molecules (possibly only a monolayer), this result confirms that the interaction with ink cannot be a stoichiometric chemical one, having regard to the significant difference between the mass of the PEI layer and the mass of the ink droplets.

As the amount of charge on the transfer member is too small to attract more than a small number of charged resin particles in the ink, it is believed that the concentration and distribution of the charged resin particles in the drop is not substantially changed as a result of contact with the chemical agent on the release layer.

It is also believed that the concentration and distribution of the charged resin particles in such an ink droplet is not substantially changed as a result of contact with the release layer per se, if the release layer is positively chargeable.

Chemical agents in accordance with embodiments of the present invention may also be characterized by their effect on the contact angle of water. In particular, it has been found that when the hydrophobic release layer is coated with a thin layer (~1-2 nm) of chemical agent (e.g. polyethylene imine) in accordance with embodiments of the invention, the contact angle of a drop of distilled water on the hydrophobic release layer does not change in comparison to a drop of water on an uncoated layer. This indicates that the surface energy, and thus the surface tension of the water droplet, is essentially unaffected by the chemical agent. This is in contrast to the action of conventional wetting agents as used in prior art processes, which by definition affect the surface energy of the transfer surface and give rise to droplets having significantly lower contact angles. It will also be appreciated that the effect of some conventional wetting agents on the hydrophobic release layer were tested with aqueous ink and found to yield transfer to a paper substrate that was no better than if the release layer had been untreated.

It has been found, surprisingly, that the application of a chemical agent to a hydrophobic release layer in accordance with embodiments of the invention has a profound effect on the shape of the ink droplets after the droplets stabilize. To revert from a pancake or disk-like shape to a spherical globule, surface tension needs to peel the surface of the ink droplet away from the surface of the intermediate transfer member. However, within the time frame of the printing process described herein—i.e. several seconds from the jetting of the ink onto the intermediate transfer member until the solvent is evaporated from the ink and the ink is then transferred to the substrate—the ink droplet does not revert from a pancake back to a globule on release layers coated with the chemical agent. Without wishing to be bound by theory it is believed that the intermolecular forces between the chemical agent on the release layer and the resin in the ink resist such separation of the surface of the droplet from the surface of the release layer, resulting in a relatively flat droplet of ink which remains flatter to a significantly greater extent than a droplet of the same volume deposited on the same surface without such conditioning. Furthermore, since in areas that are not reached by the droplet the effective hydrophobic nature of the transfer member is maintained, there is little or no spreading of the droplet above that achieved in the initial impact and the boundaries of the droplet are distinct; in other words there is no wetting by the ink droplets of the surface of the intermediate transfer member, thus resulting in droplets having a regular rounded outline.

In some embodiments of the invention, the intermediate transfer member is a flexible blanket of which the outer surface is the hydrophobic outer surface upon which the ink image is formed. It is however alternatively possible for the intermediate transfer member to be constructed as a drum.

In accordance with a feature of some embodiments of the invention, prior to transferring the residue film onto the substrate, the ink image is heated to a temperature at which the residue film of resin and coloring agent that remains after evaporation of the aqueous carrier is rendered tacky (e.g. by softening of the resin). The temperature of the tacky residue film on the intermediate transfer member may be higher than the temperature of the substrate, whereby the residue film cools during adhesion to the substrate.

By suitable selection of the thermo-rheological characteristics of the residue film the effect of the cooling may be to increase the cohesion of the residue film, whereby its cohesion exceeds its adhesion to the transfer member so that, when brought into contact with the substrate e.g. at an impression station (see below), for which it has greater affinity than for the release layer, substantially all of the residue film is separated from the intermediate transfer member and impressed as a film onto the substrate. In this way, it is possible to ensure that the residue film is impressed on the substrate without significant modification to the area covered by the film nor to its thickness.

Upon transfer of the ink image from the release layer to the substrate, some, often most, and often nearly all of the chemical agent upon which ink has been jetted will transfer with the image to the substrate, resulting in an ink image on the substrate having a thin (generally 1-10 nm thick) layer of the chemical agent thereupon. As will be appreciated by persons skilled in the art, the presence of the chemical agent may be detected through various methods, such as X-ray photoelectron spectroscopy, or by dissolving a portion of the chemical agent and then detecting its present in the solution by HPLC or IR spectroscopy.

The ink used in conjunction with the chemical agent on the release layer preferably utilizes an aqueous carrier, which reduces safety concerns and pollution issues that occur with inks that utilize volatile hydrocarbon carrier. In general, the ink must have the physical properties that are needed to apply very small droplets close together on the transfer member.

Other effects that may contribute to the shape of the droplet remaining in the flattened configuration are quick heating of the droplets to increase their its viscosity; the presence of a polymeric conditioning agent that reduces the hydrophobic effect of the silicone layer; and the presence in the ink of a surfactant that reduces the surface tension of the ink.

In general, ink jet printers require a trade-off between purity of the color, the ability to produce complete coverage of a surface and the density of the ink-jet nozzles. If the droplets (after beading) are small, then, in order to achieve complete coverage, it is necessary to have the droplets close together. However, it is very problematic (and expensive) to have the droplets closer than the distance between pixels. By forming relatively flat droplet films that are held in place in the manner described above, the coverage caused by the droplets can be close to complete.

In some instances, the carrier liquid in the image is evaporated from the image after it is formed on the transfer member. Since the colorant in the droplets is distributed within the droplet, either as a solution (e.g. in the case of a dye) or as a dispersion (e.g. in the case of a pigment), the preferred method for removal of the liquid is by heating the image, either by heating the transfer member or by external heating of the image after it is formed on the transfer member, or by a combination of both. In some instances, the carrier is evaporated by blowing a heated gas (e.g. air) over the surface of the transfer member.

In some instances, different ink colors are applied sequentially to the surface of the intermediate transfer member and a heated gas is blown onto the droplets of each ink color after their deposition but before deposition on the intermediate transfer member of the next ink color. In this way, merging of ink droplets of different colors with one another is reduced.

In some instances, the polymer resin used in the ink is a polymer that enables the ink to form a residue film when it is heated (the term residue film is used herein to refer to the ink droplets after evaporation of the liquid carrier therefrom). Acrylic-styrene co-polymers with an average molecular weight around 60,000, for example, have been found to be suitable. Preferably all of the liquid in the ink is evaporated, however, a small amount of liquid, that does not interfere with the forming of a residue film may be present. The formation of a residue film has a number of advantages. The first of these is that when the image is transferred to the final substrate all, or nearly all, of the image can be transferred. This allows in some cases for a system without a cleaning station for removing residues from the transfer member. It also allows for the image to be attached to the substrate with a nearly constant thickness of the image covering the substrate. Additionally, it prevents the penetration of the image beneath the surface of the substrate.

In general, when an image is transferred to or formed on a substrate while it is still liquid, the image penetrates into the fibers of the substrate and beneath its surface. This causes uneven color and a reduction in the depth of the color, since some of the coloring agent is blocked by the fibers. In some instances, the residue film is very thin, preferably between 10 nm and 800 nm and more preferably between 50 nm and 500 nm Such thin films are transferred intact to the substrate and, because they are so thin, replicate the surface of the substrate by closely following its contours. This results in a much smaller difference in the gloss of the substrate between printed and non-printed areas.

When the residue film reaches a transfer station at which it is transferred from the intermediate transfer member to the final substrate, it is pressed against the substrate, having preferably previously been heated to a temperature at which it becomes tacky in order to attach itself to the substrate.

Preferably, the substrate, which is generally not heated, cools the image so that it solidifies and transfers to the substrate without leaving any of residue film on the surface of the intermediate transfer member. For this cooling to be effective, additional constraints are placed on the polymer in the ink.

The fact that the carrier is termed an aqueous carrier is not intended to preclude the presence of certain organic materials in the ink, in particular, certain innocuous water miscible organic material and/or co-solvents, such as ethylene glycol or propylene glycol.

As the outer surface of the intermediate transfer member is hydrophobic, there may be little (<1.5%) or substantially no swelling of the transfer member due to absorption of water from the ink; such swelling is known to distort the surface of transfer members in commercially available products utilizing silicone coated transfer members and hydrocarbon carrier liquids. Consequently, the process described above may achieve a highly smooth release surface, as compared to intermediate transfer member surfaces of the prior art.

As the image transfer surface is hydrophobic, and therefore not water absorbent, substantially all the water in the ink should be evaporated away if wetting of the substrate is to be avoided. It will be appreciated that the inclusion of certain co-solvents, such as ethylene glycol or propylene glycol, which have higher boiling points than water, may reduce the rate at which the solvent evaporates relative to the situation in which water is the only solvent. However, the ink droplets on the transfer member are of sufficiently small thickness relative to their surface area, and are usually heated at a temperature for a time, sufficient to allow for evaporation of substantially all of the solvent prior to transfer to the substrate.

DRAWINGS

Embodiments of invention will now be described further, by way of examples, and with reference to the accompanying drawings showing the operation of a printing system in which the presently claimed invention may be practiced, in which:

FIGS. 4, 5A, 5B, 5C and 5D are scans of paper onto which ink was transferred from a hydrophobic release layer, illustrating the effects of contacting the release layer with different (or no) chemical agents prior to jetting of the ink onto the release layer.

GENERAL OVERVIEW OF A PRINTING APPARATUS

Figure 1:
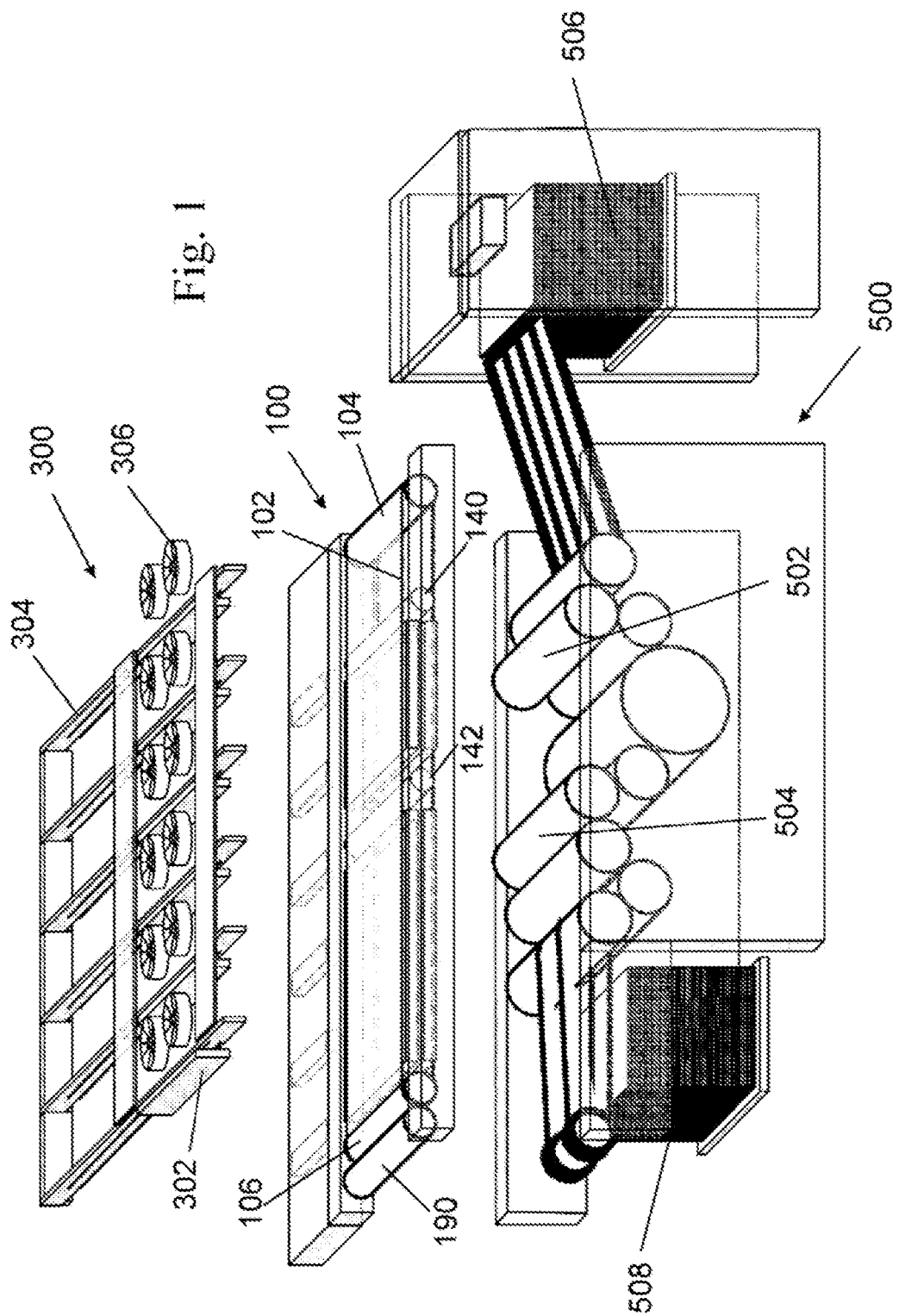
FIG. 1 is an exploded schematic perspective view of a printing system in accordance with which an embodiment of the invention may be used.

The printing system shown in FIGS. 1 and 2 essentially comprises three separate and mutually interacting systems, namely a blanket system 100, an image forming system 300 above the blanket system 100 and a substrate transport system 500 below the blanket system 100.

The blanket system 100 comprises an endless belt or blanket 102 that acts as an intermediate transfer member and is guided over two rollers 104, 106. An image made up of dots of an aqueous ink is applied by image forming system 300 to an upper run of blanket 102 at a location referred herein as the image forming station. A lower run selectively interacts at two impression stations with two impression cylinders 502 and 504 of the substrate transport system 500 to impress an image onto a substrate compressed between the blanket 102 and the respective impression cylinder 502, 504. As will be explained below, the purpose of there being two impression cylinders 502, 504 is to permit duplex printing. In the case of a simplex printer, only one impression station would be needed. The printer shown in FIGS. 1 and 2 can print single sided prints at twice the speed of printing double sided prints. In addition, mixed lots of single and double sided prints can also be printed.

In operation, ink images, each of which is a mirror image of an image to be impressed on a final substrate, are printed by the image forming system 300 onto an upper run of blanket 102. In this context, the term "run" is used to mean a length or segment of the blanket between any two given rollers over which the blanket is guided. While being transported by the blanket 102, the ink is heated to dry it by evaporation of most, if not all, of the liquid carrier. The ink image is furthermore heated to render tacky the film of ink solids remaining after evaporation of the liquid carrier, this film being referred to as a residue film, to distinguish it from the liquid film formed by flattening of each ink droplet. At the impression cylinders 502, 504 the image is impressed onto individual sheets 501 of a substrate which are conveyed by the substrate transport system 500 from an input stack 506 to an output stack 508 via the impression cylinders 502, 504. Though not shown in the figures, the substrate may be a continuous web, in which case the input and output stacks are replaced by a supply roller and a delivery roller. The substrate transport system needs to be adapted accordingly, for instance by using guide rollers and dancers taking slacks of web to properly align it with the impression station.

Image Forming System

The image forming system 300 comprises print bars 302 which may each be slidably mounted on a frame positioned at a fixed height above the surface of the blanket 102. Each print bar 302 may comprise a strip of print heads as wide as the printing area on the blanket 102 and comprises individually controllable print nozzles. The image forming system can have any number of bars 302, each of which may contain an aqueous ink of a different color.

As some print bars may not be required during a particular printing job, the heads can be moved between an operative position (at which the bar remains stationary), in which they overlie blanket 102 and an inoperative position (at which the bar can be accessed for maintenance).

Within each print bar, the ink may be constantly recirculated, filtered, degased and maintained at a desired temperature and pressure, as known to the person skilled in the art without the need for more detailed description.

As different print bars 302 are spaced from one another along the length of the blanket, it is of course essential for their operation to be correctly synchronized with the movement of blanket 102.

If desired, it is possible to provide a blower following each print bar 302 to blow a slow stream of a hot gas, preferably air, over the intermediate transfer member to commence the drying of the ink droplets deposited by the print bar 302. This assists in fixing the droplets deposited by each print bar 302, that is to say resisting their contraction and preventing their movement on the intermediate transfer member, and also in preventing them from merging into droplets deposited subsequently by other print bars 302.

Blanket and Blanket Support System

The blanket 102, in one variation, is seamed. In particular, the blanket is formed of an initially flat strip of which the ends are fastened to one another, releasably or permanently, to form a continuous loop often referred to as a belt. A releasable fastening may be a zip fastener or a hook and loop fastener that lies substantially parallel to the axes of rollers 104 and 106 over which the blanket is guided. A permanent fastening may be achieved by the use of an adhesive or a tape. Alternatively, the belt may be seamless.

In order to avoid a sudden change in the tension of the blanket as the seam passes over rollers or other parts of the support system, it is desirable to make the seam, as nearly as possible, of the same thickness as the remainder of the blanket.

The primary purpose of the blanket is to receive an ink image from the image forming system and to transfer that image dried but undisturbed to the impression stations. To allow easy transfer of the ink image at each impression station, the blanket has a thin upper release layer that is hydrophobic, suitable examples of which have been described above. The outer surface of the transfer member upon which the ink can be applied may comprise a silicone material. Under suitable conditions, a silanol-, sylyl- or silane-modified or terminated polydialkylsiloxane material has been found to work well.

The strength of the blanket can be derived from a support or reinforcement layer. In one instance, the reinforcement layer is formed of a fabric. If the fabric is woven, the warp and weft threads of the fabric may have a different composition or physical structure so that the blanket should have, for reasons to be discussed below, greater elasticity in its widthways direction (parallel to the axes of the rollers 104 and 106) than in its lengthways direction.

The blanket may comprise additional layers between the reinforcement layer and the release layer, for example to provide conformability and compressibility of the release layer to the surface of the substrate. Other layers provided on the blanket may act as a thermal reservoir or a thermal partial barrier and/or to allow an electrostatic charge to the applied to the release layer. An inner layer may further be provided to control the frictional drag on the blanket as it is rotated over its support structure. Other layers may be included to adhere or connect the afore-mentioned layers one with another or to prevent migration of molecules therebetween.

The blanket support system may comprise thermally conductive support plates 130 forming a continuous flat support surface both on the top side and bottom side of the support frame. Electrical heating elements can be inserted into transverse holes of the plates to apply heat to the plates 130 and through plates 130 to the blanket 102. Other means for heating the blanket will occur to the person of skill in the art and may include heating from below, above, or within the blanket itself.

Also mounted on the blanket support frame are two pressure or nip rollers 140, 142 which can be raised and lowered from the lower run of the blanket. The pressure rollers are located on the underside of the support frame in gaps between the support plates 130 covering the underside of the frame. The pressure rollers 140, 142 are aligned respectively with the impression cylinders 502, 504 of the substrate transport system. Each impression roller and corresponding pressure roller, when both are engaged with the blanket passing therebetween, form an impression station.

In some instances, the blanket support system further comprises a continuous track, which can engage formations on the side edges of the blanket to maintain the blanket taut in its width ways direction. The formations may be spaced projections, such as the teeth of one half of a zip fastener sewn or otherwise attached to the side edge of the blanket. Alternatively, the formations may be a continuous flexible bead of greater thickness than the blanket. The lateral track guide channel may have any cross-section suitable to receive and retain the blanket lateral formations and maintain it taut. To reduce friction, the guide channel may have rolling bearing elements to retain the projections or the beads within the channel.

In order for the image to be properly formed on the blanket and transferred to the final substrate and for the alignment of the front and back images in duplex printing to be achieved, a number of different elements of the system must be properly synchronized. In order to position the images on the blanket properly, the position and speed of the blanket must be both known and controlled. For this purpose, the blanket can be marked at or near its edge with one or more markings spaced in the direction of motion of the blanket. One or more sensors 107 sense the timing of these markings as they pass the sensor. The speed of the blanket and the speed of the surface of the impression rollers should be the same, for proper transfer of the images to the substrate from the transfer blanket. Signals from the sensor(s) 107 are sent to a controller 109 which also receives an indication of the speed of rotation and angular position of the impression rollers, for example from encoders on the axis of one or both of the impression rollers (not shown). Sensor 107, or another sensor (not shown) also determines the time at which the seam of the blanket passes the sensor. For maximum utility of the usable length of the blanket, it is desirable that the images on the blanket start as close to the seam as feasible.

Figure 2:
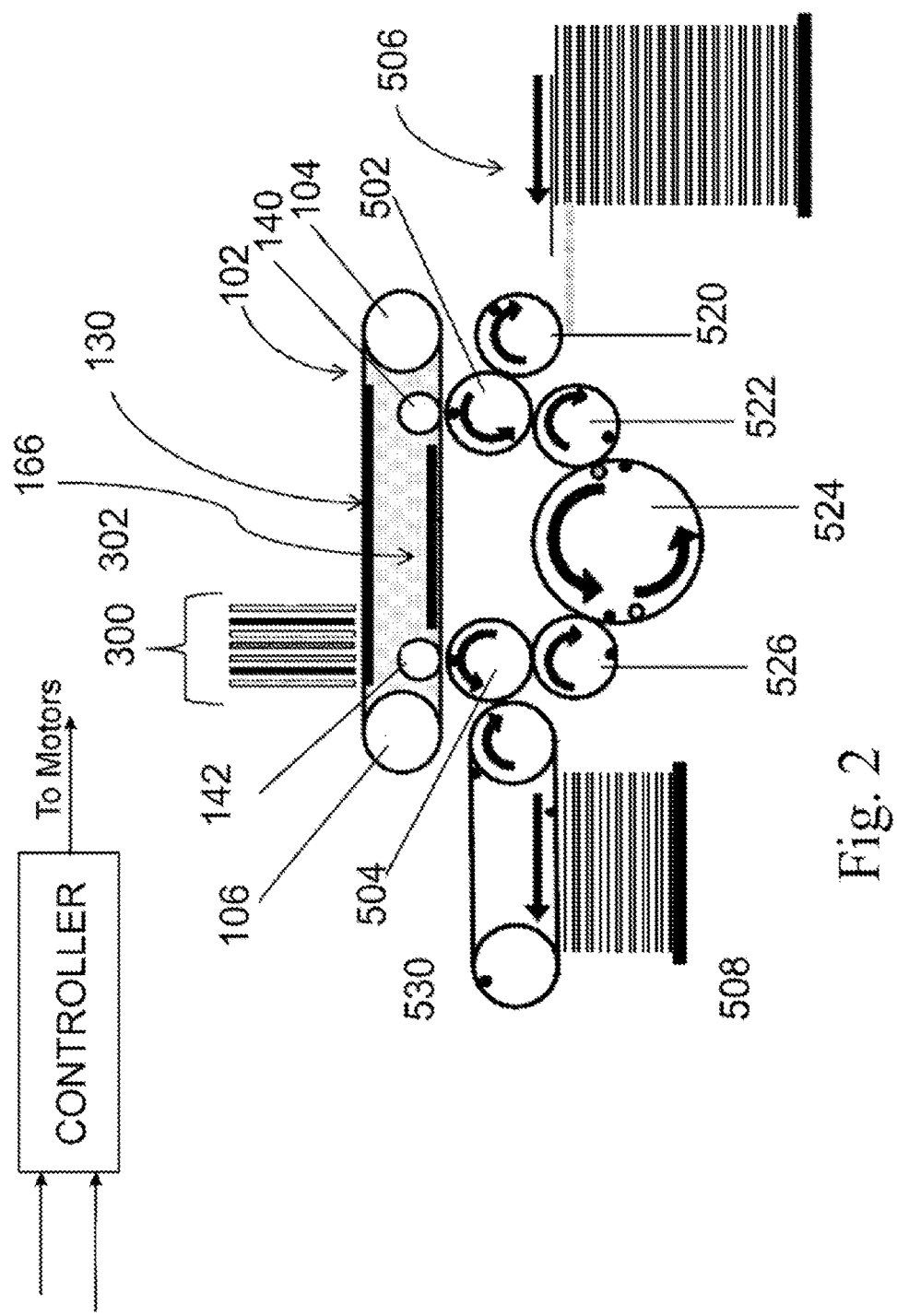
FIG. 2 is a schematic vertical section through the printing system of FIG. 1, in which the various components of the printing system are not drawn to scale.
Figure 3:
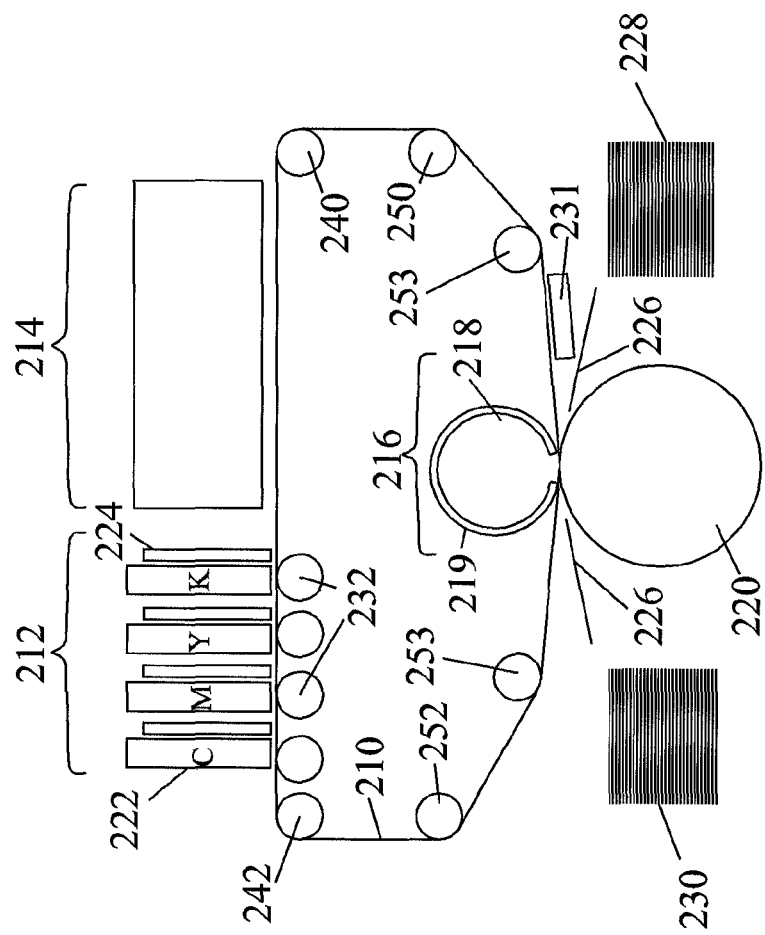
FIG. 3 is a schematic representation of a printing system of the invention in accordance with which an embodiment of the invention may be used.

A printing system operating on the same principle as that of FIG. 1 but adopting an alternative architecture is shown in FIG. 3. The printing system of FIG. 3 comprises an endless belt 210 that cycles through an image forming station 212, a drying station 214, and a transfer station 216. The image forming station 212 being similar to the previously described image forming system 300, illustrated in FIG. 1.

In the image forming station 212 four separate print bars 222 incorporating one or more print heads, that use inkjet technology, deposit aqueous ink droplets of different colors onto the surface of the belt 210. Though the illustrated embodiment has four print bars each able to deposit one of the typical four different colors (namely Cyan (C), Magenta (M), Yellow (Y) and Black (K)), it is possible for the image forming station to have a different number of print bars and for the print bars to deposit different shades of the same color (e.g. various shades of grey including black) or for two print bars or more to deposit the same color (e.g. black). Following each print bar 222 in the image forming station, an intermediate drying system 224 is provided to blow hot gas (usually air) onto the surface of the belt 210 to dry the ink droplets partially. This hot gas flow may also assist in preventing blockage of the inkjet nozzles and additionally prevents the droplets of different color inks on the belt 210 from merging into one another. In the drying station 214, the ink droplets on the belt 210 are exposed to radiation and/or hot gas in order to dry the ink more thoroughly, driving off most, if not all, of the liquid carrier and leaving behind only a layer of resin and coloring agent which is heated to the point of being rendered tacky.

In the transfer station 216, the belt 210 passes between an impression cylinder 220 and a blanket cylinder 218 that carries a compressible blanket 219. The length of the blanket is equal to or greater than the maximum length of a sheet 226 of substrate on which printing is to take place. The impression cylinder 220 has twice the diameter of the blanket cylinder 218 and can support two sheets 226 of substrate at the same time. Sheets 226 of substrate are carried by a suitable transport mechanism (not shown) from a supply stack 228 and passed through the nip between the impression cylinder 220 and the blanket cylinder 218. Within the nip, the surface of the belt 220 carrying the tacky ink image is pressed firmly by the blanket on the blanket cylinder 218 against the substrate so that the ink image is impressed onto the substrate and separated neatly from the surface of the belt. The substrate is then transported to an output stack 230. In some embodiments, a heater 231 may be provided shortly prior to the nip between the two cylinders 218 and 220 of the image transfer station to assist in rendering the ink film tacky, so as to facilitate transfer to the substrate.

It is important for the belt 210 to move with constant speed through the image forming station 212 as any hesitation or vibration will affect the registration of the ink droplets of different colors. To assist in guiding the belt smoothly, friction is reduced by passing the belt over rollers 232 adjacent each print bar 222 instead of sliding the belt over stationary guide plates. The rollers 232 need not be precisely aligned with their respective print bars. They may be located slightly (e.g. a few millimeters) downstream of the print head jetting location. The frictional forces maintain the belt taut and substantially parallel to print bars. The underside of the belt may therefore have high frictional properties as it is only ever in rolling contact with all the surfaces on which it is guided. The lateral tension applied by the guide channels need only be sufficient to maintain the belt 210 flat and in contact with rollers 232 as it passes beneath the print bars 222. Aside from the inextensible reinforcement/support layer, the hydrophobic release surface layer and high friction underside, the belt 210 is not required to serve any other function. It may therefore be a thin light inexpensive belt that is easy to remove and replace, should it become worn.

To achieve intimate contact between the hydrophobic release layer and the substrate, the belt 210 passes through the transfer station 216 which comprises the impression and blanket cylinders 220 and 218. The replaceable blanket 219 releasably clamped onto the outer surface of the blanket cylinder 218 provides the conformability required to urge the release layer of the belt 210 into contact with the substrate sheets 226. Rollers 253 on each side of the transfer station ensure that the belt is maintained in a desired orientation as it passes through the nip between the cylinders 218 and 220 of the transfer station 216.

The above description of the apparatus illustrated in FIG. 3 is simplified and provided only for the purpose of enabling an understanding of printing systems and processes with which the presently claimed invention may be used. For a successful printing system, the control of the various stations of the printing system is important but need not be considered in detail in the present context.

In order for the ink to separate neatly from the surface of the belt 210 it is necessary for the latter surface to have a hydrophobic release layer. In the arrangement of FIG. 1, this hydrophobic release layer is formed as part of a thick blanket that also includes a compressible conformability layer which is necessary to ensure proper contact between the release layer and the substrate at the impression station. The resulting blanket is a very heavy and costly item that needs to be replaced in the event a failure of any of the many functions that it fulfills. In the arrangement of FIG. 3, the hydrophobic release layer forms part of a separate element from the thick blanket 219 that is needed to press it against the substrate sheets 226. In FIG. 3, the release layer is formed on the flexible thin inextensible belt 210 that is preferably fiber reinforced for increased tensile strength in its lengthwise dimension.

Blanket Pre-Treatment

FIG. 1 shows schematically a roller 190 positioned on the external side of the blanket immediately before roller 106, according to an embodiment of the invention. Such a roller 190 may be used to apply a thin film of pre-treatment solution containing a chemical agent, for example a dilute solution of a positively charged polymer according to the teachings herein disclosed, to the surface of the blanket. Preferably, the solvent is totally removed from the film by the time it reaches the print bars of the image forming system, to leave behind a very thin layer of chemical agent on the surface of the blanket that assists the ink droplets to retain their film-like shape after they have impacted the surface of the blanket.

While a roller can be used to apply an even film, in an alternative embodiment the pre-treatment or conditioning material is sprayed onto the surface of the blanket and optionally spread more evenly, for example by the application of a jet from an air knife. Independently of the method used to apply the conditioning solution, if needed, the location at which such pre-print treatment can be performed may be referred herein as the conditioning station. The alternative printing system illustrated in FIG. 3 may also include a conditioning station.

The purpose of the applied chemical agent is to counteract the effect of the surface tension of the aqueous ink upon contact with the hydrophobic release layer of the blanket, without necessarily reducing said surface tension. Without wishing to be bound by theory, it is believed that such pre-treatment chemical agents, for instance some positively charged polymers, such as polyethylenimine, will adhere (temporarily at least), to the silicone surface of the transfer member to form a positively charged layer. However, the amount of charge that is present in such a layer is believed to be much smaller than the negative charge in the droplet itself. The present inventors have found that a very thin layer of chemical agent, perhaps even a layer of molecular thickness, is adequate. This layer of pre-treatment chemical agent on the transfer member may be applied in very dilute form of the suitable chemical agents. Ultimately this thin layer may be transferred onto the substrate, along with the image being impressed.

When the ink droplet impinges on the transfer member, the momentum in the droplet causes it to spread into a relatively flat volume. In the prior art, this flattening of the droplet is almost immediately counteracted by the combination of surface tension of the droplet and the hydrophobic nature of the surface of the transfer member.

In embodiments of the invention, the shape of the ink droplet is "frozen" such that at least some and preferably a major part of the flattening and horizontal extension of the droplet present on impact is preserved. It should be understood that since the recovery of the droplet shape after impact is very fast, the methods of the prior art would not effect phase change by agglomeration and/or coagulation and/or migration.

Without wishing to be bound by theory, it is believed that, on impact, the positive charges which have been placed on the transfer member attract the negatively charged polymer resin particles of the ink droplet that are immediately adjacent to the surface of the member. It is believed that, as the droplet spreads, this effect takes place along a sufficient area of the interface between the spread droplet and the transfer member to retard or prevent the beading of the droplet, at least on the time scale of the printing process, which is generally on the order of seconds.

As the amount of charge is too small to attract more than a small number of charged resin particles in the ink, it is believed that the concentration and distribution of the charged resin particles in the drop is not substantially changed as a result of contact with the chemical agent on the release layer. Furthermore, since the ink is aqueous, the effects of the positive charge are very local, especially in the very short time span needed for freezing the shape of the droplets.

While the applicants have found that coating the intermediate transfer member with a polymer utilizing a roller is an effective method for freezing the droplets, it is believed that spraying or otherwise chemically transferring positive charge to the intermediate transfer member is also possible.

Ink

Inks that are suitable for use in conjunction with the treated are release layer are, for example, aqueous inkjet inks that contain (i) a solvent comprising water and optionally a co-solvent, (ii) a negatively chargeable polymeric resin (the ink may include a small amount of a pH-raising substance to ensure that the polymer is negatively charged), and (iii) at least one colorant. Preferably, water constitutes at least 8 wt. % of the ink; the at least one colorant is dispersed or at least partly dissolved within the solvent and constitutes at least 1 wt. % of the ink; the polymeric resin is dispersed or at least partially dissolved within the solvent and constitutes 6 to 40 wt. % of the ink; the average molecular weight of the polymeric resin is least 8,000; prior to jetting the ink has at least one of (i) a viscosity of 2 to 25 centipoise at at least one temperature in the range of 20-60° C. and (ii) a surface tension of not more than 50 milliNewton/m at at least one temperature in the range of 20-60° C.

Preferably, the ink is such that, when substantially dried, (a) at at least one temperature in the range of 90° C. to 195° C., the dried ink has a first dynamic viscosity in the range of 1,000,000 ($1\times10^6$) cP to 300,000,000 ($3\times10^8$) cP, and (b) at at least one temperature in the range of 50° C. to 85° C., the dried ink has a second dynamic viscosity of at least 80,000,000 ($8\times10^7$) cP, wherein the second dynamic viscosity exceeds the first dynamic viscosity; and/or the weight ratio of the resin to the colorant is at least 1:1. The colorant may contain a pigment, preferably a nanopigment, for example having an average particle size ($D_{50}$) of not more than 120 nm.

With respect to the ink, "substantially dried" refers to ink that has no more solvent and other volatile compounds than does a layer of the ink of 1 mm initial thickness after such a layer is dried in an oven for 12 hours at 100° C.

As noted, the polymer resins, such as acrylic-based polymers, may be negatively charged at alkaline pH. Consequently, in some embodiments, the polymeric resin has a negative charge at pH 8 or higher; in some embodiments the polymeric resin has a negative charge at pH 9 or higher. Furthermore, the solubility or the dispersability of the polymeric resin in water may be affected by pH. Thus in some embodiments, the formulation comprises a pH-raising compound. Examples of such are diethyl amine, monoethanol amine, and 2-amino-2-methyl propanol. Such pH-raising compounds, when included in the ink, are generally included in small amounts, e.g. about 1 wt. % of the formulation and usually not more than about 2 wt. % of the formulation.

It will also be appreciated that acrylic-based polymers having free carboxyl groups may be characterized in terms of their charge density or, equivalently, the acid number, viz. the number of mg of KOH needed to neutralize one g of dry polymer. Thus, in some embodiments, the polymeric resin has an acid number in the range of 70-144.

As noted, the ink formulation contains at least one colorant. As used herein in the specification and in the claims section that follows, the term "colorant" refers to a substance that is considered, or would be considered to be, a colorant in the art of printing. The concentration of the at least one colorant within the ink formulation when substantially dry may be at least 2%, at least 3%, at least 4%, at least 6%, at least 8%, at least 10%, at least 15%, at least 20%, or at least 22%, by weight. Typically, the concentration of the at least one colorant within the ink film is at most 40%, at most 35%, at most 30%, or at most 25%. More typically, the ink formulation when substantially dry may contain 2-30%, 3-25%, or 4-25% of the at least one colorant. The colorant may include at least one pigment. Alternatively or additionally, the colorant may include at least one dye.

As used herein in the specification and in the claims section that follows, the term "pigment" refers to a finely divided solid colorant. The pigment may have an organic and/or inorganic composition. Typically, pigments are insoluble in, and essentially physically and chemically unaffected by, the vehicle or medium in which they are incorporated. Pigments may be colored, fluorescent, or pearlescent. Pigments may alter appearance by selective absorption, interference and/or scattering of light. They are usually incorporated by dispersion in a variety of systems and may retain their crystal or particulate nature throughout the pigmentation process.

As used herein in the specification and in the claims section that follows, the term "dye" refers to at least one colored substance that is soluble or goes into solution during the application process and imparts color by selective absorption of light.

As used herein in the specification and in the claims section that follows, the term "average particle size", or "$D_{50}$", with reference to the particle size of pigments, refers to an average particle size, by weight, as determined by a laser diffraction particle size analyzer (e.g., Mastersizer™ 2000 of Malvern Instruments, England), using standard practice.

A variety of pigments are suitable for use in the inks in accordance with embodiments of the invention, although it has been found that results are best when the average particle size ($D_{50}$) of the pigment is from 10 nm to 300 nm, such as 120 nm or less, for example on the order of 70-80 nm. The pigments may thus be nanopigments; the particle size of the nanopigments may depend on the type of pigment and on the size reduction methods used in the preparation of the pigments. For example, the particle size for magenta and yellow pigments may be in the range of 10 nm to 100 nm, while blue or green pigments may be in the range of 75 nm to 200 nm Generally the $D_{50}$ of the pigment particles may be within a range of 10 nm to 270 nm Pigments of various particle sizes, utilized to give different colors, may be used for the same print. Some pigments having such particle sizes are commercially available, and may be employed as-is in embodiments of the invention; in other cases, the pigments may be milled to the appropriate size. It will be appreciated that in general, the pigments are dispersed (or at least partly dissolved) within the solvent along with the polymeric resin, and not first dispersed within the polymeric resin (e.g. by kneading) to obtain colored resin particles which are then mixed with the solvent.

In some applications, particularly when it is desirable to have an ultra-thin ink film laminated onto the printing substrate, the weight ratio of the polymeric resin to the colorant may be at most 7:1, at most 5:1, at most 3:1, at most 2.5:1, at most 2:1, or at most 1.7:1.

Examples of suitable co-solvents which are miscible with water are ethylene glycol, diethylene glycol, propylene glycol, glycerol, and N-methyl pyrrolidone. Another example is polyethylene glycol 400 (PEG 400), although in some embodiments, the ink formulation is substantially free of water soluble polymers. In some embodiments the ink formulation is substantially free of saccharides. The co-solvent may be present as a mixture of co-solvents.

In some embodiments, it may be desirable to include, in addition to the polymeric resin, colorant, water and co-solvent, a small amount of a surfactant, e.g. 0.5-1.5 wt. % of the ink. In some embodiments, the surfactant is a non-ionic surfactant.

In some embodiments, the ink formulation is devoid or substantially devoid of wax. Typically, the ink formulation contains less than 30 wt. % wax, less than 20 wt. % wax, less than 15 wt. % wax, less than 10 wt. % wax, less than 7 wt. % wax, less than 5 wt. % wax, less than 3 wt. % wax, less than 2 wt. % wax, or less than 1 wt. % wax. In other embodiments, wax is included in the ink formulation in order to impart greater abrasion resistance in the printed ink. Such waxes may be natural or synthetic, e.g. based on esters of fatty acids and fatty alcohols or long-chain alkanes (paraffin waxes), or mixtures thereof. In such cases, the formulation may comprise for example 0.1-10 wt. % wax, e.g. up to 0.1, 0.2, 0.3, 0.4, 0.5, 0.6, 0.7. 0.8, 0.9, 1.0, 1.5, 2, 2.5, 3, 4, 5, 6, 7, 8, 9 or 10 wt. % wax. The wax may be incorporated into the formulation as an aqueous dispersion of small wax particles, e.g. having average size of 10 micron or smaller, preferably having average size of 1 micron or smaller.

In some embodiments, the ink formulation is devoid or substantially devoid of oils such as mineral oils and vegetable oils (e.g., linseed oil and soybean oil). Typically, the ink formulation contains at most 20 wt. %, at most 12 wt. %, at most 8 wt. %, at most 5 wt. %, at most 3 wt. %, at most 1 wt. %, at most 0.5 wt. %, or at most 0.1 wt. %, by weight, of one or more oils, cross-linked fatty acids, or fatty acid derivatives produced upon air-drying. In some embodiments, the formulation is substantially free of a plasticizer.

In some embodiments, the ink formulation is devoid or substantially devoid of one or more salts, including salts used to coagulate or precipitate ink on a transfer member or on a substrate (e.g., calcium chloride). Typically, the ink formulation contains at most 8 wt. %, at most 5 wt. %, at most 3 wt. %, at most 1 wt. %, at most 0.5 wt. %, at most 0.1 wt. %, or substantially 0 wt. % of one or more salts. Such salts may be referred to herein as "precipitants", and it will be appreciated that when it is stated that a formulation does not include a salt or contains salt in an amount less than a certain weight percentage, this does not refer to salts that may form between the polymer(s) of the polymeric resin and pH modifiers, such as alcohol amines, or that may be present in the polymeric resin itself if the polymeric resin is provided as a salt. As discussed above, it is presently believed that the presence of negative charges in the polymeric resin is beneficial to the print process.

In some embodiments, the ink formulation is devoid or substantially devoid of inorganic particulates, e.g. silica particulates, titania particulate or alumina particulates, containing less than 2 wt. %, less than 1 wt. %, less than 0.1 wt. % or substantially no inorganic particulates. By "silica particulates" is meant fumed silica, silica chips, silica colloids, and the like. Specific examples of such silica particulates include those available from DuPont Company under the names: Ludox AM-30, Ludox CL, Ludox HS-30; and those available from Nyacol Nanotechnologies Company under the names: NexSil 12, NexSil 20, NexSil 8, Nexsil 20, Nexsil 85. In the context of the present application, the term "silica particulates" does not include colorants.

Ink Image Heating

The heaters, either inserted into the support plates 130 or positioned above the blanket as intermediate drying system 224 and drying station 214, are used to heat the blanket to a temperature that is appropriate for the rapid evaporation of the ink carrier and compatible with the composition of the blanket. For blankets comprising for instance silanol-, modified or terminated polydialkylsiloxane silicones in the release layer, heating is typically of the order of 150° C., though this temperature may vary within a range from 700° C. to 180° C., depending on various factors such as the composition of the inks and/or of the conditioning solutions if needed. When using beneath heating of the transfer member, it is desirable for the blanket to have relatively high thermal capacity and low thermal conductivity, so that the temperature of the body of the blanket 102 will not change significantly as it moves between the pre-treatment or conditioning station, the image forming station and the impression station(s). When using top heating of the transfer member, the blanket would preferably include a thermally insulating layer to prevent undue dissipation of the applied heat. To apply heat at different rates to the ink image carried by the transfer surface, independently of the architecture of a particular printing system, additional external heaters or energy sources (not shown) may be used to apply energy locally, for example prior to reaching the impression stations to render the ink residue tacky (see 231 in FIG. 3), prior to the image forming station to dry the conditioning agent if necessary and at the printing station to start evaporating the carrier from the ink droplets as soon as possible after they impact the surface of the blanket.

The external heaters may be, for example, hot gas or air blowers 306 (as represented schematically in FIG. 1) or radiant heaters focusing, for example, infrared radiation onto the surface of the blanket, which may attain temperatures in excess of 175° C., 190° C., 200° C., 210° C., or even 220° C.

The residue film left behind in embodiments of the invention may have an average thickness below 1500 nm, below 1200 nm, below 1000 nm, below 800 nm, below 600 nm, below 500 nm, below 400 nm, or below 300 nm.

As explained above, temperature control is of paramount importance to the printing system if printed images of high quality are to be achieved. This is considerably simplified in the embodiment of FIG. 3 in that the thermal capacity of the belt is much lower than that of the blanket 102 in the embodiments of FIGS. 1 and 2.

It has also been proposed above in relation to the embodiment using a thick blanket 102 to include additional layers affecting the thermal capacity of the blanket in view of the blanket being heated from beneath. The separation of the belt 210 from the blanket 219 in the embodiment of FIG. 3 allows the temperature of the ink droplets to be dried and heated to the softening temperature of the resin using much less energy in the drying section 214. Furthermore, the belt may cool down before it returns to the image forming station which reduces or avoids problems caused by trying to spray ink droplets on a hot surface running very close to the inkjet nozzles. Alternatively and additionally, a cooling station may be added to the printing system to reduce the temperature of the belt to a desired value before the belt enters the image forming station. Cooling may be effected by passing the belt 210 over a roller of which the lower half is immersed in a coolant, which may be water or a cleaning/treatment solution, by spraying a coolant onto the belt of by passing the belt 210 over a coolant fountain.

In some of the arrangements discussed hitherto, the release layer of the belt 210 has hydrophobic properties to ensure that the tacky ink residue image peels away from it cleanly in the transfer station. However, at the image forming station the same hydrophobic properties are undesirable because aqueous ink droplets can move around on a hydrophobic surface and, instead of flattening on impact to form droplets having a diameter that increases with the mass of ink in each droplet, the ink tends to ball up into spherical globules. As discussed, in structures using a hydrophobic release layer, steps therefore need to be taken to encourage the ink droplets, which flatten out into a disc on impact, to retain their flattened shape during the drying and transfer stages.

Printing systems as described herein may be produced by modification to existing lithographic printing presses. The ability to adapt existing equipment, while retaining much of the hardware already present, considerably reduces the investment required to convert from technology in common current use. In particular, in the case of the embodiment of FIG. 1, the modification of a tower would involve replacement of the plate cylinder by a set of print bars and replacement of the blanket cylinder by an image transfer drum having a hydrophobic outer surface or carrying a suitable blanket. In the case of the embodiment of FIG. 3, the plate cylinder would be replaced by a set of print bars and a belt passing between the existing plate and blanket cylinders. The substrate handling system would require little modification, if any. Color printing presses are usually formed of several towers and it is possible to convert all or only some of the towers to digital printing towers. Various configurations are possible offering different advantages. For example each of two consecutive towers may be configured as a multicolor digital printer to allow duplex printing if a perfecting cylinder is disposed between them. Alternatively, multiple print bars of the same color may be provided on one tower to allow an increased speed of the entire press.

The following examples illustrate inkjet ink formulations in accordance with embodiments of the invention, and in some cases their performance in a printing method as described above.

A general procedure for preparing inks in accordance with embodiments of the invention is as follows: first, a pigment concentrate is prepared by mixing distilled water, at least a portion of the polymeric resin or dispersant, if used, and colorant, and milling until a suitable particle size is reached; if a pH-raising compound is used it may be included in this step. Thereafter, the remaining ingredients, including additional polymeric resin, are mixed in, and then the ink is filtered.

Example 1

An inkjet ink formulation was prepared containing:

| Ingredient | Function | wt. % |
| --- | --- | --- |
| Jet Magenta DMQ (BASF) | pigment | 2 |
| Joncryl HPD 296 (BASF) | polymeric resin (acrylic styrene co-polymer solution, ave. MW ~11,500) | 10.6** (solid resin content) |
| Glycerol (Aldrich) | Water-miscible co-solvent | 20 |
| BYK 345 (BYK) | surfactant (silicone) | 0.5 |
| Water | — | Balance to 100% |

**The polymeric resin was provided in a 35.5 wt. % water solution; 30 wt. % of the final formulation consisted of this solution, i.e. 10.6 wt. % in the final ink formulation consisted of the polymeric resin itself.

To prepare this ink formulation, a pigment concentrate containing pigment (10%), water (70%) and resin—in the present case Joncryl HPD 296—(20%) was made by mixing and milling them until the particle size ($D_{50}$) reached about 70 nm. The remaining materials were then added to the pigment concentrate and mixed. After mixing, the ink was filtered through a 0.5 micron filter. At 25° C., the viscosity of the ink thus obtained was about 9 cP, and the surface tension was approximately 25 mN/m.

Examples 2A and 2B

An inkjet ink formulation was prepared containing:

| Ingredient | Function | wt. % |
| --- | --- | --- |
| PV Fast Blue BG (Clariant) | Pigment | 2.3 |
| Neocryl BT-9 (40% water dispersion) (DSM resins) | polymeric resin (acrylic polymer, average MW ~68,000) | 16.5 (6.6 solid resin)** |
| Glycerol (Aldrich) | Water-miscible co-solvent | 3.3 |
| Capstone FS-65 (DuPont) | Non-ionic fluorosurfactant | 0.1 |
| Water | — | Balance to 100% |
| Joncryl HPD 296 (35.5% water solution) (BASF) | Dispersant | 9 (3.2 solid resin)** |
| Diethyleneglycol (Aldrich) | Water-miscible co-solvent | 20 |
| Diethyl amine (Aldrich) | pH raiser | 1 |

**The BT-9 resin was provided in a 40 wt. % water dispersion, the HPD 296 was provided in a 35.5 wt. % water solution. 16.5% and 9%, respectively, of the final formulation consisted of these two components, i.e. 6.6 wt. % of the final ink formulation consisted of BT-9 itself and 3.2 wt. % consisted of HPD 296 itself.

Another inkjet ink formulation was prepared containing

| Ingredient | Function | wt. % |
| --- | --- | --- |
| PV Fast Blue BG (Clariant) | Pigment | 2.3 |
| Neocryl BT-9 (40% water dispersion) (DSM resins) | polymeric resin (acrylic polymer, average MW ~68,000) | 17.25 (6.9 solid resin)** |
| Glycerol (Aldrich) | Water-miscible co-solvent | 3.3 |
| Capstone FS-65 (DuPont) | Non-ionic fluorosurfactant | 0.1 |
| Water | — | Balance to 100% |
| Joncryl HPD 296 (35.5% water solution) (BASF) | Dispersant | 9 (3.2 solid resin)** |
| Diethyleneglycol (Aldrich) | Water-miscible co-solvent | 20 |
| Diethyl amine (Aldrich) | pH raiser | 1 |

**The BT-9 resin was provided in a 40 wt. % water dispersion, the HPD 296 was provided in a 35.5 wt. % water solution. 17.25% and 9%, respectively, of the final formulation consisted of these two components, i.e. 6.9 wt. % of the final ink formulation consisted of BT-9 itself and 3.2 wt. % consisted of HPD 296 itself.

To prepare these formulations, pigment concentrates containing pigment (14%), water (79%) and Joncryl HPD 296 (7%) was prepared by mixing these ingredients and milling them until the particle size ($D_{50}$) reached 70 nm, as described in Example 1. Then the remaining materials were added to the pigment concentrate and mixed. After mixing the inks were filtered through 0.5 micron filter. At 25° C., the viscosity of the inks thus obtained was about 13 cP, the surface tension about 27 mN/m, and the pH was 9-10.

Examples 3A and 3B

An inkjet ink formulation was prepared containing:

| Ingredient | Function | wt. % |
| --- | --- | --- |
| Jet Magenta DMQ (BASF) | Pigment | 2.3 |
| Neocryl BT-26 (40% water dispersion) (DSM resins) | polymeric resin (acrylic polymer, ave. MW 25,000) | 17.25 (6.9 solid resin)** |
| Monoethanol amine | pH raiser | 1.5 |
| Propylene glycol | Water-miscible co-solvent | 20 |
| N-methylpyrrolidone | Water-miscible co-solvent | 10 |
| BYK 349 (BYK) | surfactant (silicone) | 0.5 |
| Water | — | Balance to 100% |

**The polymeric resin was provided in a 40 wt. % water dispersion; the final ink formulation consisted of 17.25 wt. % of this dispersion, i.e. 6.9 wt. % in the final ink formulation consisted of the polymeric resin itself.

Another inkjet ink formulation was prepared containing:

| Ingredient | Function | wt. % |
| --- | --- | --- |
| Jet Magenta DMQ (BASF) | Pigment | 2.3 |
| Neocryl BT-26 (40% water dispersion) (DSM resins) | polymeric resin (acrylic polymer, ave. MW 25,000) | 17.5 (7 solid resin)** |
| Monoethanol amine | pH raiser | 1.5 |
| Propylene glycol | Water-miscible co-solvent | 20 |
| N-methylpyrrolidone | Water-miscible co-solvent | 10 |
| BYK 349 (BYK) | surfactant (silicone) | 0.5 |
| Water | — | Balance to 100% |

**The polymeric resin was provided in a 40 wt. % water dispersion; the final ink formulation consisted of 17.5 wt. % of this dispersion, i.e. 7 wt. % in the final ink formulation consisted of the polymeric resin itself.

To prepare these ink formulations, first a pigment concentrate was made by mixing the pigment (10%), water (69%), Neocryl BT-26 (20%) and monoethanolamine (1%) and milling as described in Example 1 until the particle size ($D_{50}$) reached 70 nm. Then the rest of materials were added to the pigment concentrate and mixed. After mixing the ink was filtered through a 0.5 micron filter. At 25° C., the viscosity of the ink thus obtained was about 8 cP, the surface tension was approximately 24 mN/m, and the pH was 9-10.

Example 4

An inkjet ink formulation was prepared containing:

| Ingredient | Function | wt. % |
| --- | --- | --- |
| Jet Magenta DMQ (BASF) | Pigment | 2.2 |
| Joncryl 683 neutralized with KOH (BASF) | Dispersant (styrene acrylic copolymer, MW ~8000) | 0.6 |
| Neocryl BT-9 (40% water dispersion) (DSM resins) | polymeric resin (acrylic polymer, average MW ~68,000) | 25 (10 solid resin)** |
| Ethylene glycol | Water-miscible co-solvent | 25 |
| Propylene glycol | Water-miscible co-solvent | 10 |
| PEG 400 | Water-miscible co-solvent | 2 |
| Glycerol | Water-miscible co-solvent | 3 |
| BYK 349 (BYK) | surfactant (silicone) | 0.5 |
| Water | — | Balance to 100% |

**The polymeric resin was provided in a 40 wt. % water dispersion; the final ink formulation consisted of 25 wt. % of this dispersion, i.e. 10 wt. % of the final ink formulation was polymeric resin itself.

A pigment concentrate was formed by mixing the pigment (12.3%), water (84.4%) and Joncryl 683 fully neutralized with KOH (3.3%) and milling as described in Example1 until the particle size ($D_{50}$) reached 70 nm. Then the rest of materials were added to the pigment concentrate and mixed. After mixing the ink was filtered through a 0.5 micron filter.

At 25° C., the viscosity of the ink thus obtained was about 7 cP, the surface tension was approximately 24 mN/m, and the pH was 7-8.

Example 5

An inkjet ink formulation was prepared containing:

| Ingredient | Function | wt. % |
|---|---|---|
| Carbon Black Mogul L (Cabot) | Pigment | 2.2 |
| Joncryl HPD 671 neutralized with KOH (BASF) | Dispersant | 0.6 |
| NeoRad R-440 (40% water emulsion) (DSM resins) | polymeric resin (aliphatic polyurethane, MW 25,000) | 30 (12 solid resin)** |
| Propylene glycol | Water-miscible co-solvent | 40 |
| 2-Amino-2-Methyl-1-Propanol | pH raiser | 1 |
| Glycerol | Water-miscible co-solvent | 5 |
| BYK 349 (BYK) | surfactant (silicone) | 0.5 |
| Water | — | Balance to 100% |

**The polymeric resin was provided in a 40 wt. % water emulsion; the final ink formulation consisted of 30 wt. % of this emulsion, i.e. 12 wt. % in the final ink formulation was polymeric resin itself.

A pigment concentrate was formed by mixing the pigment (14.6%), water (81.5%) and Joncryl 671 fully neutralized with KOH (3.9%) and milling as described in Example 1 until the particle size ($D_{50}$) reached 70 nm. Then the rest of materials were added to the pigment concentrate and mixed. After mixing the ink was filtered through a 0.5 micron filter. At 25° C., the viscosity of the ink thus obtained was about 10 cP, the surface tension was approximately 26 mN/m, and the pH was 9-10.

Example 6

In a manner similar to those described in the preceding examples, an inkjet ink formulation was prepared containing:

| Ingredient | Function | wt. % |
|---|---|---|
| Hostajet Black O-PT (Clariant) | Pigment | 2.4 |
| Neocryl BT-26 (40% water dispersion) (DSM resins) | polymeric resin (acrylic polymer, ave. MW 25,000) | 7.2** |
| monoethanolamine | pH raiser | 1.5 |
| Propylene glycol | Water-miscible co-solvent | 20 |
| N-methylpyrrolidone | Water-miscible co-solvent | 10 |
| BYK 349 (BYK) | surfactant (silicone) | 0.5 |
| Water | — | Balance to 100% |

**The polymeric resin was provided in a 40 wt. % water dispersion; this dispersion constitute 18% of the final product, so that the 7.2 wt. % in the final ink formulation refers to the concentration of the polymeric resin itself, without water.

The above-provided formulation contains approximately 9.6% ink solids, of which 25% (2.4% of the total formulation) is pigment, and about 75% (40%*18%=7.2% of the total formulation) is resin, by weight.

Example 7

In a manner similar to those described in the preceding examples, an inkjet ink formulation was prepared containing:

| Ingredient | Function | wt. % |
|---|---|---|
| Duasyn Red 3B-SF liquid (Clariant) | Dye | 4 |
| Joncryl HPD 296 (35.5% sol'n in water) (BASF) | polymeric resin (acrylic styrene copolymer solution, ave. MW ~11,500) | 20 (7.1 solid resin)** |
| Diethylene glycol | Water-miscible co-solvent | 20 |
| N-methylpyrrolidone | Water-miscible co-solvent | 10 |
| BYK 333 (BYK) | surfactant (silicone) | 0.5 |
| Water | — | Balance to 100% |

**The polymeric resin was provided in a 35.5 wt. % water solution; this solution constitutes 20% of the final product, so that the 7.1 wt. % in the final ink formulation refers to the concentration of the polymeric resin itself.

Example 8

An inkjet ink formulation was prepared containing:

| Ingredient | Function | wt. % |
|---|---|---|
| Carbon Black Mogul L (Cabot) | Pigment | 1.3 |
| Joncryl HPD 296 35.5% water solution (BASF) | polymeric resin (acrylic styrene copolymer solution, ave. MW ~11,500) | 12.5** |
| Diethanolamine | pH raiser | 1 |
| Glycerol | Water-miscible co-solvent | 15 |
| Zonyl FSO-100 (DuPont) | fluorosurfactant | 0.2 |
| Water | — | Balance to 100% |

**The polymeric resin was provided in a 35.5 wt. % water solution; the 12.5 wt. % in the final ink formulation refers to the concentration of the polymeric resin itself.

A pigment concentrate was formed by mixing the pigment (14 wt. %), Joncryl HPD 296 (7 wt. % solids), and water (79 wt. %, triple distilled) and milling until the particle size ($D_{50}$) reached 70 nm. Then the rest of materials were then added to the pigment concentrate and mixed. After mixing the ink was filtered through a 0.5 micron filter. At 25° C., the viscosity of the ink thus obtained was about 9 cP and the surface tension was approximately 24 mN/m.

Example 9

An inkjet ink formulation may be prepared containing:

| Ingredient | Function | wt. % |
|---|---|---|
| Carbon Black Mogul L (Cabot) | Pigment | 2.2 |
| Disperbyk-198 (BYK-Chemie GmbH) | Dispersant | 1.4 |
| Joncryl 142E (40% water dispersion) (DSM resins) | polymeric resin (acrylic polymer, ave. MW 40,000) | 15 (6 solid resin)** |
| Propylene glycol | Water-miscible co-solvent | 15 |
| Ammonia (25% water sol'n) | pH raiser | 2.4 (0.6 ammonia) |
| Glycerol | Water-miscible co-solvent | 5 |
| BYK 349 (BYK) | surfactant (silicone) | 0.5 |
| Water | — | Balance to 100% |

**The polymeric resin was provided in a 40 wt. % water emulsion; this constitutes 17.5 wt. % of the final ink formulation, i.e. 7 wt. % in the final ink formulation is 142E resin itself.

A pigment concentrate is formed by mixing the pigment (10 wt. %), water (83.6 wt. %) and Disperbyk-198 (6.4 wt. %) and milling. The progress of milling is controlled on the basis of particle size measurement (Malvern, Nanosizer). The milling is stopped when the particle size ($D_{50}$) reaches 70 nm. Then the rest of materials are added to the pigment concentrate and mixed. After mixing, the ink is filtered through a 0.5 micron filter. At 25° C., the viscosity of the ink thus obtained was about 15 cP, the surface tension was approximately 26 mN/m, and the pH was 9-10.

Example 10

An inkjet ink formulation may be prepared containing:

| Ingredient | Function | wt. % |
|---|---|---|
| PV Fast Blue BG (Clariant) | Pigment | 2.3 |
| Neocryl BT-9 (40% water dispersion) (DSM resins) | Polymeric Resin (acrylic polymer dispersion, ave. MW ~68,000) | 17.5 (7 solid resin)** |
| Glycerol (Aldrich) | Water-miscible co-solvent | 3.3 |
| Capstone FS-65 (DuPont) | Non-ionic fluorosurfactant | 0.1 |
| Water | — | Balance to 100% |
| EFKA 4580 (BASF) | Dispersant | 1.8 |
| Diethyleneglycol (Aldrich) | Water-miscible co-solvent | 20 |
| Diethyl amine (Aldrich) | pH raiser | 1 |

**The polymeric resin was provided in a 40 wt. % water emulsion; this constitutes 17.5 wt. % of the final ink formulation, i.e. 7 wt. % in the final ink formulation is BT-9 resin itself.

A pigment concentrate is formed by mixing the pigment (10 wt. %), water (87.6 wt. %) and EFKA 4580 (5.5 wt. %) and milling. The progress of milling is controlled on the basis of particle size measurement (Malvern, Nanosizer). The milling is stopped when the particle size ($D_{50}$) reaches 70 nm. Then the rest of materials are added to the pigment concentrate and mixed. After mixing, the ink is filtered through a 0.5 micron filter. At 25° C., the viscosity of the ink thus obtained was about 9 cP, the surface tension was approximately 24 mN/m, and the pH was 9-10.

Formulations similar to those of Examples 9 and 10 may be prepared using EFKA® 4560, EFKA® 4585, EFKA® 7702 or Lumiten® N—OC 30 as the dispersant.

Example 11

An inkjet ink formulation was prepared containing:

| Ingredient | Function | wt. % |
|---|---|---|
| Jet Magent DMQ | Pigment | 2 |
| Neocryl BT-102 (40% water dispersion) (DSM resins) | Polymeric Resin (acrylic polymer) | 20 (8 solid resin)** |
| Propylene Glycol (Aldrich) | Water-miscible co-solvent | 20 |
| Byk 348 | Non-ionic fluorosurfactant | 0.2 |
| Disperbyk 198 | Dispersant | 2 |
| Water | — | Balance to 100% |

**The polymeric resin was provided in a 40 wt. % water emulsion; this constituted 20 wt. % of the final ink formulation, i.e. 8 wt. % in the final ink formulation was BT-102 resin itself.

Preparation: a pigment concentrate was formed by mixing pigment (14 wt. %), water (72 wt. %) and Disperbyk 198 (14 wt. %) and milling. The progress of milling was controlled on the basis of particle size measurements (Malvern, Nanosizer). The milling was stopped when the average particle size ($D_{50}$) reached 70 nm. The remaining materials were then added to the pigment concentrate and mixed. After mixing, the ink was filtered through a 0.5 μm filter. At 25° C., the viscosity of the ink thus obtained was about 5.5 cP, the surface tension was about 25 mN/m, and the pH was 6.5.

Example 12

In a manner similar to those described in the preceding examples, an inkjet ink formulation was prepared containing:

| Ingredient | Function | wt. % |
|---|---|---|
| Basonyl Blue 636 (BASF) | Water soluble dye | 1 |
| Joncryl 142E (40% water dispersion) (BASF) | polymeric resin (acrylic polymer, ave. MW 40,000) | 10 (4% of solid resin) |
| monoethanolamine | pH raiser | 1.5 |
| Propylene glycol | Water-miscible co-solvent | 20 |
| N-methylpyrrolidone | Water-miscible co-solvent | 10 |
| BYK 348 (BYK) | surfactant (silicone) | 0.5 |
| Water | — | Balance to 100% |

**The polymeric resin was provided in a 40 wt. % water dispersion; this dispersion constituted 10% of the final product, i.e. 4 wt. % of the final ink formulation was Joncryl 142E resin per se.

Example 13

In a manner similar to those described in the preceding examples, an inkjet ink formulation was prepared containing:

| Ingredient | Function | wt. % |
|---|---|---|
| Heliogen Blue D 7086 (BASF) | Water soluble dye | 1 |
| Joncryl 537-E (46.5% water dispersion) (BASF) | polymeric resin (acrylic polymer, ave. MW >200,000) | 15 (7% of solid resin) |
| Disperbyk 198 (BYK) | Dispersant | 3.5 |
| ethylene glycol | Water-miscible co-solvent | 25 |
| Glycerol | Water-miscible co-solvent | 5 |
| BYK 349 (BYK) | surfactant (silicone) | 0.1 |
| Water | — | Balance to 100% |

**The polymeric resin was provided in a 46.5 wt. % water dispersion; this dispersion constituted 15% of the final product, i.e. 7 wt. % of the final ink formulation was Joncryl 537E resin per se.

A pigment concentrate was prepared by mixing pigment (10%), water (72.5%) and Disperbyk 198 (17.5%) and milling until the average particle size ($d_{50}$) reached 70 nm. The remaining materials were then added to the pigment concentrate and mixed. After mixing, the ink was filtered through a 0.5 μm filter. At 25° C., the viscosity of the ink thus obtained was about 7.5 cP, the surface tension about 27 mN/m, and the pH was 8-9.

With respect to the foregoing examples, various milling procedures and apparati will be apparent to those of ordinary skill in the art. Various commercially available nano-pigments may be used in the inventive ink formulations. These include pigment preparations such as Hostajet Magenta E5B-PT and Hostajet Black O-PT, both from Clariant, as well as pigments demanding post-dispersion processes, such as Cromophtal Jet Magenta DMQ and Irgalite Blue GLO, both from BASF.

One of ordinary skill in the art may readily recognize that various known colorants and colorant formulations may be used in the inventive ink or inkjet ink formulations. In some embodiments, such pigments and pigment formulations may include, or consist essentially of, inkjet colorants and inkjet colorant formulations.

Alternatively or additionally, the colorant may be a dye. Examples of dyes suitable for use in the ink formulations of the present invention include: Duasyn Yellow 3GF-SF liquid, Duasyn Acid Yellow XX-SF, Duasyn Red 3B-SF liquid, Duasynjet Cyan FRL-SF liquid (all manufactured by Clariant); Basovit Yellow 133, Fastusol Yellow 30 L, Basacid Red 495, Basacid Red 510 Liquid, Basacid Blue 762 Liquid, Basacid Black X34 Liquid, Basacid Black X38 Liquid, Basacid Black X40 Liquid, Basonyl Red 485, Basonyl Blue 636 (all manufactured by BASF).

It will also be appreciated that it is possible to formulate an ink concentrate. This is similar to the procedure described above, differing in that, after forming the pigment (or dye) concentrate, the remaining ingredients are added and mixed, except that most or all of the additional solvent (water and co-solvent) is not added. The additional solvent may be mixed into such a concentrate at a later time, for example after the concentrate has been shipped to an end-user, to yield an inkjet ink formulation in accordance with embodiments of the invention. The concentrate may be diluted by addition of, for example, at least 50%, at least 100%, at least 150%, at least 200%, at least 250%, at least 300%, least 350% or at least 400% solvent on a weight/weight basis relative to the concentrate to yield the aqueous inkjet ink formulation.

Example 14

A piece of transfer blanket having a silanol-terminated polydimethyl siloxane silicone release layer of approximately 200 mm×300 mm was fixed on a hotplate and heated to 130° C. An aqueous solution containing 0.2 wt. % of tested pretreatment material was applied to the release layer to a thickness of 1 micron to completely cover the silicone release layer. In cases in which the material was supplied as a solution, e.g. 40 wt. % PEI in water, the solution was diluted in accordance with the supplier's stated concentration. This was allowed to dry to leave a thin (~1 nm thick) layer of the material. Then the entire surface was printed with drops of ink of 10 picoliter drop size, using aqueous nano-pigment cyan ink described above and a Fujifilm Dimatix DMP-2800 printer (http://www.fujifilmusa.com/products/industrial_inkjet_printheads/deposition-products/dmp-2800/index.html). This was also allowed to dry and the ink residue image was then transferred to Condat Gloss® 135 gsm paper at 130° C. by wrapping the paper around a cylinder and pressing the cylinder into the release layer as the cylinder was rolled over the release layer. The optical density (O.D.) of the ink on the paper was then measured using an X-rite 528 spectrodensitometer (www.xrite.com/product_overview.aspx?id=14). As a control, this same procedure was used, but without first applying a chemical agent to the release layer. The results are summarized in Table 1. (The difference in results for Lupasol G20 and Lupasol G20 Waterfree may be attributed to the higher concentration of chemical agent in the latter.)

TABLE 1

| Chemical Agent [Brand name] | Charge Density, meq/g | Molecular Weight | O.D. |
|---|---|---|---|
| Control | | | 0.53 |
| Polyethyleneimine (PEI) [Lupasol ® FG] | 16 | 800 | 0.84 |
| PEI [Lupasol ® G 100] | 17 | 5,000 | 1.1 |
| PEI [Lupasol ® G 20] | 16 | 1,300 | 0.75 |
| PEI [Lupasol ® G 20 Waterfree] | 16 | 1,300 | 0.92 |
| PEI [Lupasol ® G 35] | 16 | 2,000 | 0.94 |
| PEI [Lupasol ® HF] | 17 | 25,000 | 1.24 |
| PEI [Lupasol ® P] | 20 | 750,000 | 1.24 |
| PEI, modified [Lupasol ® PN 50] | | 1,000,000 | 1.21 |
| PEI, modified [Lupasol ® PN 60] | | n/a | 0.68 |
| PEI, modified [Lupasol ® PO 100] | | 2,000 | 1.09 |
| PEI [Lupasol ® PR 8515] | 16 | 2,000 | 0.95 |
| PEI [Lupasol ® PS] | 20 | 750,000 | 1.28 |
| PEI, modified [Lupasol ® SK] | 8 | 2,000,000 | 1.13 |
| PEI [Lupasol ® WF] | 17 | 25,000 | 1.28 |
| Poly(diallyldimethylammonium chloride) | ~6 (calc.) | 200,000-300,000 | 1.2 |
| Poly(4-vinylpyridine) | 7 (calc.) | 60,000-160,000 | |
| Polyallylamine | 17.5 (calc.) | 17,000 | 1.17 |
| Chromium, pentahydroxy (tetradecanoato)di-[Quilon™ C9] | ~6 (calc.) | ~500 | 0.82 |
| Chromium, tetrachloro-m-hydroxy[m-(octadecanoato-O:O')]di-[Quilon™ H] | ~6 (calc.) | ~500 | 0.77 |
| chromium complex [Quilon™ S] | 5.5 (calc.) | 545 | 0.77 |
| chromium(3+) chloride hydroxide tetradecanoate (2:4:1:1) [Quilon™ M] | 6.1 (calc.) | 490 | 0.76 |
| chromium complex [Quilon™ L] | ~6 (calc.) | ~500 | 0.75 |
| Hydrogenated tallowalkyl(2-ethylhexyl) dimethyl quaternary ammonium sulphate [ACER11S08] | | | 0.5 |
| Quaternary ammonium compounds [ACER11S07] | | | 0.56 |
| C12-C16 alkylbenzyldimethylammonium chloride [ACER11S15] | | | 0.56 |
| Tallow dimethyl benzyl ammonium chloride [ACER11S16] | | | 0.8 |
| Oleyltrimethylammonium hexanoate [ACER11S17] | | | 0.52 |
| Oleyltrimethylammonium decanoate [ACER11S18] | | | 0.77 |
| Oleyltrimethylammonium oleate [ACER11S19] | | | 0.79 |
| Calcium chloride | 18 (calc.) | 110 | 0.58 |
| Didecyl dimethyl ammonium chloride [Arquad 2-10-80] | 2.8 (calc.) | 362.08 | 0.63 |
| Didecyl dimethyl ammonium chloride [Arquad 2.10-70 HFP] | 2.8 (calc.) | 362.08 | 0.69 |

TABLE 1-continued

| Chemical Agent [Brand name] | Charge Density, meq/g | Molecular Weight | O.D. |
|---|---|---|---|
| N-Benzyl-N,N-dimethyltetradecan-1-aminium chloride [Arquad HTB-75] | 2.7 (calc.) | 368 | 0.52 |
| quaternary ammonium compounds, dicoco alkyldimethyl, chlorides [Arquad 2C-75] | 2.2. (calc.) | 447 | 0.71 |
| 1-Hexadecanaminium, N,N,N-trimethyl-, chloride Arquad 16-50] | 3.1 (calc.) | 320 | 0.64 |
| Coco Alkyltrimethylammonium Chloride [Arquad C-35] | 2.5-3.3 (calc.) | 300-400 | 0.7 |
| dihydrogenated tallow dimethyl ammonium chloride [Arquad HC-pastilles] | 1.7 (calc.) | 587 | 0.61 |
| ditallowdimethylammonium chloride [Arquad 2T-70] | 2-2.5 (calc.) | 400-500 | 0.7 |
| Tallowtrimethylammonium chloride [Arquad T-50-HFP] | n/a | n/a | 0.63 |
| Arquad MLB-80 | | | 0.59 |

Example 15

When, prior to printing, the outer surface of the image transfer member (the release layer) is treated with a chemical agent that is, or contains, PEI, transfer of the printed image to a substrate may result in at least some PEI being transferred as well. The PEI may be detected using X-ray photoelectron spectroscopy (XPS) or by other means that will be known to those of ordinary skill in the art of polymer analysis or chemical analysis of polymers.

Thus, two printed paper substrates were prepared under identical conditions (viz. inkjetting aqueous inkjet ink having nanopigment particles onto a transfer member, drying the ink and transferring to the substrate), except that one was prepared without pretreatment of the transfer member using PEI and the other was prepared using such pretreatment. XPS analysis of the printed images was conducted using a VG Scientific Sigma Probe and monochromatic Al Kα x-rays at 1486.6 eV having a beam size of 400 μm. Survey spectra were recorded with a pass energy of 150 eV. For chemical state identification of nitrogen, high energy resolution measurements of N1s were performed with a pass energy of 50 eV. The core level binding energies of the different peaks were normalized by setting the binding energy for the C1s at 285.0 eV. Deconvolution of the observed peaks revealed that the PEI sample contained a unique peak at about 402 eV, which corresponds to a C—$NH_2^+$—C group.

Thus, in an embodiment of the invention, there is provided a printed ink image having an XPS peak at 402.0±0.2 eV.

Example 16

Figure 4:
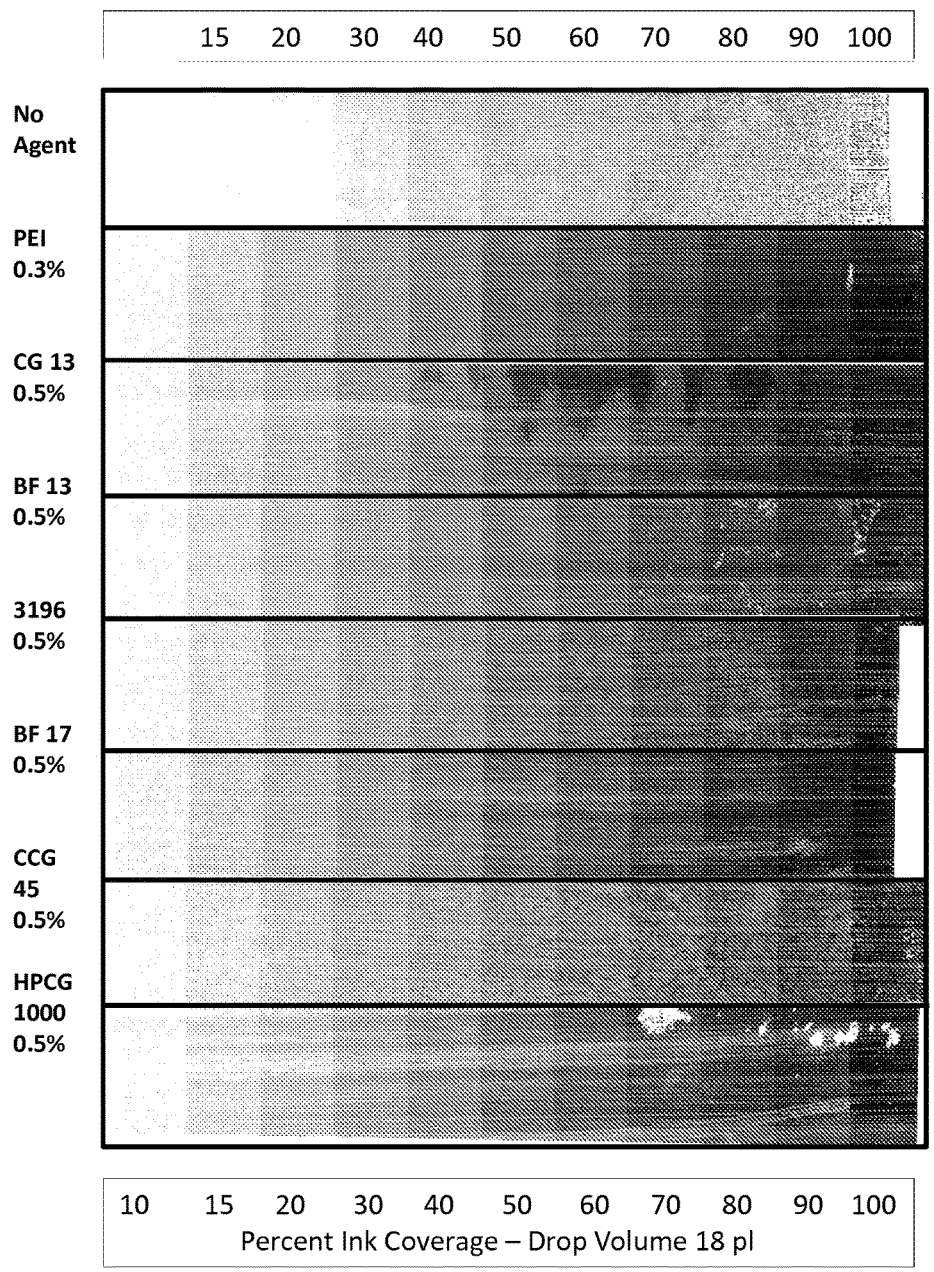

The purpose of the experiment was to check the suitability of candidate chemical agents for the treatment of the release layer. Other than PEI, which was supplied as an aqueous solution (Lupasol® PS, BASF) and diluted 1:100 to a concentration of about 0.3 wt. %, each chemical agent (N-Hance™ BF 17 cationic guar, N-Hance™ CCG 45 cationic guar, N-Hance™ HPCG 1000 cationic guar, N-Hance™ BF 13 cationic guar, N-Hance™ CG 13 cationic guar, N-Hance™ 3196 cationic guar, all from Ashland Specialty Ingredients) was provided as a powder and dissolved in deionized water on a weight per weight basis to prepare a conditioning solution, which was used "as is" without modification of the resulting pH. Each conditioning solution was manually applied to a release layer surface of a blanket of approximately 20 cm×30 cm size, the release layer comprising a silanol-terminated polydimethylsiloxane silicone and being at a temperature of 150° C. The conditioning solution was applied by moistening a Statitech 100% polyester cleanroom wiper with the solution and wiping the release layer surface. The conditioning solution was then allowed to dry spontaneously on the heated blanket. Thereafter, a black ink a black ink (containing Carbon Black Mogul L (Cabot.), 1.3 wt. %, Joncryl HPD 296 35.5% water solution (BASF), 35% (12% solids), glycerol 15%, Zonyl FSO-100 (DuPont) 0.2% and balance water) was jetted at a resolution of 600 dpi×600 dpi onto the conditioned release layer while still at 150° C., using conventional Kyocera inkjet print heads. It will be appreciated that during printing the heated release layer was moved relative to the print heads at a rate of 75 cm/s. The test file printed for the experiment printed a gradient of ink coverage, from a less to more dense population of ink dots. The drop size was set to 3 or 4, which corresponds to 13 pl or 18 pl respectively of ink. The ink film formed was allowed to dry for at least 5 seconds and then while still hot was transferred to Condat Gloss® 135 gsm paper using manual pressure, using one of two methods, either by the Paper On Blanket (POB) method, or the Roll method. In POB, the sheet of paper was placed directly onto the inked blanket, then manual pressure was applied. In Roll, the paper was tightly fixed with tape to a metal cylinder and the ink image was transferred to the paper by manually rolling this paper (with pressure) over the inked blanket. Representative printouts obtained by the POB method are shown in FIG. 4, wherein the areas of lower ink coverage are omitted and in some cases the area of 100% coverage is truncated. The diameters of several ink dots in two of the less dense regions of the printed area (not shown in the Figures), having drop size 3 or 4, as reported in the tables below, were then determined using a Lext Confocal Microscope at ×20 magnification. The measures were repeated for 5 representative round dots on areas of adequate conditioner coverage and the results in each area were averaged. The diameters of the various dots were compared. Results are presented in the Tables 2 and 3 below; PEI=polyethylene imine, GHPTC=guar hydroxypropyltrimonium chloride, HGHPTC=hydroxyl guar hydroxypropyltrimonium chloride; viscosities and charge densities are as reported by the manufacturer. A larger diameter suggests retention of the spreading of ink on the release layer and good transfer therefrom.

TABLE 2

Results for POB

| Chemical agent, wt. % | Material | Viscosity | Charge density | Ave. diameter, drop size 3 | Ave. diameter, drop size 4 |
|---|---|---|---|---|---|
| None | | | | 41.4276 | 50.5252 |
| Lupasol PS 0.3% | PEI | | Very high | 46.3056 | 56.8316 |
| CG 13 0.1% | GHPTC | High | Medium | 47.8436 | 59.0136 |
| CG 13 0.5% | GHPTC | High | Medium | 49.6364 | 59.0776 |
| BF 13 0.1% | GHPTC | High | Medium | 48.6236 | 56.1832 |
| BF 13 0.5% | GHPTC | High | Medium | 46.1368 | 57.2576 |
| 3196 0.1% | GHPTC | High | Medium | 47.3428 | 61.1776 |
| 3196 0.5% | GHPTC | High | Medium | 48.1552 | 59.5168 |
| BF 17 0.1% | GHPTC | High | Very High | 47.1568 | 59.1356 |
| BF 17 0.5% | GHPTC | High | Very High | 48.4384 | 59.0272 |
| CCG 45 0.1% | GHPTC | Low | Medium | 45.2832 | 56.1232 |
| CCG 45 0.5% | GHPTC | Low | Medium | 44.7548 | 56.3320 |
| Hpcg 1000 0.1% | HGHPTC | Medium | Medium | 45.9252 | 56.8428 |
| Hpcg 1000 0.5% | HGHPTC | Medium | Medium | 45.4280 | 58.3904 |

TABLE 3

Results for Roll

| chemical agent, wt. % | Material | Viscosity | Charge density | Ave. diameter, drop size 3 | Ave. diameter, drop size 4 |
|---|---|---|---|---|---|
| Lupasol PS 0.3% | PEI | | Very high | 43.2656 | 54.7352 |
| CG 13 0.1% | GHPTC | High | Medium | 43.0544 | 54.3544 |
| CG 13 0.5% | GHPTC | High | Medium | 48.2376 | 58.5096 |
| BF 13 0.1% | GHPTC | High | Medium | 47.6172 | 57.9916 |
| BF 13 0.5% | GHPTC | High | Medium | 45.4408 | 57.0412 |
| 3196 0.1% | GHPTC | High | Medium | 49.1352 | 61.2340 |
| 3196 0.5% | GHPTC | High | Medium | 47.5316 | 56.8892 |
| BF 17 0.1% | GHPTC | High | Very High | 46.5030 | 57.5252 |
| BF 17 0.5% | GHPTC | High | Very High | 48.4056 | 58.3452 |
| CCG 45 0.1% | GHPTC | Low | Medium | 44.2352 | 57.1564 |
| CCG 45 0.5% | GHPTC | Low | Medium | 44.8136 | 56.2856 |
| Hpcg 1000 0.1% | HGHPTC | Medium | Medium | 46.6876 | 57.9184 |
| Hpcg 1000 0.5% | HGHPTC | Medium | Medium | 46.1952 | 58.1752 |

The optical densities of these prints, in the region of 100% ink coverage, were also measured, using an X-rite 500 series spectrodensitometer using a 0.5 cm optical probe. The results are presented in Table 4 (numbers are the average of three measurements; the numbers in parenthesis indicate the OD of the tested agent as a % of OD of Lupasol PS):

TABLE 4

| Material | OD - POB | OD - Roll |
|---|---|---|
| None | 0.34 | |
| PEI | 2.00 (100%) | 1.95 (100%) |
| CG 13 0.1% | 1.49 (75%) | 1.44 (74%) |
| CG 13 0.5% | 1.82 (91%) | 1.72 (88%) |
| BF 13 0.1% | 2.06 (103%) | 1.91 (98%) |
| BF 13 0.5% | 1.57 (79%) | 1.78 (91%) |
| 3196 0.1% | 2.06 (103%) | 2.16 (111%) |
| 3196 0.5% | 2.10 (105%) | 2.01 (103%) |
| BF 17 0.1% | 1.72 (86%) | 1.52 (78%) |
| BF 17 0.5% | 2.12 (106%) | 1.69 (87%) |
| CCG 45 0.1% | 1.42 (71%) | 1.42 (73%) |
| CCG 45 0.5% | 1.25 (63%) | 1.59 (82%) |
| Hpcg 1000 0.1% | 2.18 (109%) | 1.86 (95%) |
| Hpcg 1000 0.5% | 1.88 (94%) | 1.72 (88%) |

The above-results show that cationic guars are also suitable chemical agents to serve for the conditioning of release layers of printing blankets in accordance with embodiments of the invention.

Example 17

In a manner similar to Example 16, solutions of various chemical agents were applied to a 10 square cm (cm$^2$) area of a heated blanket having a silanol-terminated polydimethyl-siloxane silicone release layer and dried prior to printing thereon in a gradient pattern with the aqueous ink described in Example 8, this time using a Fujifilm Dimatix DMP-2800 printer jetting 10 pl droplets (see FIG. 5). Viviprint™ polymers were obtained from International Specialty Products, Wayne, N.J. USA; and a branched PEI having MW 2,000,000 was obtained from Polysciences, Inc., Warrington, Pa. To account for the variations that may result from differences in printing head efficiency over time, ink was jetted simultaneously onto a surface that was treated with both a PEI solution (1% by volume of Lupasol PS corresponding to about 0.3% weight by weight) as reference and with the chemical agent being tested, each in separate sections or patches of blanket. For a control, the ink was printed on the release layer without prior application of a chemical agent. The ink was then dried and transferred to Condat Gloss® 135 gsm paper using a metal roller and manual pressure. Examples of the resulting images on the paper are shown in FIGS. 5A-5D. The optical densities of these prints in the 100% coverage region were measured. The results are shown in Table 5 below, presented in each case in comparison to the PEI reference print.

TABLE 5

| Chemical agent (solution strength, wt. %) | Chemistry | O.D. | O.D of PEI (1%) ref. | OD Agent/ OD PEI |
|---|---|---|---|---|
| Viviprint 131 (0.1%) | Copolymer of vinyl pyrrolidone dimethylaminopropyl methacrylamide | 0.93 | 1.33 | 70% |
| Viviprint 131 (0.5%) | Copolymer of vinyl pyrrolidone dimethylaminopropyl methacrylamide | 1.07 | 1.28 | 84% |
| Viviprint 200 (0.1%) | Terpolymer of vinyl caprolactam, dimethylaminopropyl methacryamide, hydroxyethyl methacrylate | 0.81 | 1.08 | 75% |
| Viviprint 200 (0.5%) | Terpolymer of vinyl caprolactam dimethylaminopropyl methacryamide hydroxyethyl methacrylate | 0.95 | 1.05 | 90% |
| Viviprint 650 (0.1%) | Quaternized vinyl pyrrolidone/ dimethylaminoethyl methacrylate copolymer in water | 0.96 | 1.25 | 77% |
| Viviprint 650 (0.5%) | Quaternized vinyl pyrrolidone/ dimethylaminoethyl methacrylate copolymer in water | 0.92 | 1.08 | 85% |
| PEI branched (0.1%) | Polyethylenimine | 0.93 | 1.04 | 89% |
| PEI branched (0.5%) | Polyethylenimine | 0.85 | 0.95 | 89% |

The above results show that various amine polymers are suitable for use as chemical agents in accordance with embodiments of the invention.

Example 18

This example is similar to Example 17, but the pH of the solution of the chemical agent being tested was varied by addition of 0.1M HCl or 0.1M NaOH, as appropriate, in order to assess whether or not the pH of the conditioning solution affected the interaction of the chemical agent with the release layer. Except for cationic guar N-Hance™ 3196, the concentration of which is provided in wt. %, the strength of all other conditioning solutions corresponds to the dilution in distilled water of the respective supplied stock solution. Optical density was measured at three points in each of the regions of 50% and 100% ink coverage. The results are presented in Table 6, again as a percentage relative to the PEI reference; the term "ref" in Table 6 indicates that the solution was tested "as is", without any pH adjustment.

TABLE 6

| Chemical Agent | pH | O.D (100%) Dimatix | O.D (50%) Dimatix |
|---|---|---|---|
| PEI (1%) | 9.5 | 1.78 | 0.72 |
| Viviprint 200 (0.1%) | 5.25 | 1.83 | 0.54 |
| Viviprint 200 (1%) | 5 | 1.87 | 0.49 |
| Viviprint 200 (0.5%) ref | 5.26 | 1.78 | 0.66 |
| Viviprint 200 (0.5%) | 4.2 | 1.40 | 0.64 |
| Viviprint 200 (0.5%) | 3 | 1.78 | 0.50 |
| Viviprint 200 (0.5%) | 6.5 | 1.54 | 0.69 |
| Viviprint 200 (0.5%) | 8.3 | 1.82 | 0.62 |
| Viviprint131 (0.1%) | 5 | 1.48 | 0.51 |
| Viviprint 131 (1%) | 4 | 1.50 | 0.50 |
| Viviprint 650 (0.1%) | 5.2 | 1.51 | 0.61 |
| Viviprint 650 (1%) | 4.8 | 1.62 | 0.65 |
| N-Hance 3196 (0.5%) ref | 9.5 | 1.96 | 0.68 |
| N-Hance 3196 (0.5%) | 11 | 2.02 | 0.74 |
| N-Hance 3196 (0.5%) | 8 | 1.98 | 0.72 |
| N-Hance 3196 (0.5%) | 6.9 | 1.94 | 0.57 |
| N-Hance 3196 (0.5%) | 5.5 | 1.98 | 0.68 |

Example 19

Tack (or tackiness) may be defined as the property of a material that enables it to bond with a surface on immediate contact under light pressure. Tack performance may be highly related to various viscoelastic properties of the material (polymeric resin, or ink solids). Both the viscous and the elastic properties would appear to be of importance: the viscous properties at least partially characterize the ability of a material to spread over a surface and form intimate contact, while the elastic properties at least partially characterize the bond strength of the material. These and other thermo-rheological properties are rate and temperature dependent.

By suitable selection of the thermo-rheological characteristics of the residue film which is formed by jetting an ink in accordance with embodiments of the invention onto a hydrophobic release layer and drying the jetted ink, the effect of cooling may be to increase the cohesion of the residue film, whereby its cohesion exceeds its adhesion to the release layer of the intermediate transfer member so that all or substantially all of the residue film is separated from the image transfer member and impressed as a film onto a substrate. In this way, it is possible to ensure that the residue film is impressed on the substrate without significant modification to the area covered by the film nor to its thickness.

Viscosity temperature sweeps—ramp and step—were performed using a Thermo Scientific HAAKE RheoStress® 6000 rheometer having a TM-PE-P Peltier plate temperature module and a P20 Ti L measuring geometry (spindle).

Samples of dried ink residue having a 1 mm depth in a 2 cm diameter module were tested. The samples were dried overnight in an oven at an operating temperature of 100° C. A volume of sample (pellet) was inserted into the 2 cm diameter module and softened by gentle heating. The sample volume was then reduced to the desired size by lowering the spindle to reduce the sample volume to the desired depth of 1 mm.

In temperature ramp mode, the sample temperature was allowed to stabilize at low temperature (typically 25° C. to 40° C.) before being ramped up to a high temperature (typically 160° C. to 190° C.) at a rate of approximately 0.33° C. per second. Viscosity measurements were taken at intervals of approximately 10 seconds. The sample temperature was then allowed to stabilize at high temperature for 120 seconds before being ramped down to low temperature, at a rate of approximately 0.33° C. per second. Again, viscosity measurements were taken at intervals of approximately 10 seconds. Oscillation temperature sweeps were performed at a gamma of 0.001 and at a frequency of 0.1 Hz.

Figure 6:
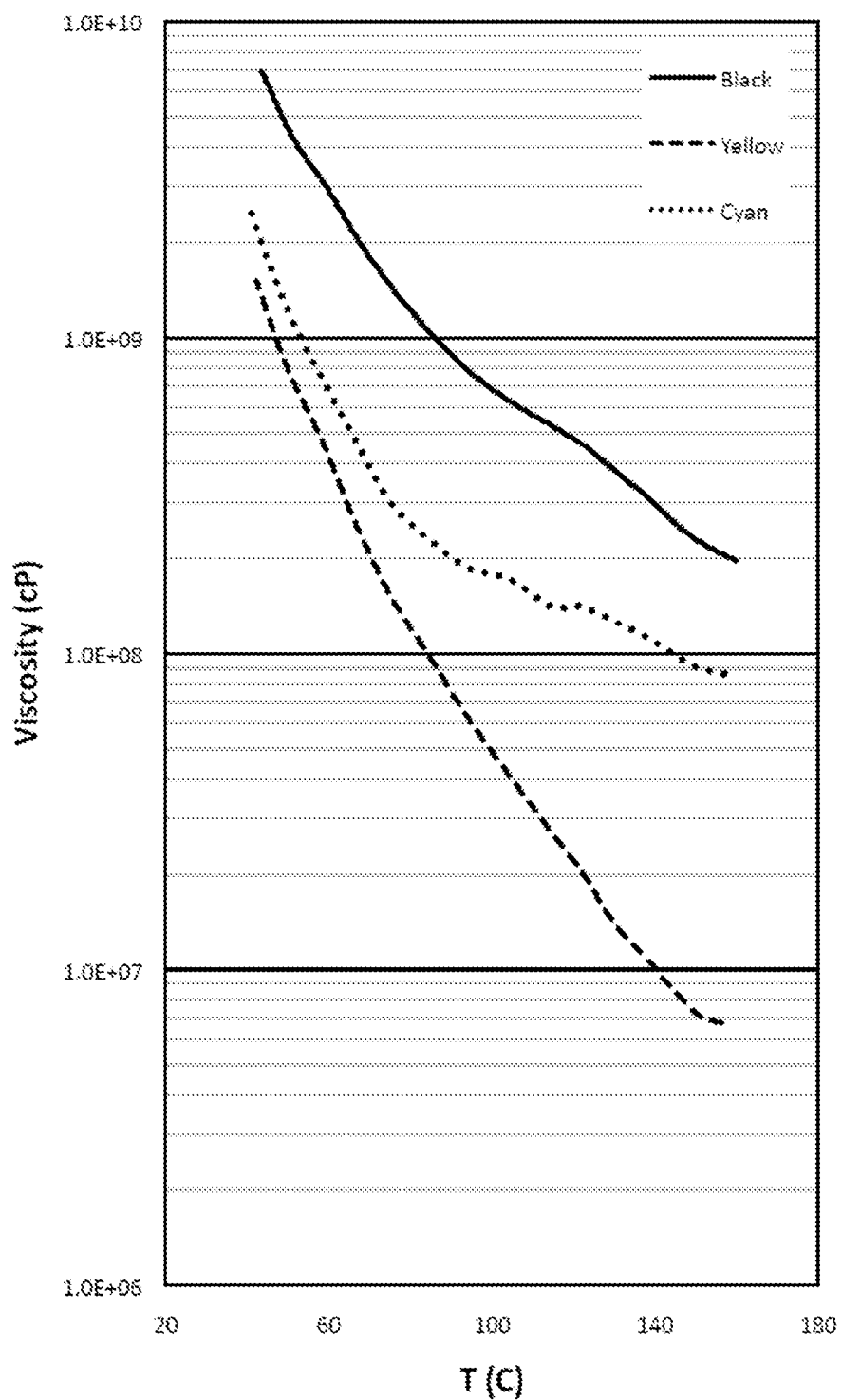
FIG. 6 is a ramped-down temperature sweep plot of dynamic viscosity as a function of temperature, for several ink formulations of the present invention.

FIG. 6 provides ramped-down temperature sweep plots of dynamic viscosity as a function of temperature, for several dried ink formulations suitable for the ink film construction of the present invention. After reaching a maximum temperature of approximately 160° C., and waiting 120 seconds, the temperature was ramped down as described.

The lowest viscosity curve is that of a dried residue of an inventive yellow ink formulation, containing about 2% pigment solids, and produced according to the procedure described hereinabove. At about 160° C., the rheometer measured a viscosity of about $6.7 \cdot 10^6$ cP. As the temperature was ramped down, the viscosity steadily and monotonically increased to about $6 \cdot 10^7$ cP at 95° C., and to about $48 \cdot 10^7$ cP at 58° C.

The intermediate viscosity curve is that of a dried residue of an inventive cyan ink formulation, containing about 2% pigment solids, and produced according to the procedure described hereinabove. At about 157° C., the rheometer measured a viscosity of about $86 \cdot 10^6$ cP. As the temperature was ramped down, the viscosity increased to about $187 \cdot 10^6$ cP at 94° C., and to about $8 \cdot 10^8$ cP at 57° C.

The highest viscosity curve is that of a dried residue of an inventive black ink formulation, containing about 2% pigment solids, and produced according to the procedure described hereinabove. At about 160° C., the rheometer measured a viscosity of about $196 \cdot 10^6$ cP. As the temperature was ramped down, the viscosity steadily and monotonically increased to about $763 \cdot 10^6$ cP at 95° C., and to about $302 \cdot 10^7$ cP at 59° C.

Figure 7:
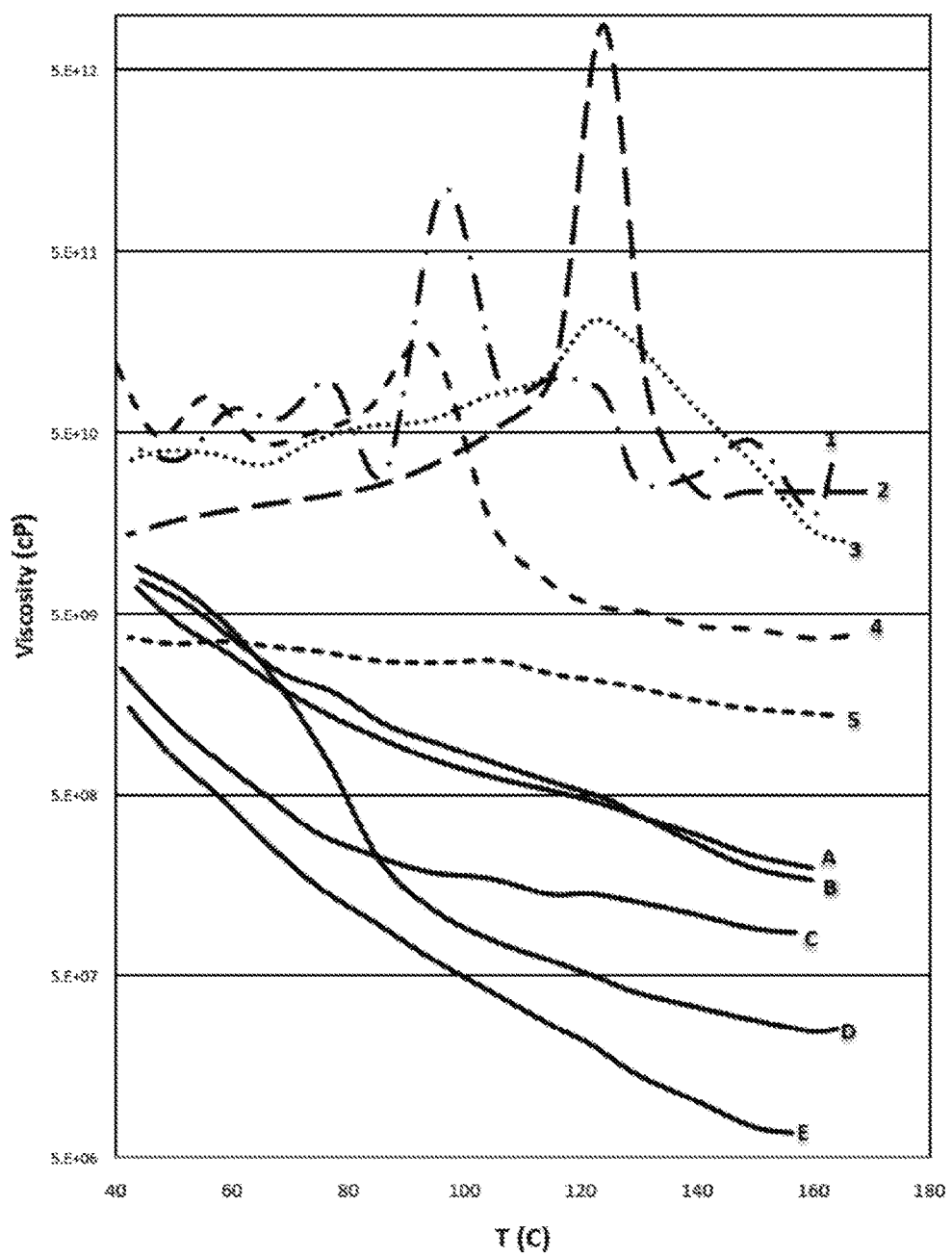
FIG. 7 is a ramped-down temperature sweep plot of dynamic viscosity as a function of temperature, for several ink formulations of the present invention, vs. several commercially available inkjet inks.

FIG. 7 is a ramped-down temperature sweep plot of dynamic viscosity as a function of temperature, for several dried ink formulations of the present invention, vs. several ink residues of prior art ink formulations. The viscosity curves of the prior art formulations are labeled 1 to 5, and are represented by dashed lines; the viscosity curves of the inventive formulations are labeled A to E, and are represented by solid lines. The ink formulations of the present invention include the three previously described in conjunction with FIG. 6 (A=black; C=cyan; and E=yellow), and two ink formulations ("B"; "D") containing about 2%, by weight of solids, of a magenta pigment [Hostajet Magenta E5B-PT (Clariant)], along with about 6% of various styrene-acrylic emulsions. The residues of the prior art inks were prepared from various commercially available inkjet inks, of different colors.

Figure 8:
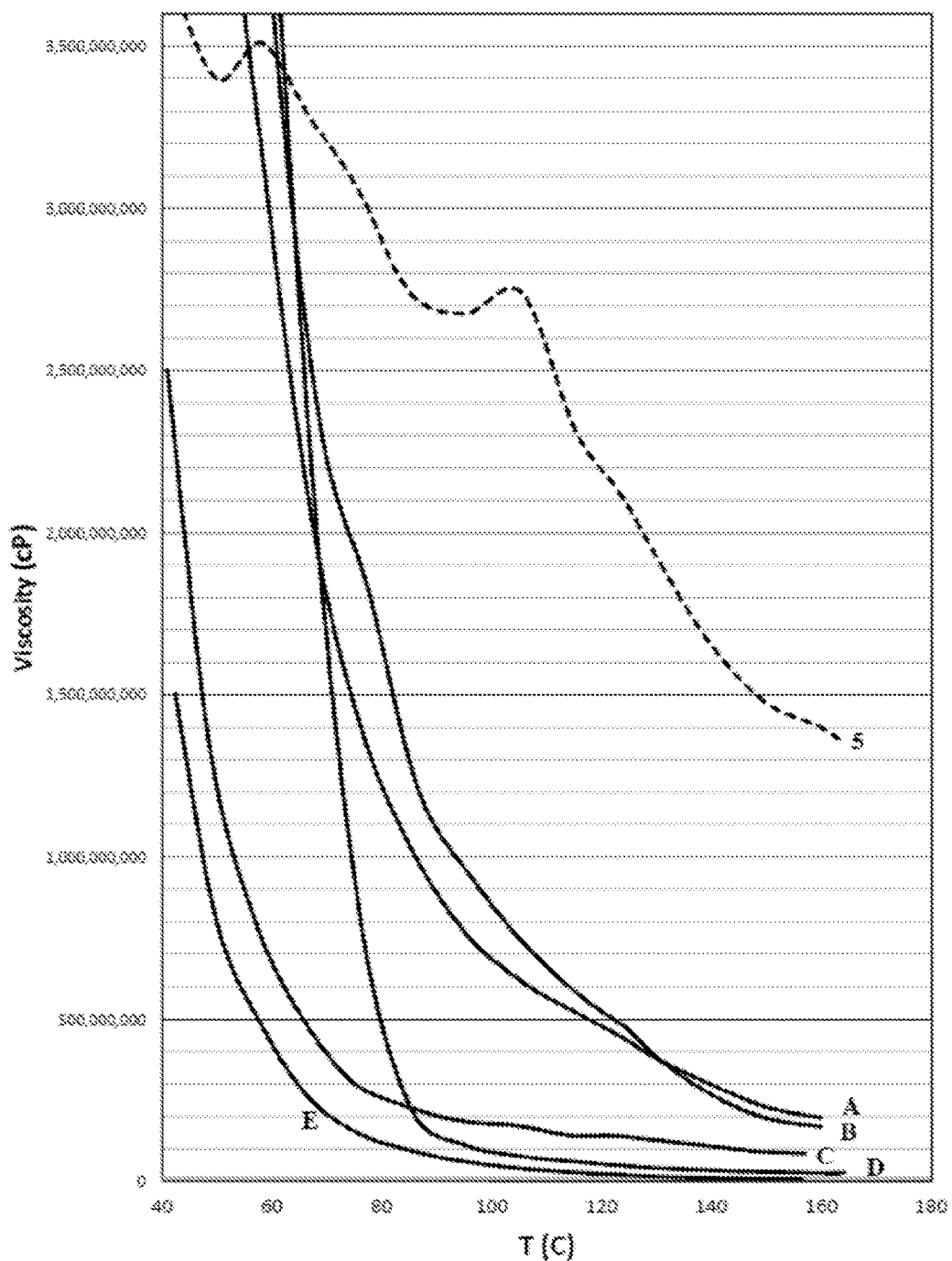
FIG. 8 is a magnified view of the plot of FIG. 7, for lower viscosities.

A magnified view of the plot of FIG. 7, for viscosities of less than $36 \cdot 10^8$, is provided in FIG. 8. Only the viscosity curves of the inventive formulations A to E, and that of prior-art formulation 5, may be seen in FIG. 8.

It is evident from the plots, and from the magnitude of the viscosities, that the dried ink residues of the various prior art ink formulations exhibit no or substantially no flow behavior over the entire measured range of temperatures (up to at least 160° C.). The peaks observed at extremely high viscosities in some plots of the prior-art formulations would appear to have no physical meaning. The lowest measured viscosity for each of the prior art residue films was within a range of at least $135 \cdot 10^7$ cP to at least $33 \cdot 10^8$ cP. The lowest value within this range, $135 \cdot 10^7$ cP, is well over 6 times the highest viscosity value of any of the residues of the inventive ink formulations, at about 160° C.

Moreover, during the ramp-down phase of the experiment, Samples 1 to 5 of the prior art exhibited viscosity values that exceeded the viscosity measured at about 160° C., and/or appear sufficiently high so as to preclude transfer of the film. In practice, the inventors of the present invention successfully transferred all five of the inventive ink films to a printing substrate, but failed to transfer any of the five prior-art ink films to a printing substrate, even after heating to over 160° C.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

In the description and claims of the present disclosure, each of the verbs, "comprise" "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "an impression station" or "at least one impression station" may include a plurality of impression stations.

What is claimed is:

1. A printed ink image on a substrate comprising a water-soluble or water-dispersible polymeric resin, and for which at least one of the following is true:
    (a) the image has an X-Ray Photoelectron Spectroscopy (XPS) peak at 402.0±0.4 eV;
    (b) the image has on its outer surface distal to the substrate a polymeric chemical agent containing at least 1 wt. % of one or more chargeable nitrogen atoms and having at least one of
        (1) a positive charge density of at least 3 meq/g of chemical agent and an average molecular weight of at least 250 and
        (2) a molecular weight of at least 10,000;
    (c) the ratio of the surface concentration of nitrogen at the outer surface of the image distal to the substrate to the bulk concentration of nitrogen within the image is at least 1.2:1;
    (d) the surface concentration of secondary amines, tertiary amines, and/or an ammonium group at the image surface distal to the substrate exceeds their respective bulk concentrations at a depth of at least 30 nanometers below the surface.

2. A printed ink image of claim 1 wherein the image has on its outer surface said polymeric chemical agent, the polymeric chemical agent having a positive charge density of at least 3 meq/g and an average molecular weight of at least 5,000.

3. The printed ink image of claim 1, wherein the polymeric chemical agent has an average molecular weight of at least 800.

4. The printed ink image of claim 1 wherein the charge density of the polymeric chemical agent is at least 6 meq/g of chemical agent.

5. The printed ink image of claim 1 wherein the polymeric chemical agent is selected from the group consisting of linear polyethylene imine, branched polyethylene imine, modified polyethylene imine, poly(diallyldimethylammonium chloride), poly(4-vinylpyridine), polyallylamine, a vinyl pyrrolidone-dimethylaminopropyl methacrylamide co-polymer, a vinyl caprolactam-dimethylaminopropyl methacryamide hydroxyethyl methacrylate copolymer, a quaternized copolymer of vinyl pyrrolidone and dimethylaminoethyl methacrylate with diethyl sulfate a guar hydroxypropyltrimonium chloride, and a hydroxypropyl guar hydroxypropyltrimonium chloride.

6. The printed ink image of claim 1, wherein a surface concentration of nitrogen at the surface distal to the substrate exceeds a bulk concentration of nitrogen within the bulk of the ink image, the bulk concentration being measured at a depth of at least 30 nanometers below the ink image surface distal to the substrate, and the ratio of the surface concentration to the bulk concentration is at least 1.1 to 1.

7. The printed ink image of claim 6, wherein the bulk concentration is measured at a depth of at least 3-50 nm from the ink image surface distal to the substrate.

8. The printed ink image of claim 1, wherein the ratio of the surface concentration of nitrogen at the outer surface of the image distal to the substrate to the bulk concentration of nitrogen within the image is at least 1.3:1.

9. The printed ink image of claim 8, wherein the ratio of the surface concentration of nitrogen at the outer surface of the image distal to the substrate to the bulk concentration of nitrogen within the image is at least 1.5:1.

10. The printed ink image of claim 9, wherein the ratio of the surface concentration of nitrogen at the outer surface of the image distal to the substrate to the bulk concentration of nitrogen within the image is at least 1.75:1.

11. The printed ink image of claim 10, wherein the ratio of the surface concentration of nitrogen at the outer surface of the image distal to the substrate to the bulk concentration of nitrogen within the image is at least 2:1.1.

12. The printed ink image of claim 11, wherein the ratio of the surface concentration of nitrogen at the outer surface of the image distal to the substrate to the bulk concentration of nitrogen within the image is at least 3:1.

13. The printed ink image of claim 12, wherein the ratio of the surface concentration of nitrogen at the outer surface of the image distal to the substrate to the bulk concentration of nitrogen within the image is at least 5:1.

14. The printed ink image of claim 3, wherein the polymeric chemical agent has a positive charge density of at least 3 meq per g of chemical agent and an average molecular weight of at least 1,000.

15. The printed ink image of claim 14, wherein the polymeric chemical agent has a positive charge density of at least 3 meq per g of chemical agent and an average molecular weight of at least 1,300.

16. The printed ink image of claim 15, wherein the polymeric chemical agent has a positive charge density of at least 3 meq per g of chemical agent and an average molecular weight of at least 1,700.

17. The printed ink image of claim 16, wherein the polymeric chemical agent has a positive charge density of at least 3 meq per g of chemical agent and an average molecular weight of at least 2,000.

18. The printed ink image of claim 17, wherein the polymeric chemical agent has a positive charge density of at least 3 meq per g of chemical agent and an average molecular weight of at least 2,500.

19. The printed ink image of claim 1, wherein the image has on its outer surface said polymeric chemical agent, the polymeric chemical agent having a positive charge density of at least 6 meq/g and an average molecular weight of at least 1,000.

20. The printed ink image of claim 1, wherein
(a) the image has an X-Ray Photoelectron Spectroscopy (XPS) peak at 402.0±0.4 eV;
(b) the image has on its outer surface distal to the substrate a polymeric chemical agent containing at least 1 wt. % of one or more chargeable nitrogen atoms and having
  (1) a positive charge density of at least 3 meq/g of chemical agent and an average molecular weight of at least 250 and
  (2) a molecular weight of at least 10,000;
(c) the ratio of the surface concentration of nitrogen at the outer surface of the image distal to the substrate to the bulk concentration of nitrogen within the image is at least 1.2:1;
(d) the surface concentration of secondary amines, tertiary amines, and/or an ammonium group at the image surface distal to the substrate exceeds their respective bulk concentrations at a depth of at least 30 nanometers below the surface.

* * * * *